US010636206B2

(12) United States Patent
Chen et al.

(10) Patent No.: US 10,636,206 B2
(45) Date of Patent: Apr. 28, 2020

(54) METHOD AND SYSTEM FOR GENERATING AN IMAGE FILE OF A 3D GARMENT MODEL ON A 3D BODY MODEL

(71) Applicant: METAIL LIMITED, London (GB)

(72) Inventors: Yu Chen, London (GB); Dongjoe Shin, London (GB); Joe Townsend, London (GB); Jim Downing, London (GB); Duncan Robertson, London (GB); Tom Adeyoola, London (GB)

(73) Assignee: METAIL LIMITED, London (GB)

( * ) Notice: Subject to any disclaimer, the term of this patent is extended or adjusted under 35 U.S.C. 154(b) by 0 days.

(21) Appl. No.: 15/898,365

(22) Filed: Feb. 16, 2018

(65) Prior Publication Data

US 2018/0197331 A1 Jul. 12, 2018

Related U.S. Application Data

(63) Continuation of application No. 15/752,683, filed as application No. PCT/GB2016/052526 on Aug. 15, 2016.

(30) Foreign Application Priority Data

Aug. 14, 2015 (GB) ..................................... 1514447
Jan. 20, 2016 (GB) ................................... 1601084.5

(51) Int. Cl.
*G06T 17/20* (2006.01)
*G06T 19/20* (2011.01)
(Continued)

(52) U.S. Cl.
CPC .......... *G06T 17/20* (2013.01); *G06F 17/5009* (2013.01); *G06T 15/04* (2013.01);
(Continued)

(58) Field of Classification Search
None
See application file for complete search history.

(56) References Cited

U.S. PATENT DOCUMENTS 5,850,352 A 12/1998 Moezzi et al.
8,525,828 B1 9/2013 Bates
(Continued)

FOREIGN PATENT DOCUMENTS

GB 2488237 B 9/2015
WO 98/028908 A1 7/1998
(Continued)

OTHER PUBLICATIONS

International Search Report, dated Jan. 31, 2017, and Written Opinion issued in International Application No. PCT/GB2016/052526.
(Continued)

*Primary Examiner* — Jason A Pringle-Parker
(74) *Attorney, Agent, or Firm* — Saul Ewing Arnstein & Lehr LLP

(57) ABSTRACT

A method of generating an image file of a high resolution 3D garment model on a 3D body model, comprising the steps of: (i) acquiring at least three 2D images of a garment on a mannequin, wherein the at least three 2D images capture a 360° azimuthal angle range of view of the garment, including a texture of the garment; (ii) creating a simplified 3D garment model using the 2D images of the garment; (iii) simulating the smooth and simplified 3D garment model on the 3D body model; (iv) deforming and rendering the high-resolution garment texture on the simulated smooth and simplified 3D garment model on the 3D body model, and (v) generating an image file of the 3D body model, the image file including the deformed and rendered high-reso-
(Continued)

lution garment texture, on the simulated smooth and simplified 3D garment model, on the 3D body model.

19 Claims, 40 Drawing Sheets

(51) Int. Cl.
  *G06F 17/50* (2006.01)
  *G06T 15/04* (2011.01)
(52) U.S. Cl.
  CPC .......... *G06T 19/20* (2013.01); *G06F 2217/32* (2013.01); *G06T 2215/16* (2013.01)

(56) References Cited

U.S. PATENT DOCUMENTS

| | | | |
|---|---|---|---|
| 2002/0103566 A1* | 8/2002 | Gadson | G06Q 30/06 700/132 |
| 2005/0080505 A1* | 4/2005 | Luhnow | A41H 1/00 700/132 |
| 2005/0088515 A1 | 4/2005 | Geng | |
| 2005/0234782 A1 | 10/2005 | Schackne et al. | |
| 2008/0225044 A1* | 9/2008 | Huang | G06T 17/00 345/420 |
| 2010/0302275 A1* | 12/2010 | Saldanha | G06T 17/00 345/629 |
| 2011/0096183 A1 | 4/2011 | Robertson | |
| 2012/0299912 A1 | 11/2012 | Kapur et al. | |
| 2014/0035913 A1 | 2/2014 | Higgins et al. | |
| 2014/0052427 A1* | 2/2014 | Yahiaoui | G06T 17/05 703/10 |
| 2014/0176565 A1* | 6/2014 | Adeyoola | G06T 19/006 345/473 |
| 2014/0225888 A1* | 8/2014 | Bell | G06T 17/00 345/419 |
| 2015/0134493 A1* | 5/2015 | Su | G06T 19/20 705/27.2 |

FOREIGN PATENT DOCUMENTS

| | | |
|---|---|---|
| WO | 01/046911 A1 | 6/2001 |
| WO | 2012/110828 A1 | 8/2012 |

OTHER PUBLICATIONS

Cheng et al., "A 3D Virtual Show Room for Online Apparel Retail Shop," Proceedings: APSIPA ASC 2009: Asia-Pacific Signal and Information Processing Assoc., 2009 annual Summit and Conference: 193-199 (Oct. 4, 2009); retrieved from the Internet: URL: http://eprints.lib.hokudai.ac.jp/dspace/bitstream/2115/39672/1/MP-L1-3.pdf [retrieved on Jun. 13, 2012] XP055029726.
Zhong Yueqi et al., "V-Dresser: An image based 3D garment generating sytsem," Computer Science & Education (ICCSE), 2012 yth Intl. Conf. on, IEEE, (Jul. 14, 2012), pp. 779-784 XP032232698.
Fu You et al., "An Improved Texture Mapping Model Based on Mesh Parameterization in 3D Garments," 2014 5th Intl. Conf. on Digital Home, IEEE (Nov. 28, 2014) pp. 180-184 XP032715369.
Derek Bradley et al., "Markerless garment capture," ACM Siggraph 2008 Papers on, Siggraph '08, ACM Press, NY, NY (Aug. 1, 2008), pp. 1-9 XP058092130.
B. Amberg, S. Romdhani, and T. Vetter. Optimal step nonrigid ICP algorithms for surface registration. IEEE Conference on Computer Vision and Pattern Recognition, 2007.
Y. Boykov, O. Veksler, and R. Zabih. Fast approximate energy minimization via graph cuts. In Computer Vision, 1999. The Proceedings of the Seventh IEEE International Conference on, vol. 1, pp. 377-384 vol. 1, 1999.
Y. Boykov, O. Veksler, and R. Zabih. Fast approximate energy minimisation via graph cuts. IEEE Trans. Pattern Analysis and Machine Intelligence (PAMI), 23(11):1222-1239, 2001.
D. Bradley, T. Popa, A. Sheffer, W. Heidrich, and T. Boubekeur. Markerless garment capture. ACM Transactions on Graphics (TOG), 27(3):99, 2008.
R. Bridson, R. Fedkiw, and J. Anderson. Robust treatment of collisions, contact and friction for cloth animation. ACM Transactions on Graphics (ToG), 21(3):594-603, 2002.
R. Bridson, S. Marino, and R. Fedkiw. Simulation of clothing with folds and wrinkles. Proceedings of the 2003 ACM SIGGRAPH/ Eurographics symposium on Computer animation, pp. 28-36, 2003.
Y. Chen, D. Robertson, and R. Cipolla. A practical system for modelling body shapes from single view measurements. British Machine Vision Conference, 2011.
K.-J. Choi and H.-S. Kok. Stable but responsive cloth. ACM Trans. Graph. (Proc. SIGGRAPH), 21:604-611, 2002.
F. Cordier and N. Magnenat-Thalmann. Real-time animation of dressed virtual humans. Computer Graphics Forum, 21(3):327-335, 2002.
F. Cordier and N. Magnenat-Thalmann. A data-driven approach for real-time clothes simulation. Computer Graphics Forum, 24(2):173-183, 2005.
B. Curless and M. Levoy. A volumetric method for building complex models from range images. In Proceedings of the 23rd Annual Conference on Computer Graphics and Interactive Techniques, SIGGRAPH '96, pp. 303-312, New York, NY, USA, 1996. ACM.
E. de Aguiar, C. Stoll, C. Theobalt, N. Ahmed, H. Seidel, and S. Thrun. Performance capture from sparse multi-view video. ACM Transactions on Graphics (TOG), 27(3):98, 2008.
R. O. Duda and P. E. Hart. Use of the hough transformation to detect lines and curves in pictures. Commun. ACM, 15(1):11-15, Jan. 1972.
A. A. Efros and W. T. Freeman. Image quilting for texture synthesis and transfer. In Proceedings of the 28th Annual Conference on Computer Graphics and Interactive Techniques, SIGGRAPH '01, pp. 341-346, New York, NY, USA, 2001. ACM.
R. Goldenthal, D. Harmon, R. Fattal, M. Bercovier, and E. Grinspun. Efficient simulation of inextensible cloth. In ACM SIGGRAPH 2007 Papers, SIGGRAPH '07, New York, NY, USA, 2007. ACM.
P. Guan, L. Reiss, D. Hirshberg, A. Weiss, and M. Black. Drape: Dressing any person. ACM Transactions on Graphics (TOG), 31(4):35, 2012.
R. Hartley and A. Zisserman. Multiple view geometry in computer vision. Cambridge university press, 2003.
S. Hauswiesner, M. Straka, and G. Reitmayr. Temporal coherence in image-based visual hull rendering. IEEE Transactions on Visualization and Computer Graphics, 99(1):1, 2013.
S. Izadi, D. Kim, O. Hilliges, D. Molyneaux, R. Newcombe, P. Kohli, J. Shotton, S. Hodges, D. Freeman, A. Davison, et al. Kinectfusion: real-time 3d reconstruction and interaction using a moving depth camera. In Proceedings of the 24th annual ACM symposium on User interface software and technology, pp. 559-568. ACM, 2011.
V. Kwatra, A. Schödl, I. Essa, G. Turk, and A. Bobick. Graphcut textures: Image and video synthesis using graph cuts. ACM Trans. Graph., 22(3):277-286, Jul. 2003.
A. Laurentini. The visual hull concept for silhouette-based image understanding. Pattern Analysis and Machine Intelligence, IEEE Transactions on, 16(2):150-162, Feb. 1994.
A. Levin, A. Zomet, S. Peleg, and Y. Weiss. Seamless image stitching in the gradient domain. In Computer Vision-ECCV 2004, pp. 377-389. Springer, 2004.
B. Lévy, S. Petitjean, N. Ray, and J. Maillot. Least squares conformal maps for automatic texture atlas generation. In ACM Transactions on Graphics (TOG), vol. 21, pp. 362-371. ACM, 2002.
M. Lourakis and A. Argyros. The design and implementation of a generic sparse bundle adjustment software package based on the levenberg-marquardt algorithm. Technical report, Technical Report 340, Institute of Computer Science—FORTH, Heraklion, Crete, Greece, 2004.
W. Matusik, C. Buehler, R. Raskar, S. J. Gortler, and L. McMillan. Image-based visual hulls. In Proceedings of the 27th Annual Conference on Computer Graphics and Interactive Techniques, SIG-

(56) References Cited

OTHER PUBLICATIONS

GRAPH '00, pp. 369-374, New York, NY, USA, 2000. ACM Press/Addison-Wesley Publishing Co.

A. Nealen, M. Müller, R. Keiser, E. Boxerman, and M. Carlson. Physically based deformable models in computer graphics. Computer Graphics Forum, 25(4):809-836, 2006.

P. Pérez, M. Gangnet, and A. Blake. Poisson image editing. In ACM Transactions on Graphics (TOG), vol. 22, pp. 313-318. ACM, 2003.

A. Rav-Acha, P. Kohli, C. Rother, and A. Fitzgibbon. Unwrap mosaics: A new representation for video editing. Proc. of SIGGRAPH, pp. 48-60, 2008.

R. White, K. Crane, and D. Forsyth. Capturing and animating occluded cloth. ACM Transactions on Graphics (TOG), 26(3):34, 2007.

K. Robinette, H. Daanen, and E. Paquet. The CAESAR project: a 3-D surface anthropometry survey. International Conference on 3-D Digital Imaging and Modeling, pp. 380-386, 1999.

S. Rusinkiewicz and M. Levoy. Efficient variants of the icp algorithm. In 3-D Digital Imaging and Modeling, 2001. Proceedings. Third International Conference on, pp. 145-152, 2001.

J. Starck and A. Hilton. Surface capture for performance-based animation. IEEE Comp. Graphics and Applications, 27:21-31, 2007.

C. Stauffer and W. E. L. Grimson. Adaptive background mixture models for real-time tracking. In Computer Vision and Pattern Recognition, 1999. IEEE Computer Society Conference on., vol. 2. IEEE, 1999.

C. Stoll, J. Gall, E. de Aguiar, S. Thrun, and C. Theobalt. Video-based reconstruction of animatable human characters. ACM Transactions on Graphics (TOG), 29(6):139, 2010.

R. Szeliski. Image alignment and stitching: A tutorial. Foundations and Trends in Computer Graphics and Vision, 2 (1):1-104, 2006.

N. Umetani, D. Kaufman, T. Igarashi, and E. Grinspun. Sensitive couture for interactive garment modeling and editing. ACM Trans. Graph., 30(4):90, 2011.

G. Vogiatzis, P. Torr, and R. Cipolla. Multi-view stereo via volumetric graph-cuts. in Computer Vision and Pattern Recongition 2005. CVPR 2005. IEEE Computer Society Conference on, vol. 2, pp. 391-398 vol. 2, Jun. 2005.

\* cited by examiner

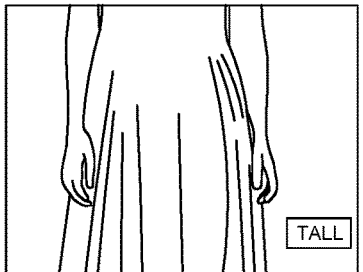
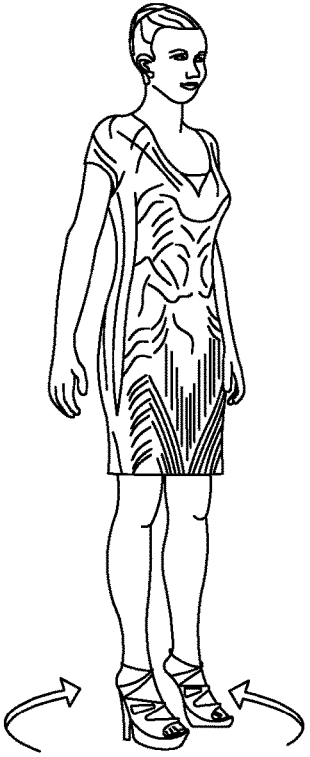
FIG. 1

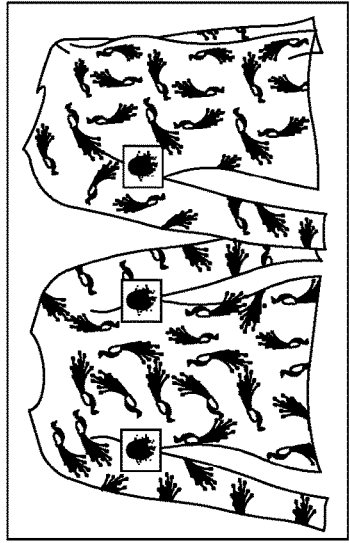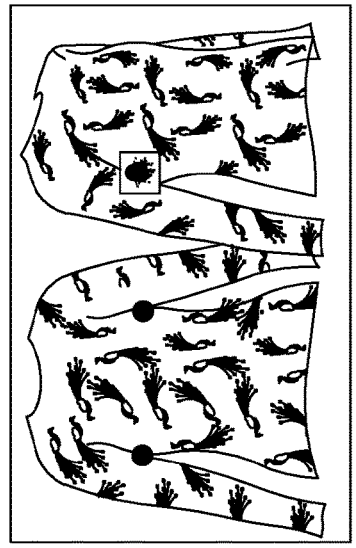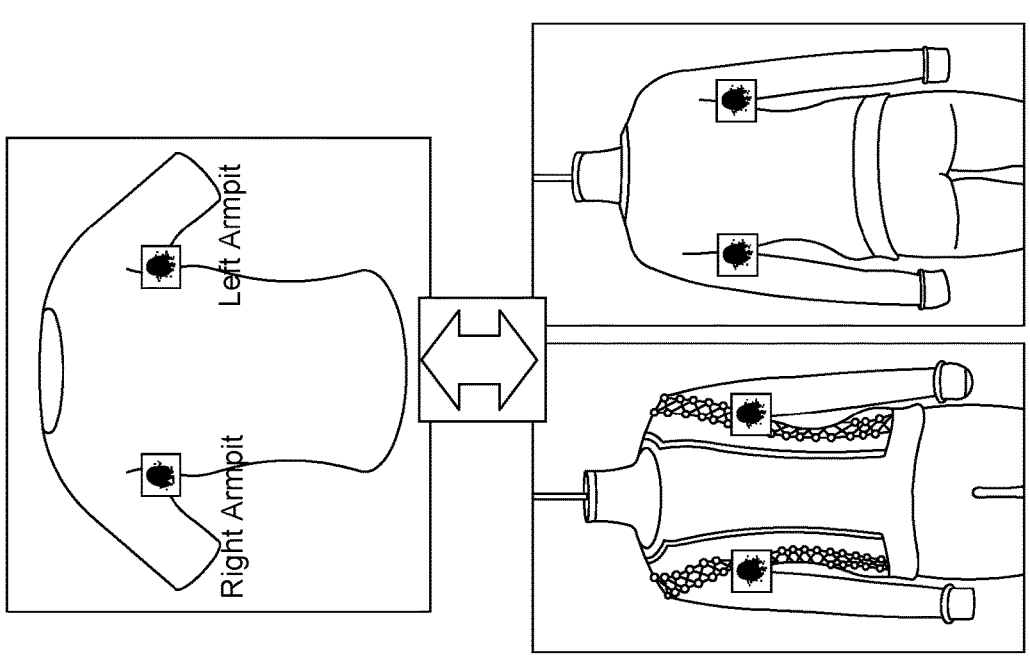
FIG. 7

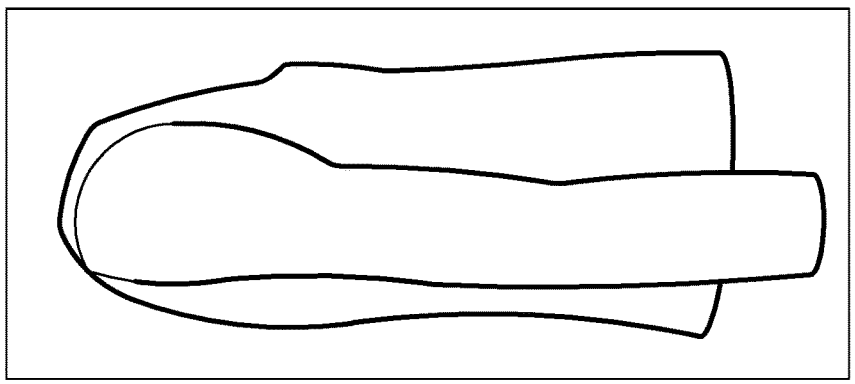
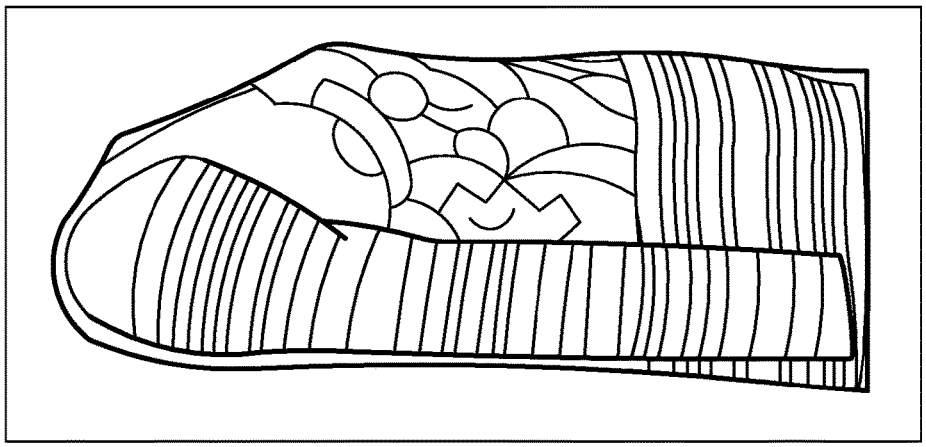
FIG. 8

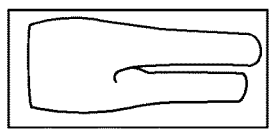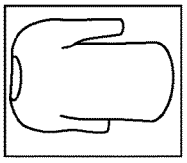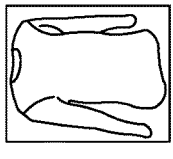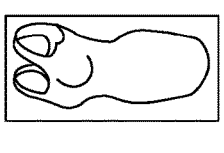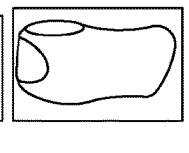
3D models
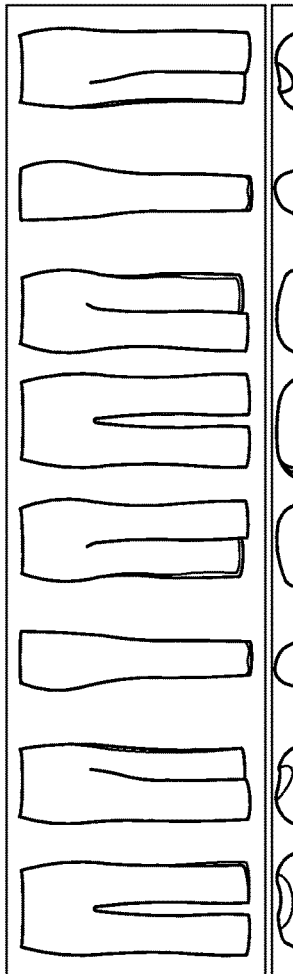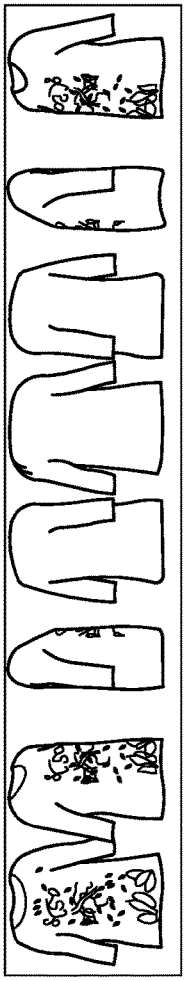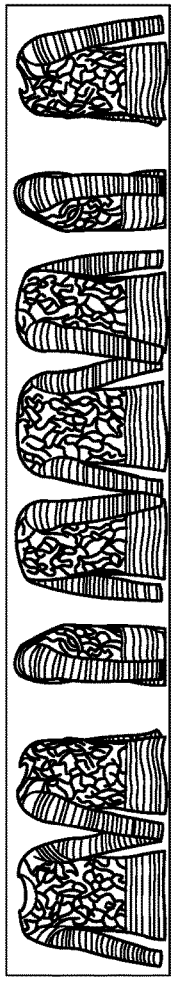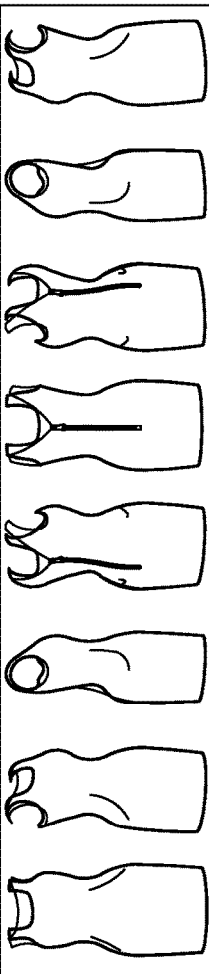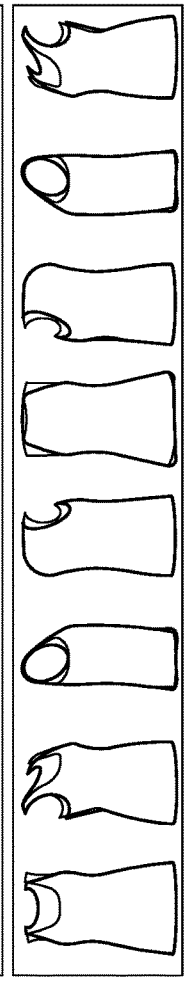
Silhouettes projected into each view
FIG. 11

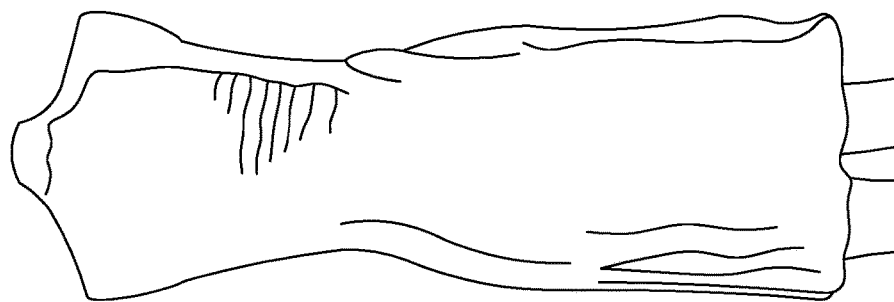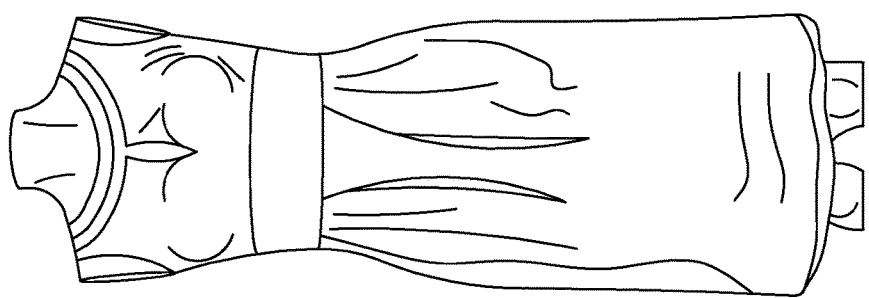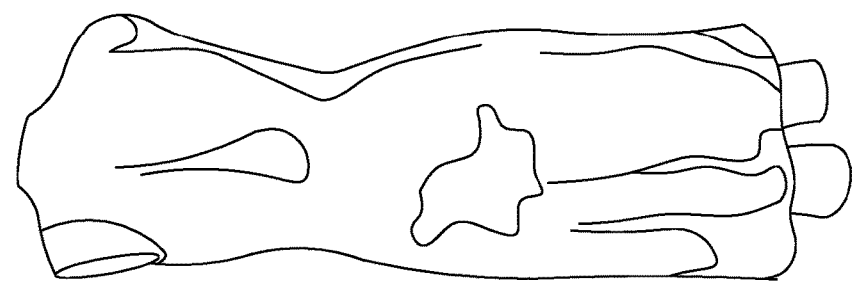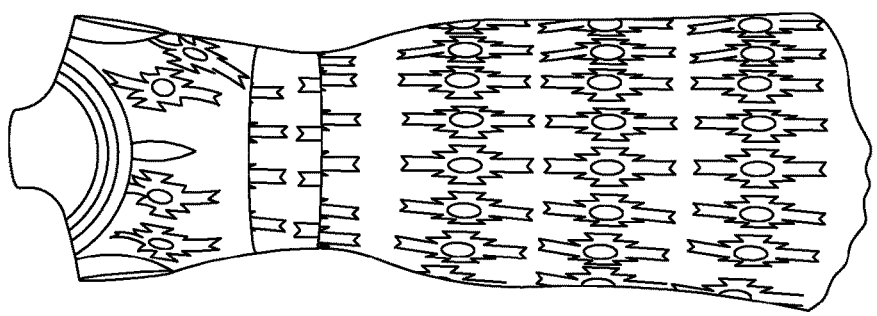
FIG. 12

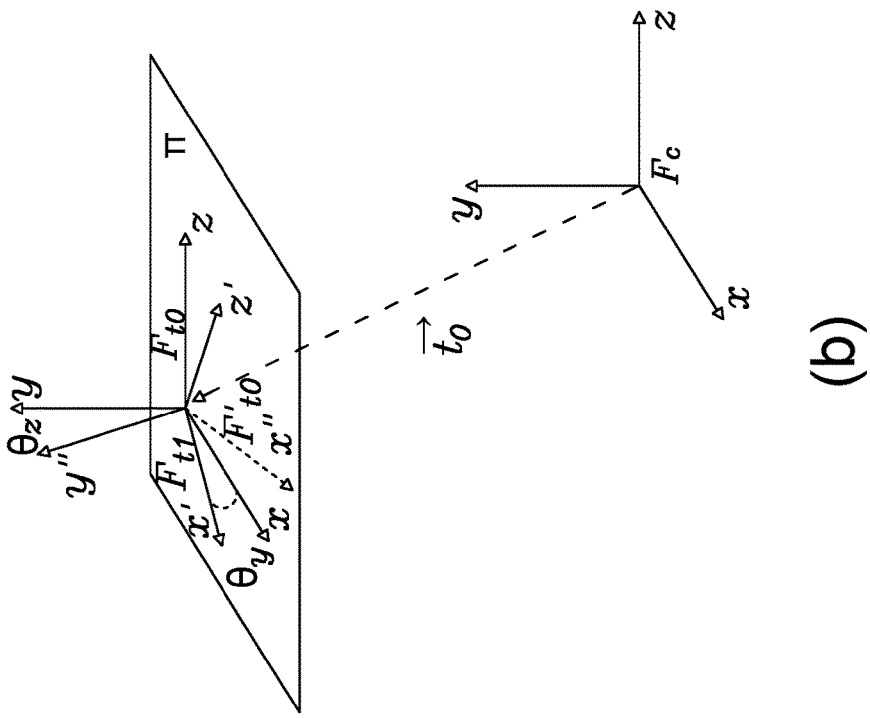
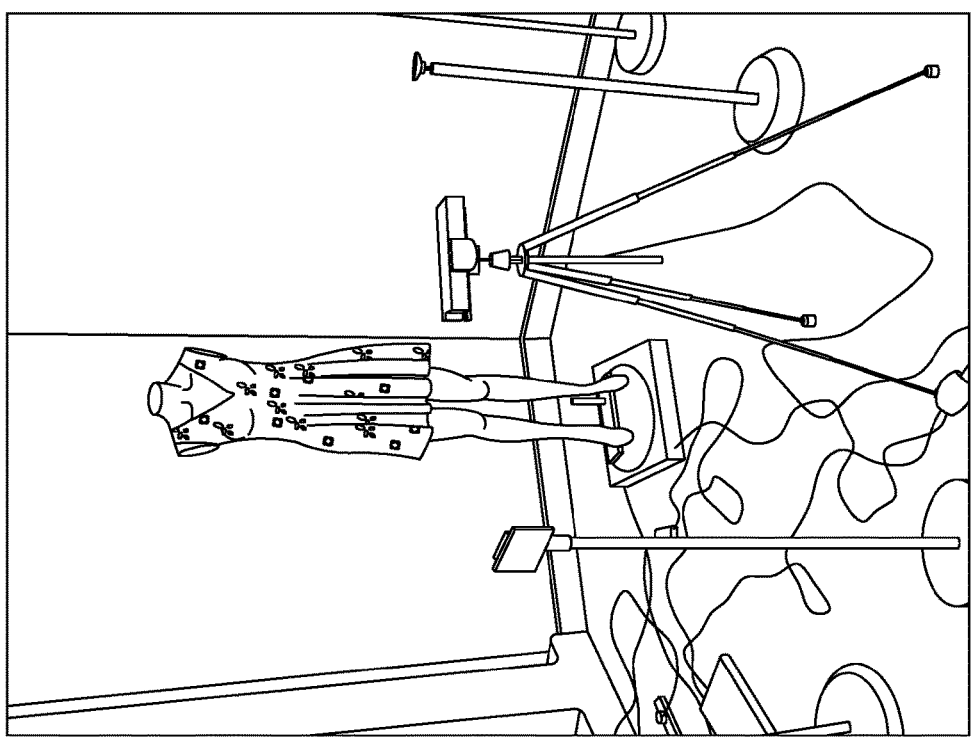
FIG. 13

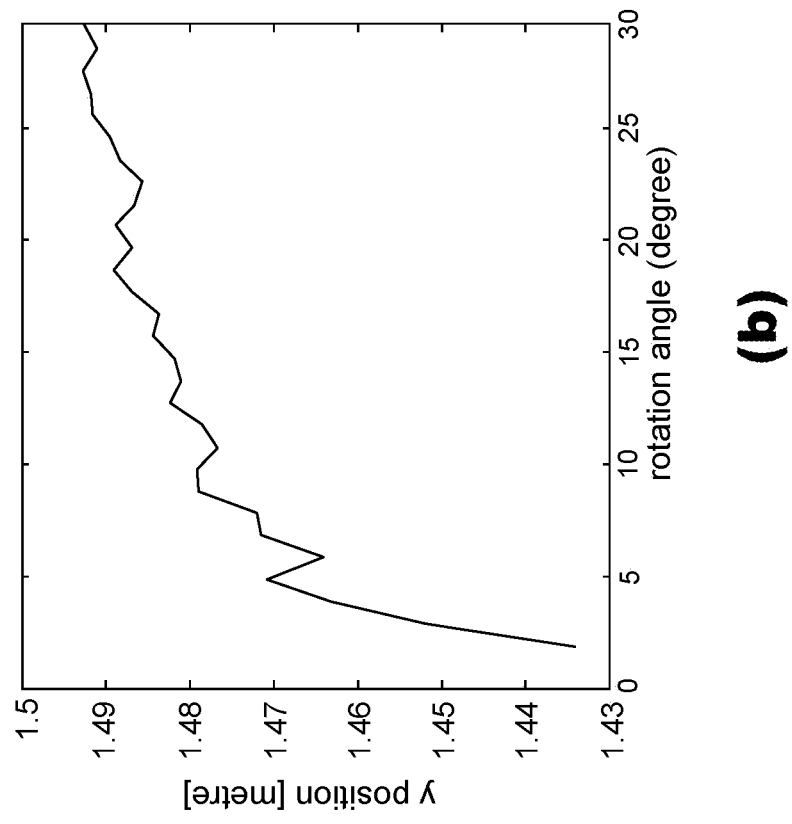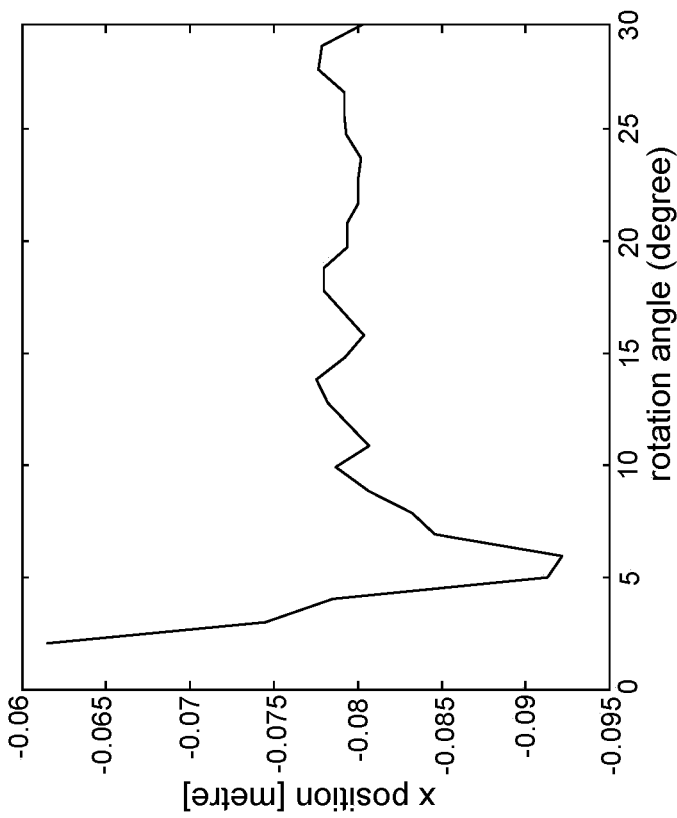
FIG. 14

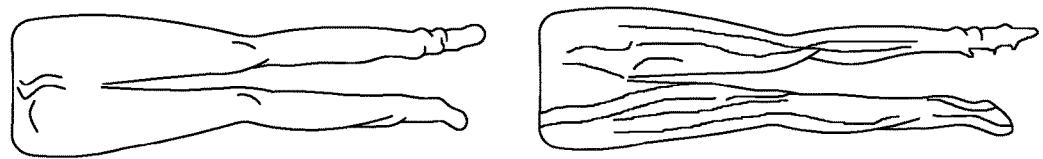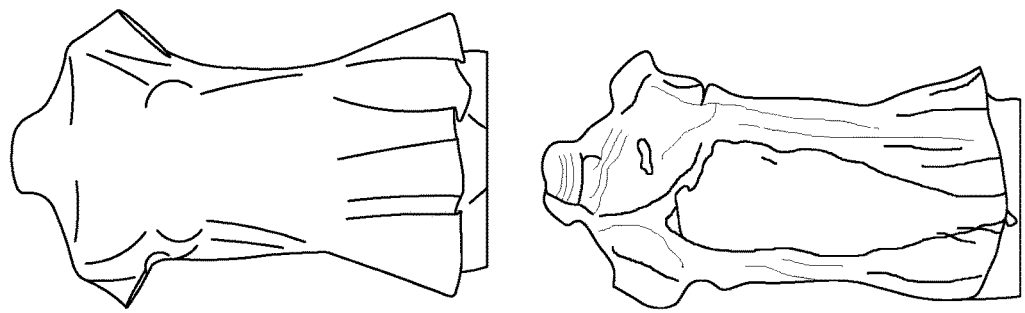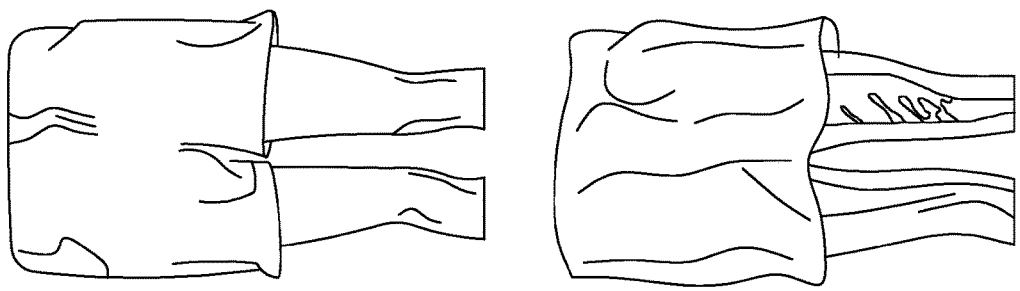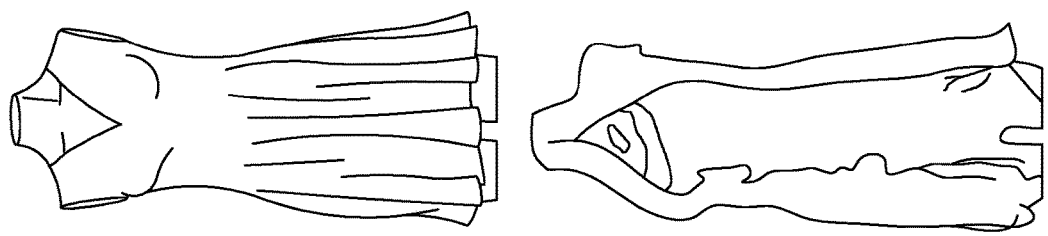
(a) (b)
FIG. 16

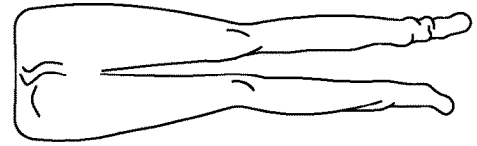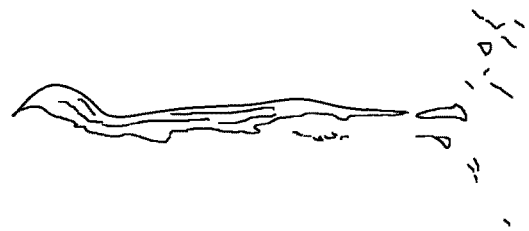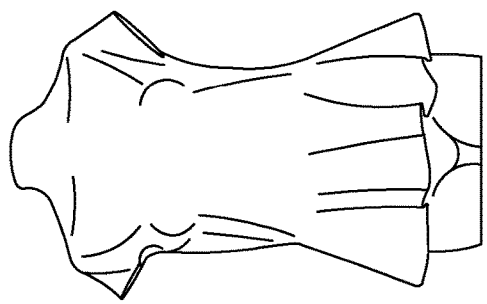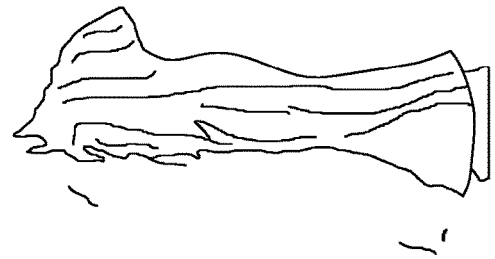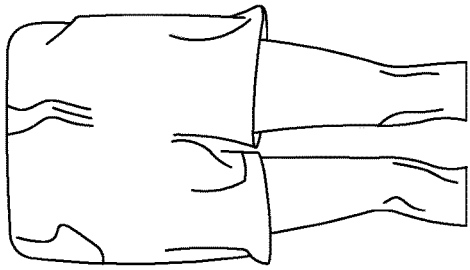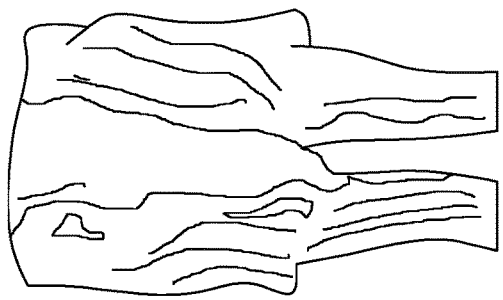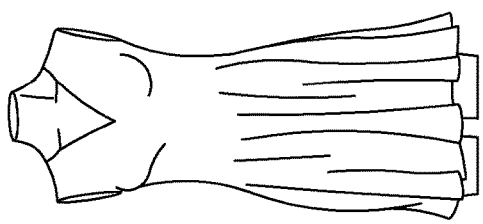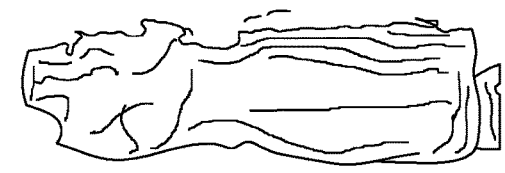
(a) (b)
FIG. 17

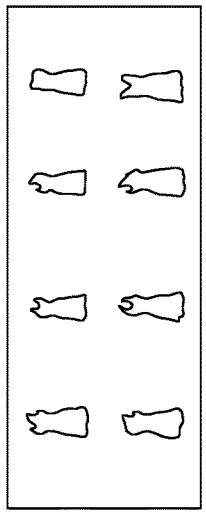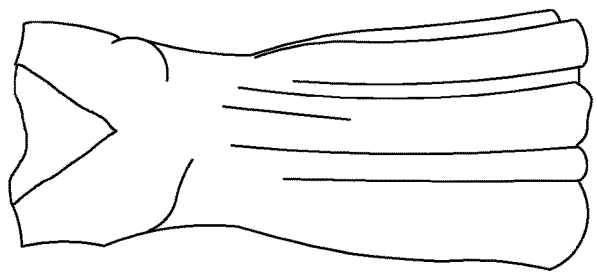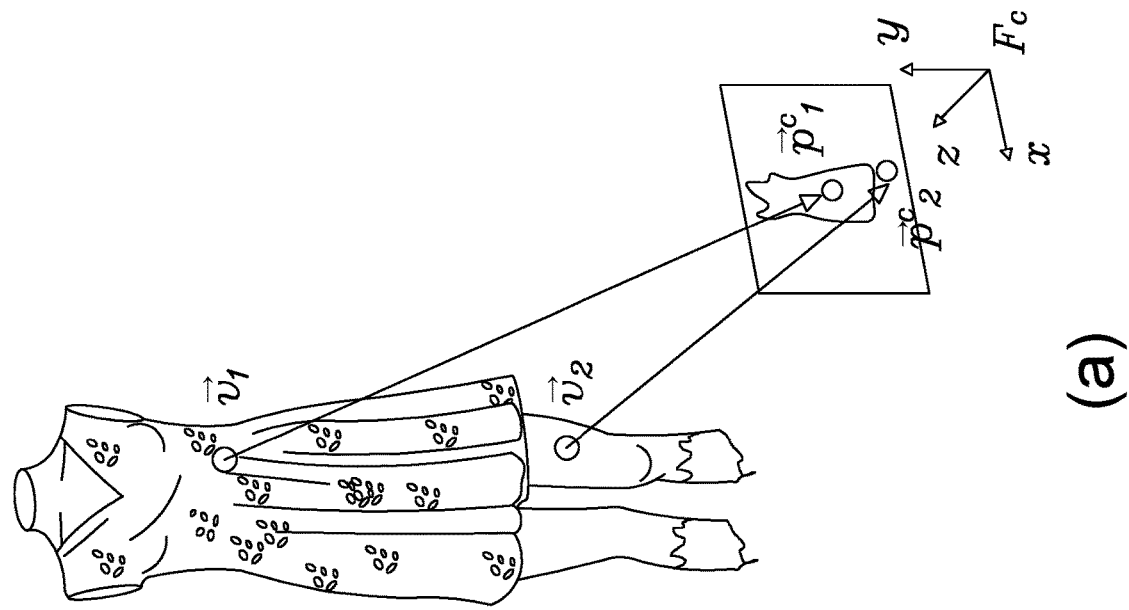
FIG. 18

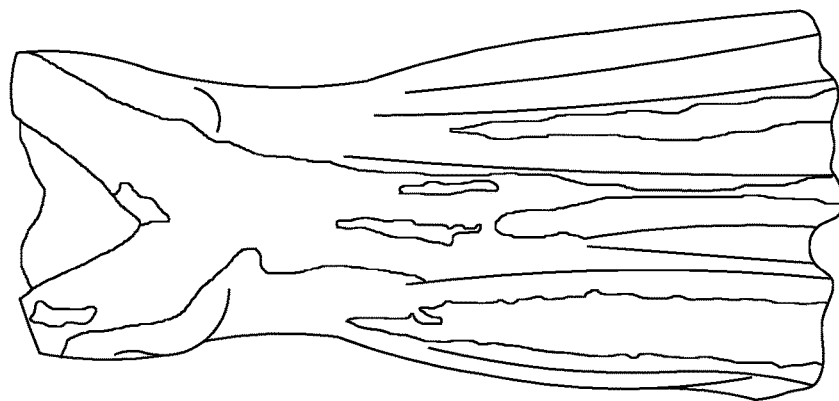
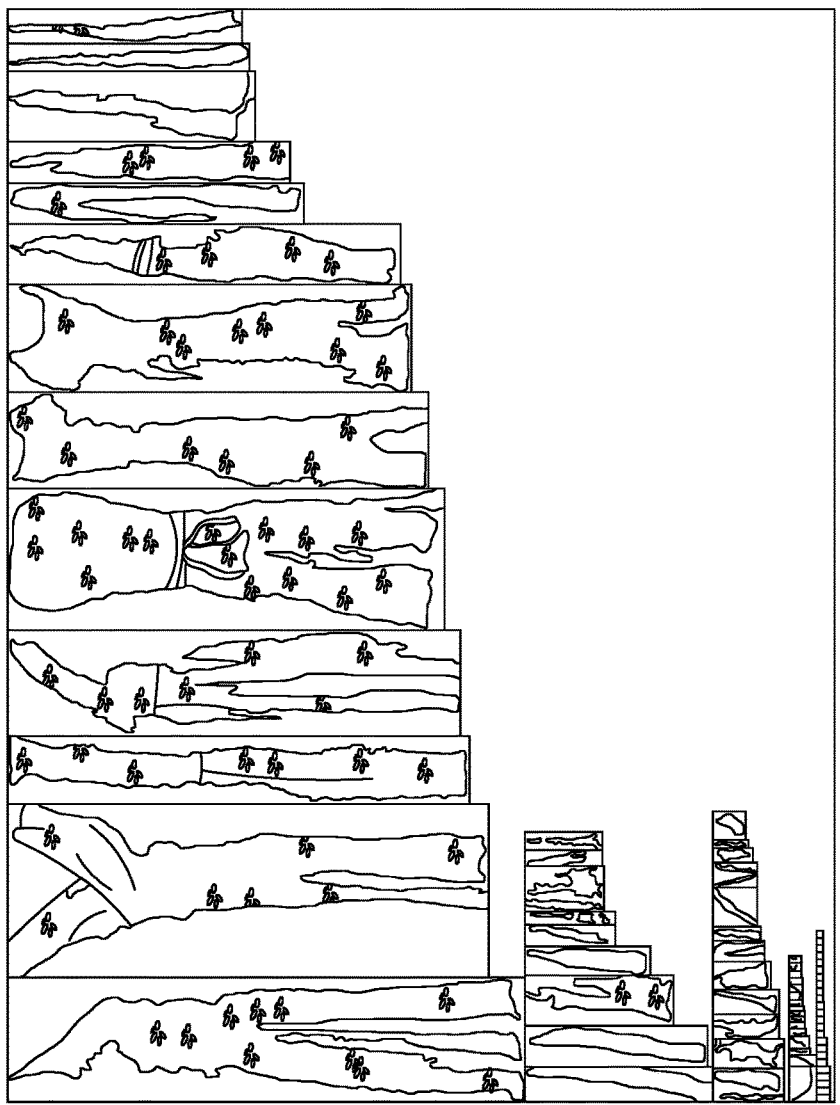
FIG. 19

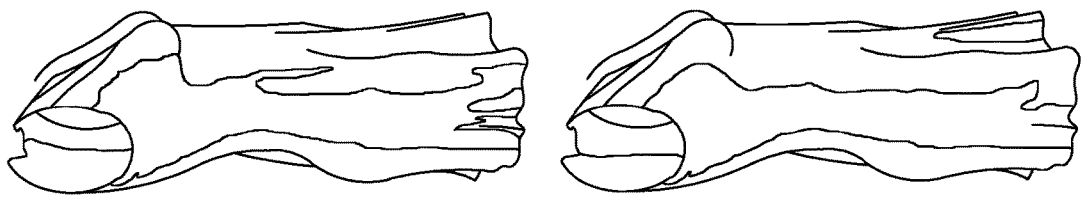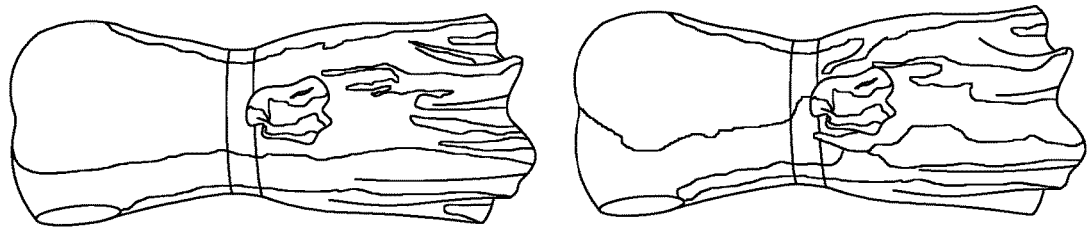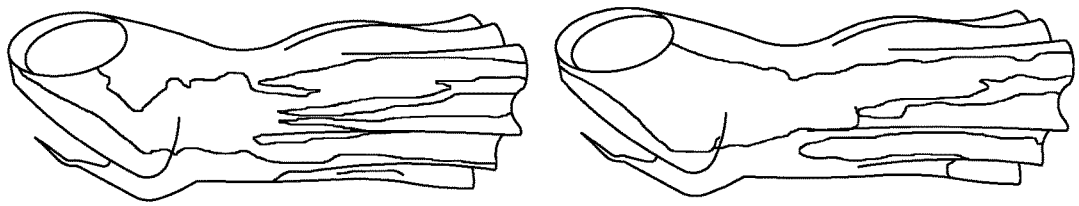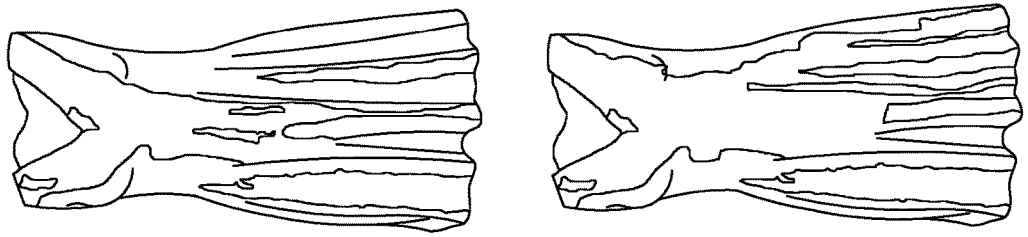
(a)　(b)
FIG. 21

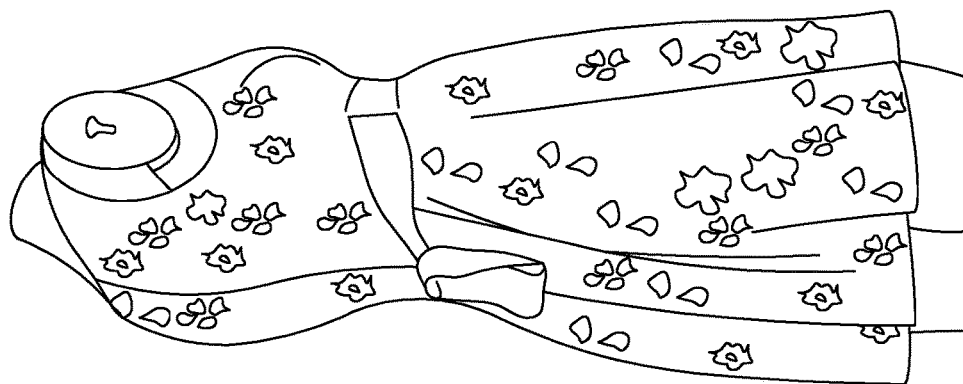
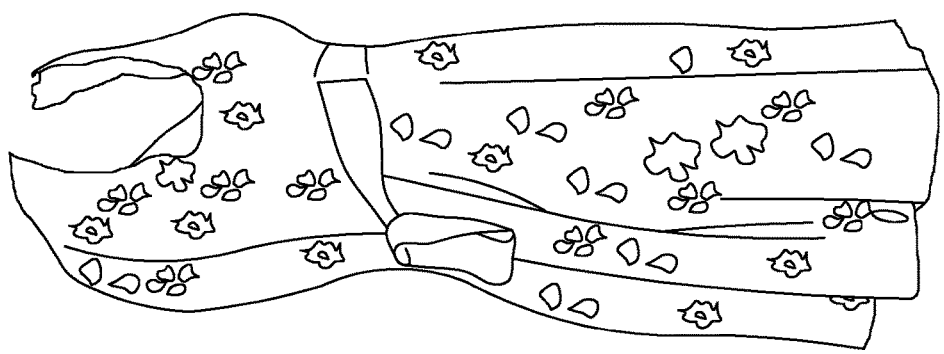
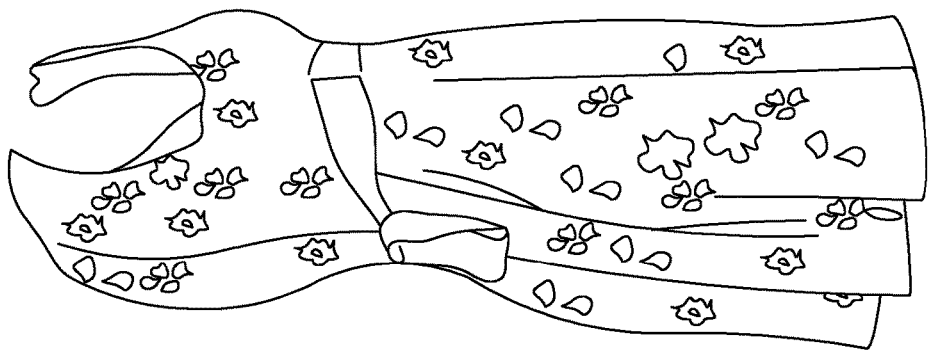
FIG. 22

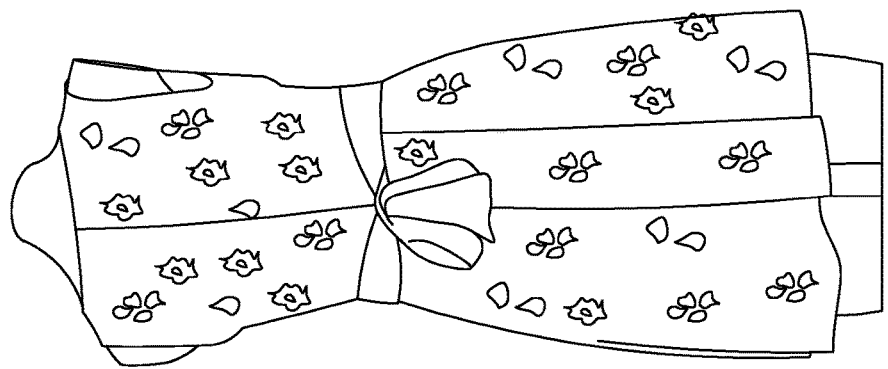
(c)
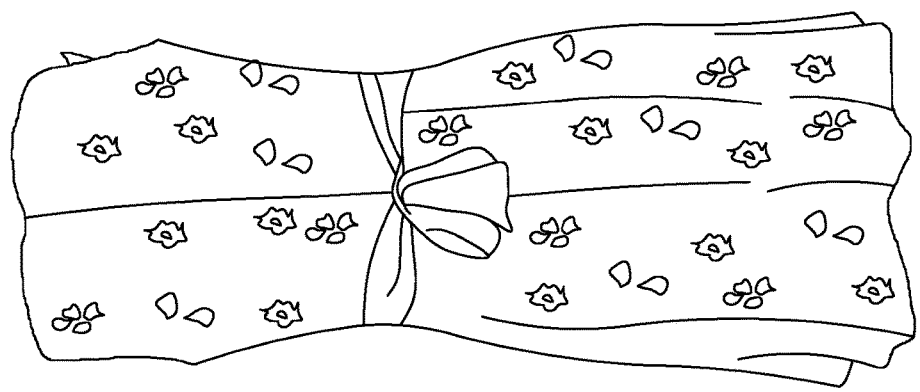
(b)
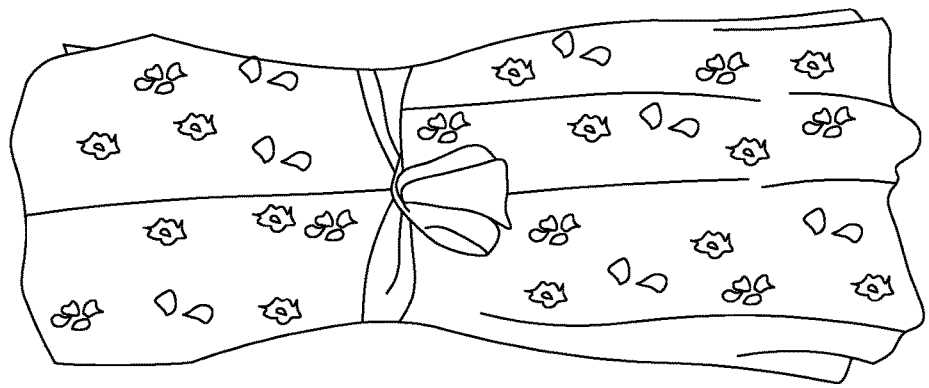
(a)
FIG. 23

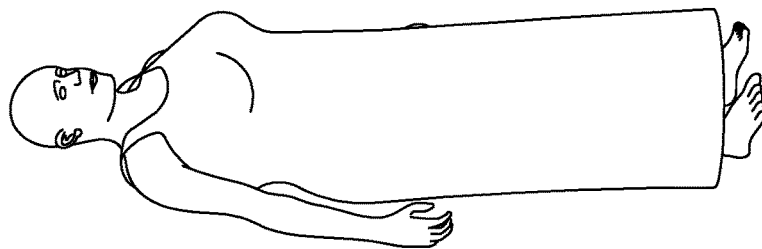
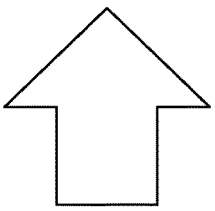
physics simulation
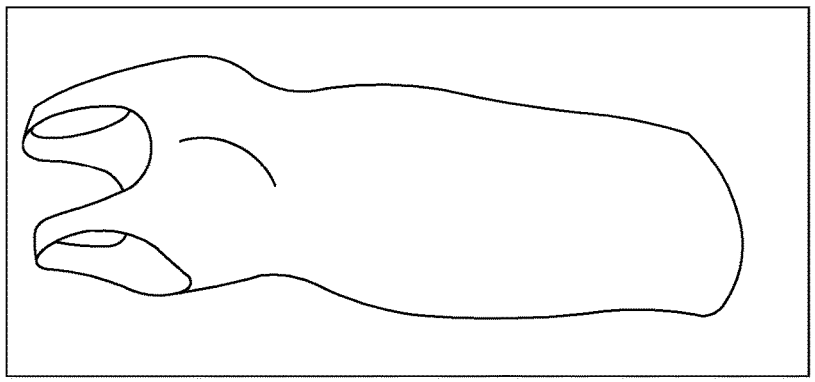
3D garment model
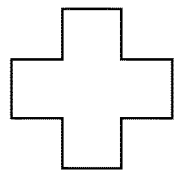
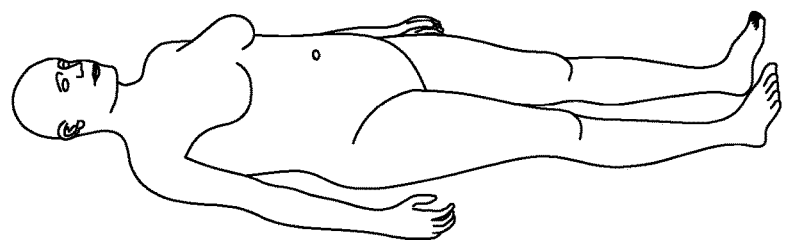
3D body model
FIG. 24

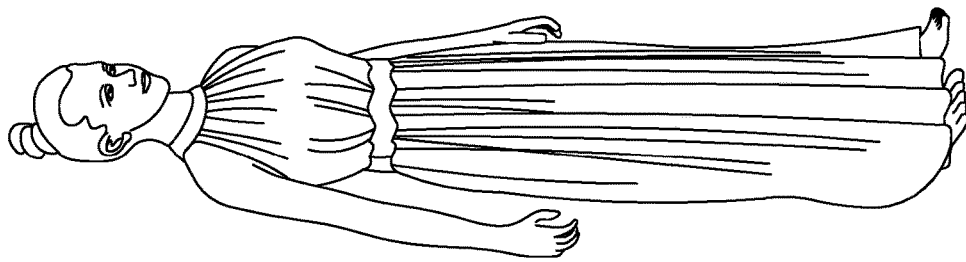
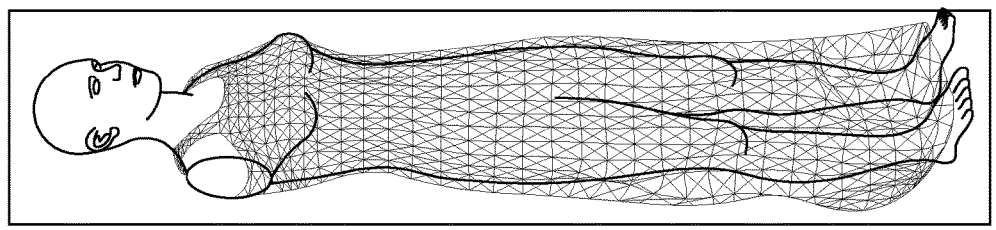
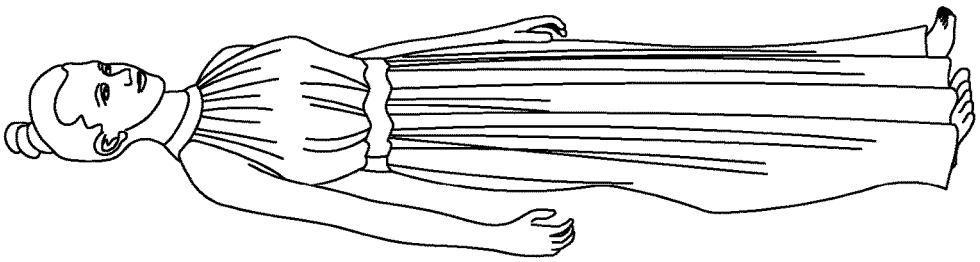
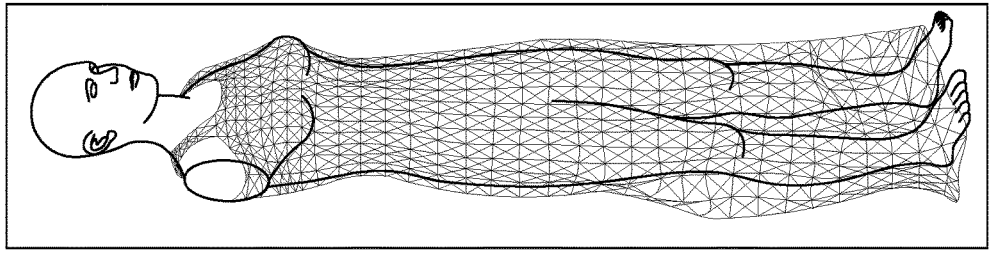
FIG. 25

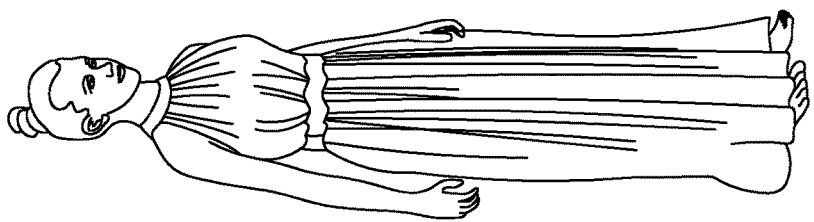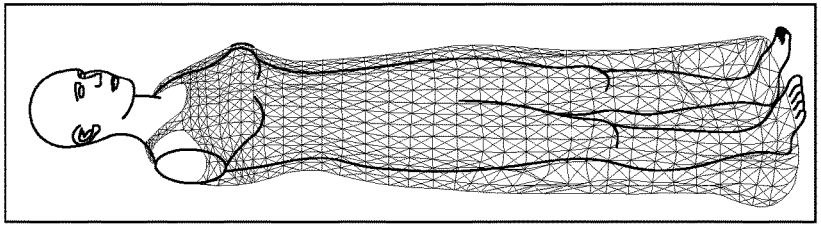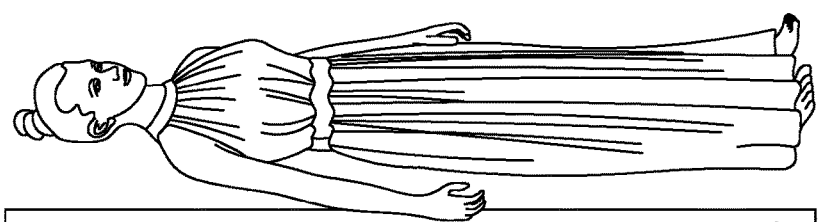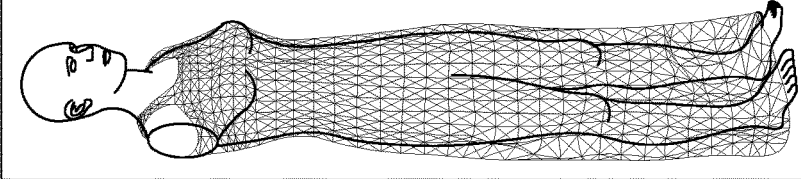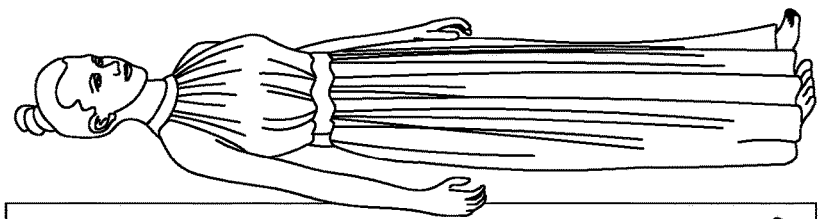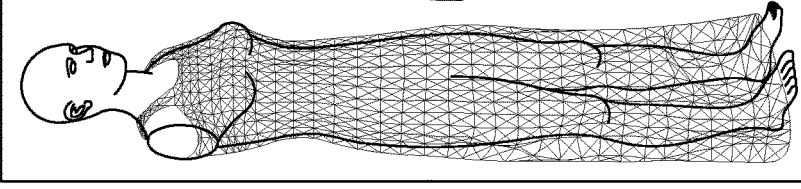
FIG. 26

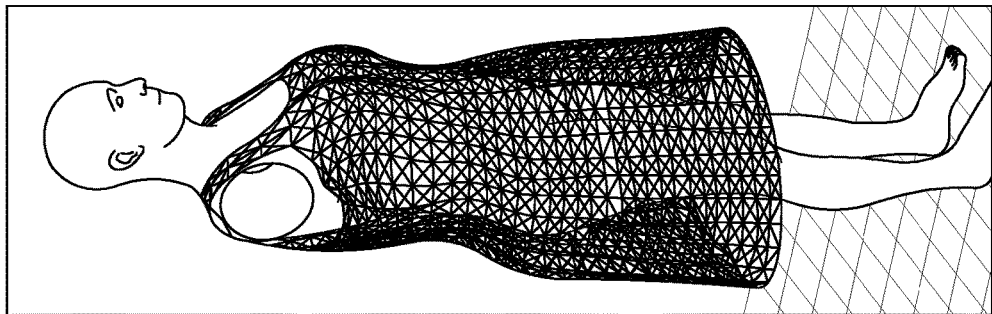
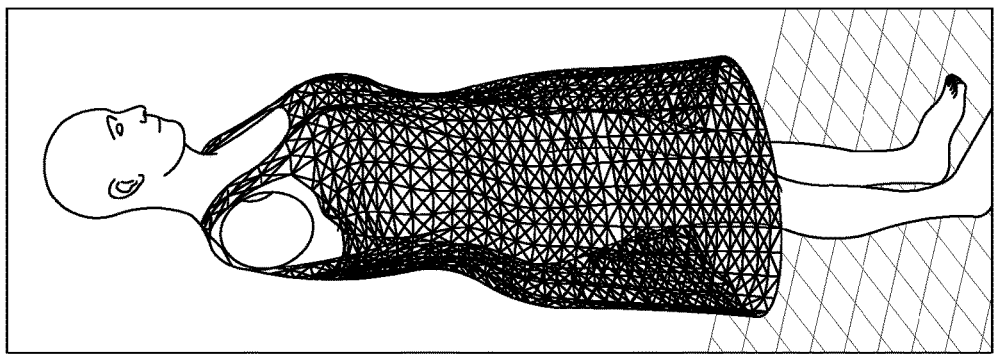
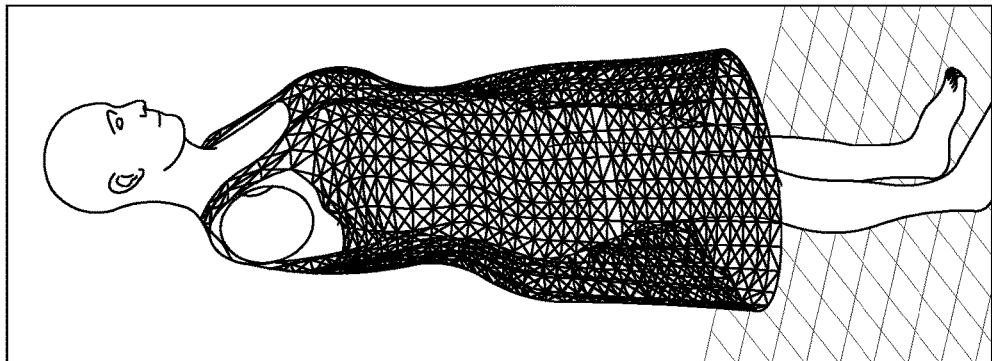
FIG. 27

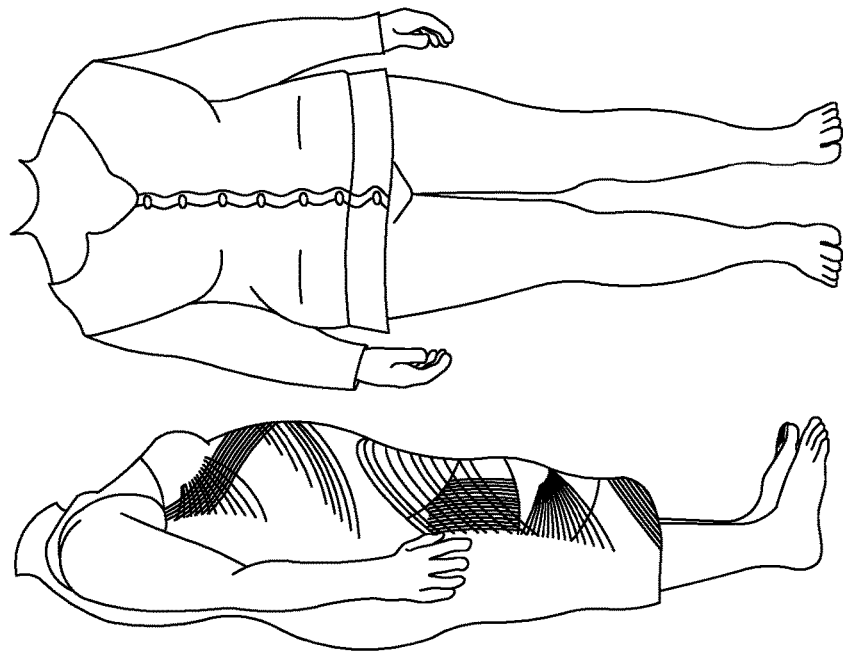
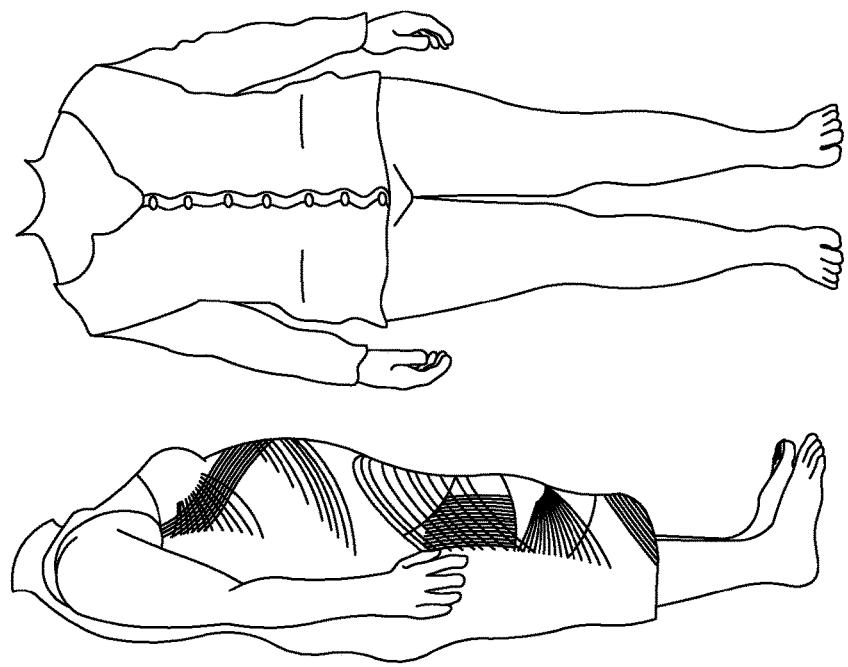
FIG. 29

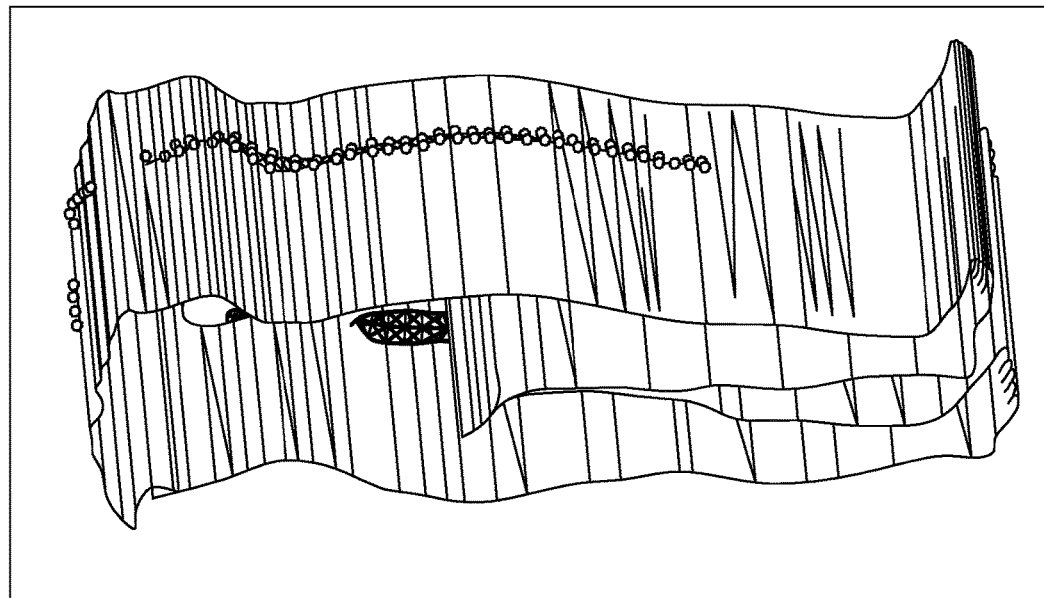
(b)
FIG. 31
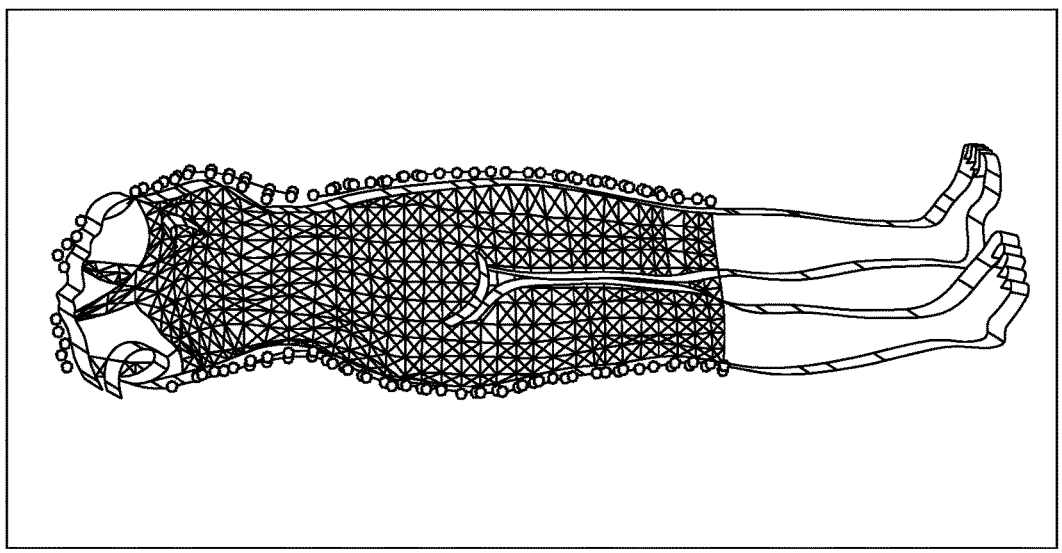
(a)

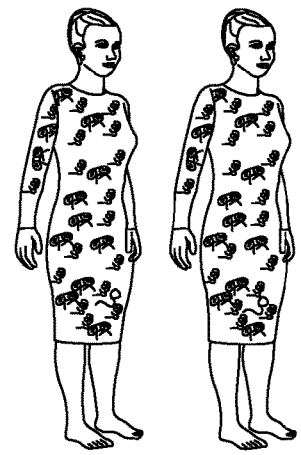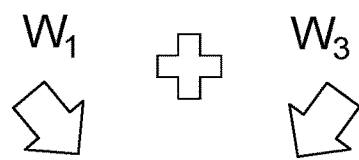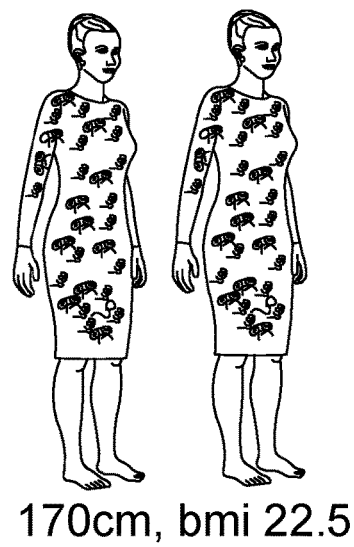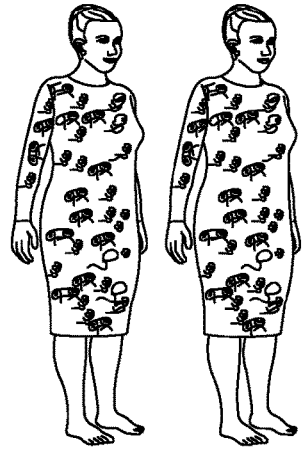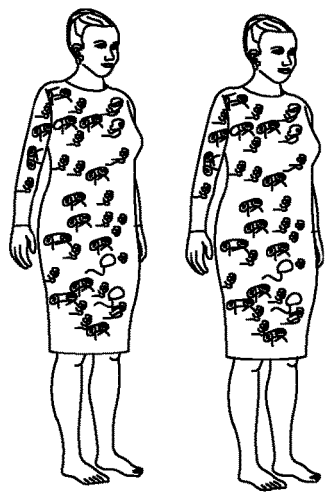
155cm, bmi 22.5         170cm, bmi 22.5
155cm, bmi 30           170cm, bmi 30
FIG. 33

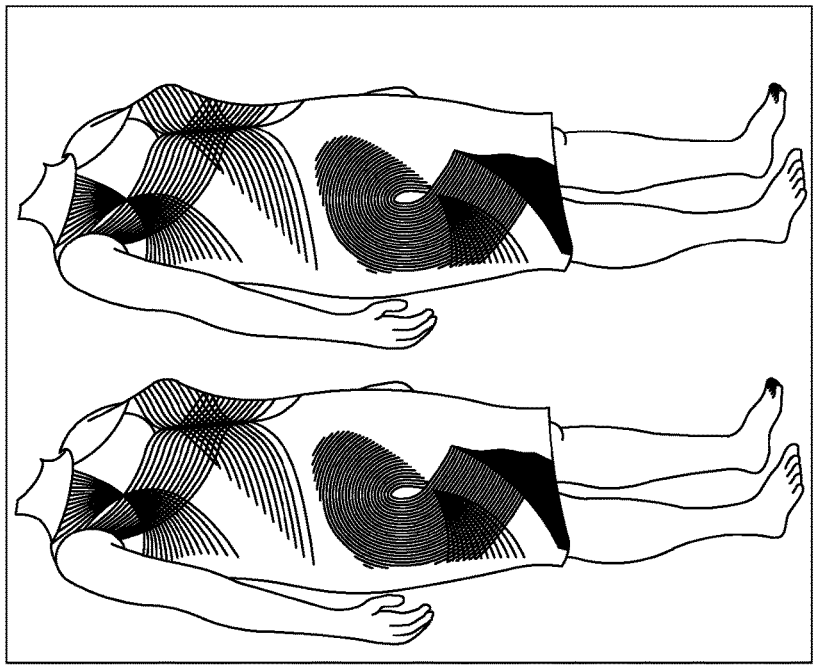
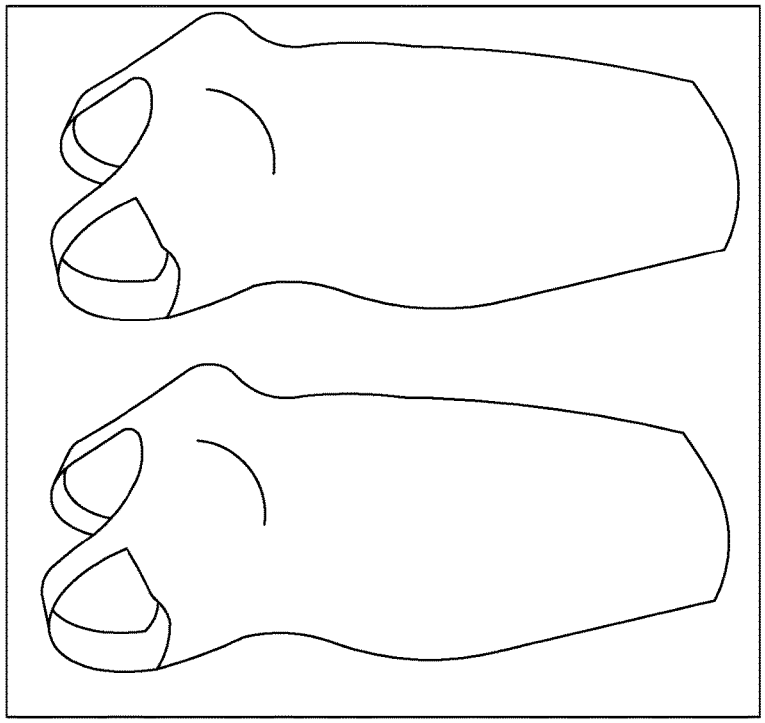
FIG. 36

Algorithm 1: The algorithm for garment model extraction, as described in Section 4.3.1.

Input: $V_{init}, t_k, t_f, S^c, R^c$
Output: $V_g$ 1. for $i := 0$ to $|V_{init}|$ do
2.   for $k := 0$ to $t_k$ do
3.     if $(\vec{v_i} \in S_k^c) \& (f_{conf}(\vec{v_i}) > t_f)$ then
4.       if $\vec{v_i} \notin R_k^c$ then
5.         $r := $ false;
6.         break;
7.       else
8.         $r := $ true;
9.       end
10.     end
11.   end
12.   if $r$ then
13.     $V_g \leftarrow v_i$
14.   end
15. end

FIG. 37

Algorithm 2: The algorithm for iterative noise removal, as described in section 4.3.1.

Input: $M_{init}, t_i, t_s, t_h$
Output: $M_g$
1. $M_g := M_{init}$;
2. for $i := 0$ to $t_i$ do
3.    identify connected components in $M_g$;
4.    add all connected components to a queue Q;
5.    sort Q by the size in a descending order;
6.    while $|Q| > 0$ do
7.      $c = $ Q.pop();
8.      if $|c| > t_s$ then
9.        break;
10.     else
11.       collect a histogram of IDs of $N(c)$;
12.       find max ID;
13.       if $|h(max_{ID})| > t_h$ then
14.         swap ID of c with $max_{ID}$;
15.         update $N(c)$;
16.       end
17.     end
18.   end
19. end

FIG. 38

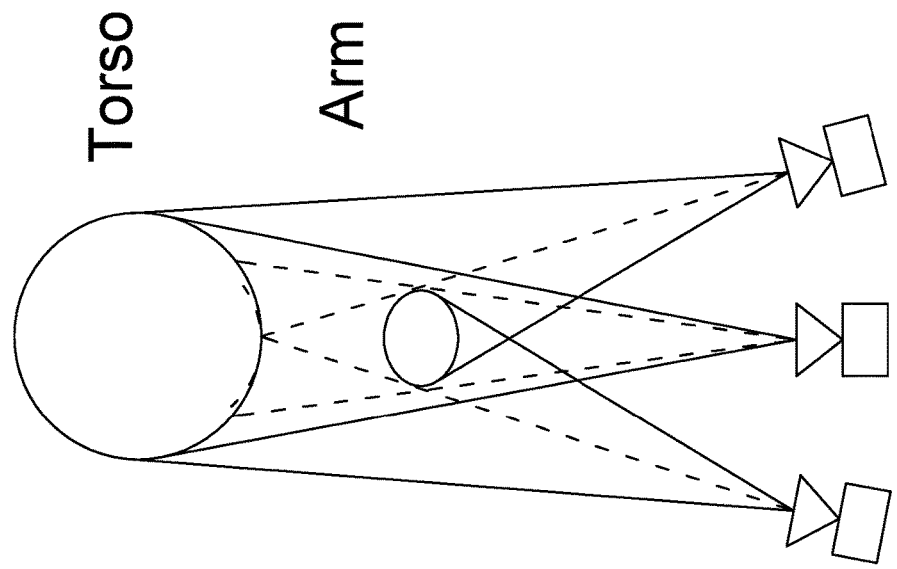
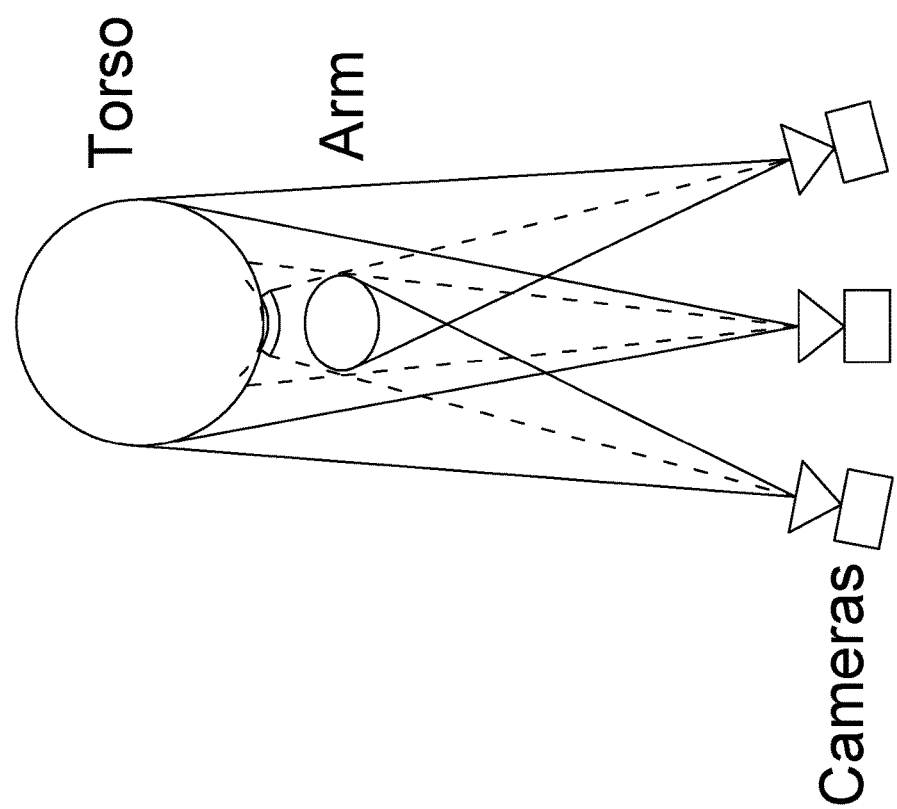
FIG. 40

METHOD AND SYSTEM FOR GENERATING AN IMAGE FILE OF A 3D GARMENT MODEL ON A 3D BODY MODEL

CROSS-REFERENCE TO RELATED APPLICATIONS

This application is a continuation of U.S. application Ser. No. 15/752,683, filed on Feb. 14, 2018, which claims the priority of PCT/GB2016/052526, filed on Aug. 15, 2016, which claims priority to GB Applications No. GB1514447.0, filed on Aug. 14, 2015; and GB1601084.5, filed on Jan. 20, 2016, the entire contents of each of which being fully incorporated herein by reference

BACKGROUND OF THE INVENTION

1. Field of the Invention

The field of the invention relates to methods, systems and computer program products for generating an image file of a high resolution 3D garment model on a 3D body model.

2. Technical Background

Benefits of online shopping include being able to shop when regular stores are closed, being able to view merchandise which may only be present in a very distant store, and being able to compare the merchandise of many stores relatively quickly, certainly more quickly than when visiting many stores in person. Hence the convenience of online shopping is well established.

But problems may still be encountered by the merchant when displaying garments in an online fitting room to a user. For many garments, users are very sensitive to the look they will project if they purchase and wear a garment. For example, a user may wish to project a fashionable look. Therefore in an online fitting room, there is a need to provide a high quality rendering of a garment on a body model, to convince a purchaser to purchase the garment. And in particular, it is very challenging to render a textured garment, especially one with a complex texture, on a body model in a way which renders the texture with sufficiently high quality so as not to deter a purchaser from purchasing the garment, but rather which encourages a purchaser to purchase the garment. Furthermore, a textured garment may look different on different sized people. Hence a reliable rendering of a textured garment over a wide range of body model sizes is desirable, so that a wide range of users may see realistically the look of the textured garment when worn on their own body model. Any technically acceptable solution should render the garment image sufficiently quickly so that a user does not lose patience with the virtual fitting room, and without requiring computing hardware that would be prohibitively expensive in relation to the expected sales revenue of the garments being offered for sale. Therefore there is a need for a method and system which overcomes this technical problem.

This patent specification describes not only various ideas and functions, but also their creative expression. A portion of the disclosure of this patent document therefore contains material to which a claim for copyright is made and notice is hereby given: © Metail Limited (e.g. pursuant to 17 U.S.C. 401). A claim to copyright protection is made to all protectable expression associated with the examples of the invention illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

3. Discussion of Related Art

WO2012110828A1 discloses methods for generating and sharing a virtual body model of a person, created with a small number of measurements and a single photograph, combined with one or more images of garments. The virtual body model represents a realistic representation of the users body and is used for visualizing photo-realistic fit visualizations of garments, hairstyles, make-up, and/or other accessories. The virtual garments are created from layers based on photographs of real garment from multiple angles. Furthermore the virtual body model is used in multiple embodiments of manual and automatic garment, make-up, and, hairstyle recommendations, such as, from channels, friends, and fashion entities. The virtual body model is sharable for, as example, visualization and comments on looks. Furthermore it is also used for enabling users to buy garments that fit other users, suitable for gifts or similar. The implementation can also be used in peer-to-peer online sales where garments can be bought with the knowledge that the seller has a similar body shape and size as the user.

SUMMARY OF THE INVENTION

According to a first aspect of the invention, there is provided a method of generating an image file of a high resolution 3D garment model on a 3D body model, the method comprising the steps of:

(i) acquiring at least three 2D images of a garment on a mannequin, wherein the at least three 2D images of the garment on the mannequin capture a 360° azimuthal angle range of view of the garment on the mannequin, including capturing a texture of the garment at high resolution;

(ii) creating a smooth and simplified 3D garment model using the at least three 2D images of the garment;

(iii) simulating the smooth and simplified 3D garment model on the 3D body model;

(iv) deforming and rendering the high-resolution garment texture on the simulated smooth and simplified 3D garment model on the 3D body model, and (v) generating an image file of the 3D body model, the image file including the deformed and rendered high-resolution garment texture, on the simulated smooth and simplified 3D garment model, on the 3D body model.

The image file may be a well-known format such as a jpeg, png, html or tiff. The image file may be transmitted to a user, via a communications network. The image file may be rendered on a user device, such as a mobile device such as a smartphone or a tablet computer, or on another device such as a laptop or a desktop computer. A processor may be configured to perform steps (i) to (v) of the method, or steps (ii) to (v) of the method.

An advantage of the method is that a high quality image file of the deformed and rendered high-resolution garment texture, on the simulated smooth and simplified 3D garment model, on the 3D body model, is produced. Therefore garment texture, especially a complex garment texture, may be reproduced at a high quality, in an image file, without requiring excessively long computing times, or prohibitively large computing resources.

The method may be one wherein the at least three 2D images of the garment on the mannequin are at least eight 2D images of the garment on the mannequin.

The method may be one in which the method includes: acquiring at least three depth scans of the garment on the mannequin, wherein the at least three depth scans of the garment on the mannequin capture a 360° azimuthal angle range of view of the garment on the mannequin, including capturing the texture of the garment at high resolution, and creating the smooth and simplified 3D garment model using the at least three depth scans of the garment.

The method may be one in which the at least three depth scans of the garment on the mannequin are at least eight depth scans of the garment on the mannequin.

The method may be one in which the smooth and simplified 3D garment model only captures a major shape variation of the garment, but not fine detail.

The method may be one in which in step (ii), a deformable 3D parametric template model is fitted simultaneously with multiple 2D image projections from different camera views.

The method may be one in which the smooth and simplified 3D geometry model for each garment is based on a template fitting algorithm.

The method may be one in which geometry and appearance 3D models of the garment are stored in a database.

The method may be one in which in step (ii), to create a smooth and simplified 3D garment model using the 2D images of the garment, the shape-from-silhouettes (SfS) approach is used.

The method may be one in which the shape-from-silhouette (SfS) problem is solved in a parametric template model fitting and shape registration framework.

The method may be one in which the shape-from-silhouette (SfS) problem is solved using the steps of:

(A) defining simple parametric models of various garment types;

(B) adjusting morph and pose parameters to roughly agree with all image silhouettes, and (C) locally deforming a mesh for better silhouette agreement.

The method may be one in which 3D morphable garment templates are defined for each typical garment type.

The method may be one in which each 3D morphable garment template comprises one base shape and K morph end points.

The method may be one in which an algorithm iterates between the following two steps: 1) updating the projection of the garment template in each camera view, and updating the associated silhouette vertex flags, and 2) deforming the template to fit the observed silhouettes of the garment texture images given the silhouette vertices of the garment template provided in 1) for each view.

The method may be one in which morphable models are only aimed to capture coarse dimensions of garment parts instead of very fine geometry details, so all morphs remain simple.

The method may be one in which when modelling complex garment types, the garment textures as well as the projection of a garment template of each viewpoint are separated into multiple depth layers by labeling the depth ordering of silhouettes and an internal discontinuity.

The method may be one in which a constrained physics simulation is performed, i.e. using a low level-of-detail simulation, to smoothly deform the garment so that it addresses the change of body shape.

The method may be one in which a gravity parameter is set to zero, or near to zero, in the constrained physics simulation to avoid a double-draping artifact.

The method may be one in which modelled garment draping is based on precomputing and interpolating explicit physics simulation results on a corpus of body samples.

The method may be one in which the mannequin is a retro-reflective mannequin.

The method may be one in which the mannequin is rotated on a turntable.

The method may be one in which garment texture is automatically segmented.

The method may be one in which a foreground of the garment texture is automatically segmented from the mannequin and a background using a graph-cut algorithm.

The method may be one in which additional 2D images of the garment on the mannequin are used, so as to acquire images of otherwise occluded parts of the garment.

The method may be one in which the mannequin is an abductible mannequin, which is arranged so that the at least three 2D images of a garment on a mannequin include no occluded outer parts of the garment, or a reduced amount of occluded outer parts of the garment.

The method may be one in which a texture mapping and deformation approach is provided that morphs the high-resolution 2D garment appearance model onto on a low-resolution 3D geometry model.

The method may be one in which a texture map for the garment model is created by stitching together texture images.

The method may be one in which the method focuses on digitising an approximate 3D garment geometry with a good quality texture map.

The method may be one in which the 3D body model is regressed from a user's body dimensions.

The method may be one in which 3D body model is a customised body shape.

The method may be one in which a 3D physics simulation of the garment model on the customised body shape is performed to model the geometric deformation.

The method may be one in which depth scan data is obtained from a depth sensor (e.g. Microsoft Kinect, Intel R200), or using stereo photos.

The method may be one in which depth scan data is obtained from a unified 3D scan.

The method may be one in which 3D garment digitisation is performed using an active depth sensor.

The method may be one in which the active depth sensor is Microsoft Kinect.

The method may be one in which movement of the mannequin is linearly approximated as a circular motion, from which an initial guess is estimated for Iterative Closest Point (ICP) optimisation.

The method may be one in which to minimise artifacts around stitching seams, the artifacts problem is converted to a problem of finding the optimal mesh segmentation and is solved using a multi-class graph-cut optimisation.

The method may be one in which multiple images of the garment when it is arranged on different objects, e.g. mannequins of different sizes, are captured to provide a series of different draping arrangements of the garment, and from multiple pairs of images, a low-dimensional shape variation model is derived to capture intrinsic garment behaviours caused by specific material properties, e.g. stretchiness, bendiness, friction.

According to a second aspect of the invention, there is provided a system for generating an image file of a high resolution 3D garment model on a 3D body model, the system comprising a camera, a mannequin and a processor, wherein the camera is configured to acquire at least three 2D images of a garment on the mannequin, wherein the at least three 2D images of the garment on the mannequin capture a 360° azimuthal angle range of view of the garment on the mannequin, including capturing a texture of the garment at high resolution, and wherein the processor is configured to:

(i) create a smooth and simplified 3D garment model using the at least three 2D images of the garment;

(ii) simulate the smooth and simplified 3D garment model on the 3D body model;

(iii) deform and render the high-resolution garment texture on the simulated smooth and simplified 3D garment model on the 3D body model, and (iv) generate an image file of the 3D body model, the image file including the deformed and rendered high-resolution garment texture, on the simulated smooth and simplified 3D garment model, on the 3D body model.

The system may be one wherein the processor is arranged to store the at least three 2D images of the garment on the mannequin, and to store the generated image file.

The system configured to perform a method of any aspect of the first aspect of the invention.

According to a third aspect of the invention, there is provided a computer program product for generating an image file of a high resolution 3D garment model on a 3D body model, in which at least three 2D images of a garment on a mannequin have been acquired, wherein the at least three 2D images of the garment on the mannequin capture a 360° azimuthal angle range of view of the garment on the mannequin, including capturing a texture of the garment at high resolution;

wherein the computer program product is executable on a processor to:

(i) create a smooth and simplified 3D garment model using the at least three 2D images of the garment;

(ii) simulate the smooth and simplified 3D garment model on the 3D body model;

(iii) deform and render the high-resolution garment texture on the simulated smooth and simplified 3D garment model on the 3D body model, and (iv) generate an image file of the 3D body model, the image file including the deformed and rendered high-resolution garment texture, on the simulated smooth and simplified 3D garment model, on the 3D body model.

The computer program product may be configured to perform a method of any aspect of the first aspect of the invention.

According to a fourth aspect of the invention, there is provided a method of creating a high quality texture map of a garment by stitching together multiple high definition (HD) images of the garment from a depth sensor, wherein the garment is on a mannequin and the mannequin is rotated on a turntable, under the control of a control unit, while the HD images are obtained from the depth sensor, which is under the control of the control unit.

The method may be one wherein the depth sensor is a Kinect.

The method may be one wherein to extract a garment model from an initial reconstruction, an algorithm using garment masks at a plurality different viewing positions is used.

The method may be one wherein to extract a true garment model, only confidently visible vertices are used.

The method may be one wherein to minimise visual artifacts, a boundary between segments is defined at a place where the colour difference is minimal.

The method may be one further comprising a method of any aspect of the first aspect of the invention.

According to a fifth aspect of the invention, there is provided a computer program product, executable on a processor to perform a method of any aspect of the fourth aspect of the invention.

According to a sixth aspect of the invention, there is provided a method of garment texture morphing based on 2D physics simulation, in which a silhouette of a garment is deformed on a collision obstacle formed by a projection of a body model in a corresponding camera view.

The method may be one wherein the aforementioned 2D physics simulation is solved with a 3D physical engine by building an equivalent 3D physics system.

The method may be one in which a collision obstacle of a viewing cone is created based on the silhouette of the body model in a given camera view with a peak at the camera view center.

The method may be one in which in this 2D physics simulation, only those mass nodes that correspond to those mesh vertices lying on the silhouette of the initial garment model are interacting with the collision cone which has been generated.

The method may be one in which a prior global smoothness of the shape of the standard simulation result is encoded to all mass nodes being simulated in the 2D view-based simulation scenario.

The method may be one further comprising a method of any aspect of the first or fourth aspects of the invention.

According to a seventh aspect of the invention, there is provided a computer program product, executable on a processor to perform a method of any aspect of the sixth aspect of the invention.

According to an eighth aspect of the invention, there is provided a method of using efficient caching and approximation strategies to reduce execution of explicit garment simulations at run-time, comprising the steps of:

(i) first pre-computing a deformation of a garment on a finite number of body shapes that are sampled from the human population, and storing these simulation results in a database;

(ii) for a specified body shape, generating an approximate garment deformation on the specified body shape by interpolating or extrapolating the pre-computed garment simulation results stored in the database on nearby sample body shapes to the specified body shape.

The method may be one comprising the steps of, for each garment:

(a) pre-computing explicit physics simulations of the garment on a finite number of body shapes;

(b) storing the 2D texture morph fields of each garment layer and camera view (usually represented as rectangular grids) based on the physics simulations;

(c) interpolating the garment morph for the specified body shape from examples (usually in a weighted-average manner) at rendering time.

The method may be one in which the physics simulations are 3D physics simulations.

The method may be one wherein interpolated texture morph fields are used directly to warp garment textures for a final rendering and garment texture composition for outfitting.

The method may be one wherein a piecewise bilinear interpolation is applied to generate approximate 2D garment morph fields from four nearby pre-computed texture morph samples, at rendering time.

The method may be one wherein a multi-dimensional piecewise linear interpolation defined on K-different measurement dimensions is applied to generate approximate 2D garment morph fields.

The method may be one further comprising a method of any aspect of the first, fourth or sixth aspects of the invention.

According to a ninth aspect of the invention, there is provided a computer program product, executable on a processor to perform a method of any aspect of the eighth aspect of the invention.

According to a tenth aspect of the invention, there is provided a method of automatically inferring the material attributes of a garment by capturing multiple photos of the garment when it is arranged on different objects, e.g. mannequins of different sizes, to provide a series of different draping arrangements of the garment, then from the multiple images, deriving a low-dimensional shape variation model to capture the intrinsic garment behaviours caused by specific material properties, wherein the captured garment behaviours caused by the specific material properties include one or more of stretchiness, bendiness, or friction.

BRIEF DESCRIPTION OF THE FIGURES

Aspects of the invention will now be described, by way of example(s), with reference to the following Figures, in which:

FIG. 1: An example of an online fitting room user interface in [1], as described in Section 1.

FIG. 7: Examples of landmarks for template fitting. (a) Landmarks defined on the garment template and texture images, (b) Contrast of fitting result with and without landmarks.

FIG. 8: An illustration example of depth labels for a sleeved garment in the profile view relating to description in Section 3.1.4.

FIG. 11: Example results of garment model creation of different garment types using approaches relating to description in Section 3. Left: the silhouette of the created garment model in contrast with the silhouettes of texture images in 8 camera views. Right: the 3D garment model generated by the provided algorithm.

FIG. 12: An example of KF reconstruction, as mentioned in Section 4.1: (a) actual garment image captured at a starting camera position; (b) rendered colour images using a model; (c) 3D geometry of (a) reconstructed by a default KF.

FIG. 13: An example of a system configuration for Guided Kinect Fusion (GKF), as described in Section 4.2.1: (a) actual system configuration; (b) the coordinate systems used in modelling camera geometry, where the basis vectors x″ and y″ represent a rotation from the reference coordinate system whilst the basis vectors x′ and z′ represent a tilting of a mannequin.

FIG. 14: An example of an estimated $\vec{t}_0$ obtained in the camera calibration process for starting the guided depth fusion (Section 4.2.3): (a) $t_x$ of $\vec{t}_0$; (b) $t_y$ of $\vec{t}_0$ with respect to rotation angle $\theta_y$.

FIG. 16: Example reconstructions of four different garments at 3 rpm: reconstructions of GKF (our approach) (a) and KF (b).

FIG. 17: Example reconstructions of four different garments at 5 rpm: reconstructions of GKF (our approach) (a) and KF (b).

FIG. 18: An example of an extracted garment model relating to description in Section 4.3.1: (a) visibility test based on a garment mask obtained at $F^c$; (b) example of garment masks from 8 viewing positions; (c) an extracted garment model from Algorithm 2.

FIG. 19: An example of initial segmentation from Algorithm 2: (a) combined texture patches; (b) initial segmentation.

FIG. 21: An example of initial segmentation (a) and optimised segmentation (b) obtained using the method described in Section 4.3.4.

FIG. 22: A rendering example of a 3D garment scan obtained using the techniques described in Section 4: (a) after the optimisation (note the difference around creases); (b) before the optimisation; (c) actual image from Kinect.

FIG. 23: Rendering example of a final 3D garment obtained using the techniques described in Section 4 at a different camera view: (a) after the optimisation (note the difference around knots); (b) before the optimisation; (c) actual image from Kinect.

FIG. 24: Schematic example of modelling the garment fit using physics simulation.

FIG. 25: An example of modelling a dress with variable stiffness in a ground-touching scene as mentioned in Section 5.1.

FIG. 26: An example of simulating different sizes of a garment by applying different natural lengths of the springs in the spring-mass network, as mentioned in Section 5.1. We simulate the garment size 10, 12, 14 on the same body shape (about size 12) resulting in different fit styles. The garment is scaled anisotropically on different body parts according to the definitions of a Tesco size grading chart. For each garment size, we show the result of physical simulation on the left and final visualisation on the right.

FIG. 27: An example of simulating different level of details by controlling the smoothness weight using the approach described in Section 5.2.

FIG. 29: Examples, contrasting the results from different approaches to texture deformation. Left: standard texture mapping, in which we can see an artifact around the garment silhouette and the armpits; Right: texture morphing by 2D physics simulation (our approach described in Section 6).

FIG. 31: An illustration example of a set up of 2D view-based physical simulation, as described in Section 6.2. (a) the spring mass network (larger spheres for interacting nodes, and smaller spheres for non-interacting nodes) and the collision cone segment (grey) of the body silhouette in the given camera view; (b) the physical system in an alternative viewpoint in 3D, in which the shape of the collision cone is more clear.

FIG. 33: An illustration example of applying a piecewise bilinear interpolation to generate approximate 2D garment texture morphs from the four nearby pre-computed samples, as described in Section 7.2.

FIG. 36: Example qualitative results of a dress on an example body shape obtained by interpolation of pre-simulated garment models using the approaches described in Section 7.1 (right), in contrast with results obtained by performing explicit simulation (left).

FIG. 37: Algorithm 1.

FIG. 38: Algorithm 2.

FIG. 40: An example of using a combination of an abductible mannequin and a multi-camera system to resolve the issue of texture occlusion. The drawings present horizontal cross sections. Left: when the arm pose of the mannequin is low, there is a blind area on the torso behind the arm, where the texture is invisible to all the three cameras. Right: when the arm pose of mannequin is raised up, there is no blind area on the torso behind the arm, for the system of three cameras as a whole.

DETAILED DESCRIPTION

Figure 2:
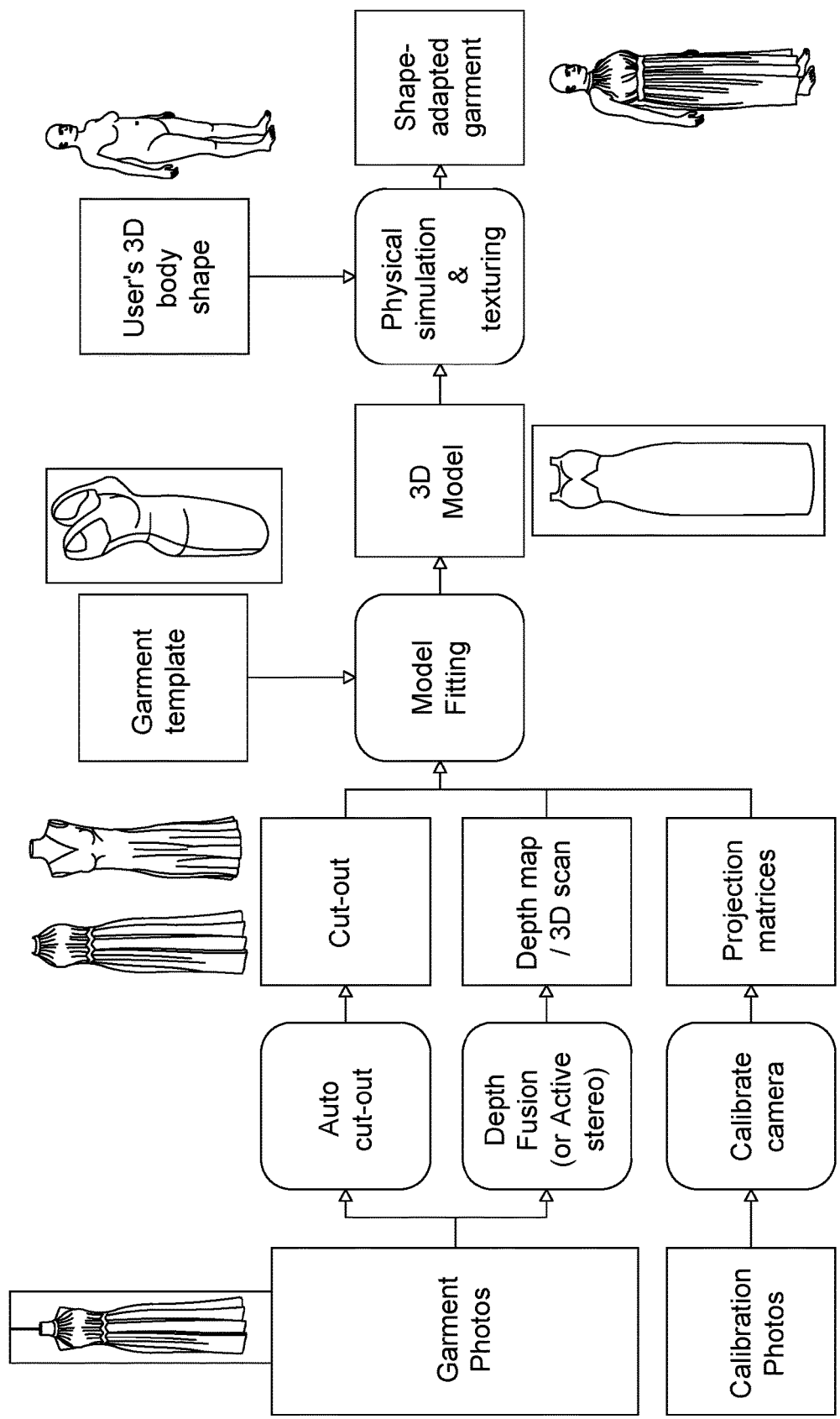
FIG. 2: A simplified high-level diagram example of an end-to-end system for 3D garment digitisation (including both shape-from-silhouette and depth-fusion), physics simulation, and visualisation, as described in Section 2.

This document describes solutions for automatic, scalable, and low-cost three dimensional (3D) garment digitisation. In an example system, the garment is photographed on a retro-reflective mannequin in a calibrated photography rig, followed by an automatic segmentation of the garment texture. The 3D model of the garment is then automatically created from: 1) 3D reconstruction from the silhouettes of the captured 2D images in multiple camera views, and/or 2) a fast 3D scanning solution based on a depth fusion guided by the circular motion constraint. The digitisation involves little manual intervention and hence is low cost. At run-time, the 3D garment model is deformed to a customised body shape using a constrained physics simulation, which is used to guide the deformation of a garment appearance model and generates a photo-realistic visualisation of an outfit on the user's body shape in an online-fitting room user interface.

1 Overview

It is a challenge for online clothes shoppers to understand how garments will look and fit once bought. The ramifications of this challenge have hindered the growth of online clothes shopping. An approach to help with this problem is to build up garment-modelling systems that will convert the garment into digital format, perform virtual simulation of how the garment interacts with and drapes on the body, and render the digital garment using computer graphics technology. As a commercial application, a user interface can be built on the garment-modelling system that allows the shopper to generate an image visualisation of a garment or outfit dressed on their own body shape (see e.g. FIG. 1), giving a virtual fitting room (VFR) experience [1].

Modelling the shape and texture of garments of various types is a non-trivial computing problem in general. Different garments can have very different topology, geometry, appearance, and fabric properties such as stiffness, stretchiness, weight, etc., which all contribute to the complexity of the problem. The mass market clothing industry is usually a low-profit-margin business, which adds practical constraints to approaches that aim for broad applicability. A virtual garment modelling system needs to address the following challenges:—

1. Limiting garment digitisation process costs, especially those which arise from a requirement for manual effort.

2. Accurate simulation of garment deformation with respect to body shapes, reflecting the way real garments hang.

3. Photo-realistic and high-definition visualisation of lighting and garment texture.

In this document, we describe novel computer-vision-based systems and approaches to address the three challenges above and achieve an automatic, scalable, and low-cost 3D garment digitisation.

In the context of computer vision and graphics, two main streams of approaches in garment and cloth modelling are: 1) simulation-based approaches, which perform physics simulations of the CAD design patterns of garments to model their deformation against different body shapes [9, 10, 11, 18, 28, 38], and 2) capture-based approaches, which recover the surface geometry of the cloth or the garment through 3D reconstruction and motion capture in real-time [5, 13, 20, 34, 36, 40].

In contrast to these approaches, we combine the features of both streams of study, and provide new computer-vision solutions for creating digital models of garments. Instead of using CAD design pattern, we rely solely on 2D images and/or depth scans of the garment as input which are captured in a calibrated photography rig made up of a camera, a turntable, a mannequin, and optionally, an additional low-cost depth camera.

We devised novel 3D data acquisition algorithms based on shape-from-silhouette and depth fusion, which create smooth and simplified 3D garment models automatically and cheaply from those 2D images and depth scans. The created 3D model only captures the major shape variation of the garment outline but not the fine detail. This approximation gives the approach generality of modelling a wide range of different garment types. We simulate the simplified and smooth 3D geometry model of the garment on the customised 3D body shape, then deform and render the high-resolution garment texture captured by the studio-standard photography. As a major advantage, this solution addresses both issues of digitisation cost and visualisation quality well. This solution brings a novel end-to-end working system, for automatic 3D garment digitisation, physical simulation, and visualisation (see Section 2 for the full details of the system).

Key technical innovations of the presented system include:

1. A two-stage 3D reconstruction framework in which we fit a deformable 3D parametric template model with multiple 2D image projections in different camera views simultaneously.

2. A novel solution for low-cost 3D scanning and depth fusion, which is compatible with a fast garment digitisation pipeline.

3. A novel physics simulation framework that allows controlling the level of details of the simulation by introducing the smoothness shape prior.

4. A texture mapping and deformation approach that morphs the high-resolution 2D garment appearance model based on a low-resolution 3D geometry model.

5. A new framework for efficiently modelling how a garment drapes on a body shape in 2D and 3D, based on precomputing and interpolating the explicit physics simulation results from a corpus of body shape samples.

The details of the system's components are presented in the remaining sections.

2 System Architecture

A simplified system diagram of the end-to-end garment digitisation and visualisation system is illustrated in FIG. 2, by way of example. The whole system can be divided into two major stages:

1. 3D Garment digitisation. The goal of this stage is to capture the appearance and 3D geometry of the garment. The processing for this stage is done off-line. We present two approaches for acquiring 3D garment models.

Figure 3:
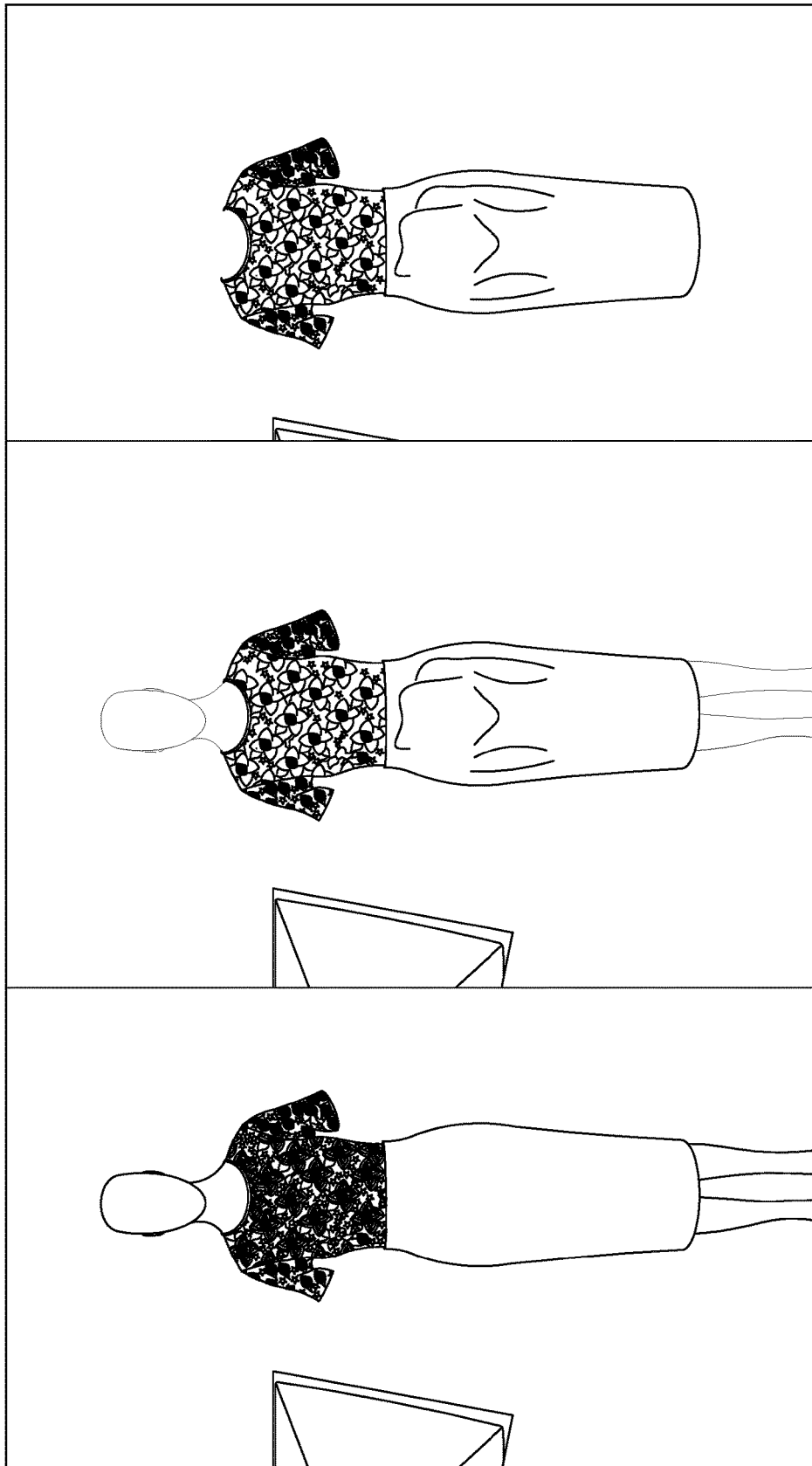
FIG. 3: An illustration example of photography-based garment digitisation on a retro-reflective mannequin [31]. (a) Shadow around torso can cause severe problems for segmentation when the retro-reflective surface is not excited. (b) The distinction between the background and foreground is much more clear when the retro-reflective surface is excited. (c) A straightforward result after running the segmentation algorithm on the whole image. Spurious foreground regions around the boundary of the image can be easily disposed of by detecting the connected components.

We first provide an approach based on 2D photography and 3D reconstruction from silhouettes. In the approach, we dress the garment on the retro-reflective mannequin situated on a program-controlled turntable, and photograph the texture along with the real scene lighting of the garment, i.e., the appearance model, in multiple predefined camera views inside a photography rig [31]. The foreground of the garment texture is automatically segmented from the mannequin and the background using the graph-cut algorithm [4]. Given the fact that the retro-reflectivity of the mannequin provides a clean background, the segmentation algorithm is robust against shadows and various types of texture and colour patterns and it preserves the geometrical details around the silhouettes of the garment cut-outs (see FIG. 3 for an example). Then, given the foreground cut-outs of the garment (optionally with depth maps), and camera calibration data, we create a smooth and simplified 3D geometry model for each garment based on a template fitting algorithm. Both geometry and appearance models of the garment are stored in a database. See Section 3 for details.

As an alternative method of acquiring the 3D model, we also present a practical solution for direct 3D garment scanning based on depth fusion, which is compatible with a fast digitisation process using a retro-reflective mannequin [31]. The provided solution is improved from Kinect Fusion (KF) [21]. The main difference is that it can exploit the specific camera motion used in our digitisation process and this makes the fusion process more reliable under fast camera motion even with few discrete input images. To generate the appearance model of the 3D garment, we also present a new texture mapping algorithm to improve the poor quality of the colour estimated by a conventional KF. This depth fusion approach can be combined with the photography-based approach to digitise 3D garment models with high quality textures at low cost. A texture map for the reconstructed garment model was created by stitching together a few texture images. In order to minimise the stitching seam we convert the stitching process to an optimisation process in a graph structure and solve this using a GC algorithm. This approach can be used in combination with the shape-from-silhouette-based approach in Section 3 to create a simplified garment model with high geometry fidelity efficiently. See Section 4 for details of the approach.

2. Garment simulation and visualisation. This stage is executed online at run-time and is focused on modelling the digitised garments on the 3D body model of the user and rendering the outfit of garment combinations on that body. Digital garment models (both geometry and appearance model) created in the digitisation stage and 3D body models regressed from users' body dimensions are the key input of this stage. Key modules in the stage perform a 3D physics simulation of the garment model on the customised body shape to model the geometric deformation (see Section 5), and deform the fine 2D garment textures in each of the camera views corresponding to the physics simulation results of the simplified garment model (see Section 6). Also, owing to the computational intensity of performing 3D physics simulations we also present an approximate approach to quickly model garment draping based on precomputing and interpolating the explicit physics simulation results on a corpus of body samples (see Section 7 for details).

Detailed techniques involved in each stage are described in the rest of the document.

3 Creating 3D Garment Models from Multiple 2D Texture Images

For more realistic rendering of cloth objects [17], it is crucial to have high quality 3D models. In particular, we have developed a robust reconstruction algorithm that works efficiently, and is compatible and embedded easily into the fast 2D photography-based garment digitisation framework [31], as described in Section 2.

Complex geometry structures on a garment, such as creases, knots, and small buttons, makes shape reconstruction very challenging. In some cases it might be impossible to digitise e.g. a garment with reflective sequins or translucent material with a passive optical sensor. Therefore, instead of digitising precise geometry, we are more focussed on digitising approximate 3D geometry with a good quality texture map.

Figure 5:
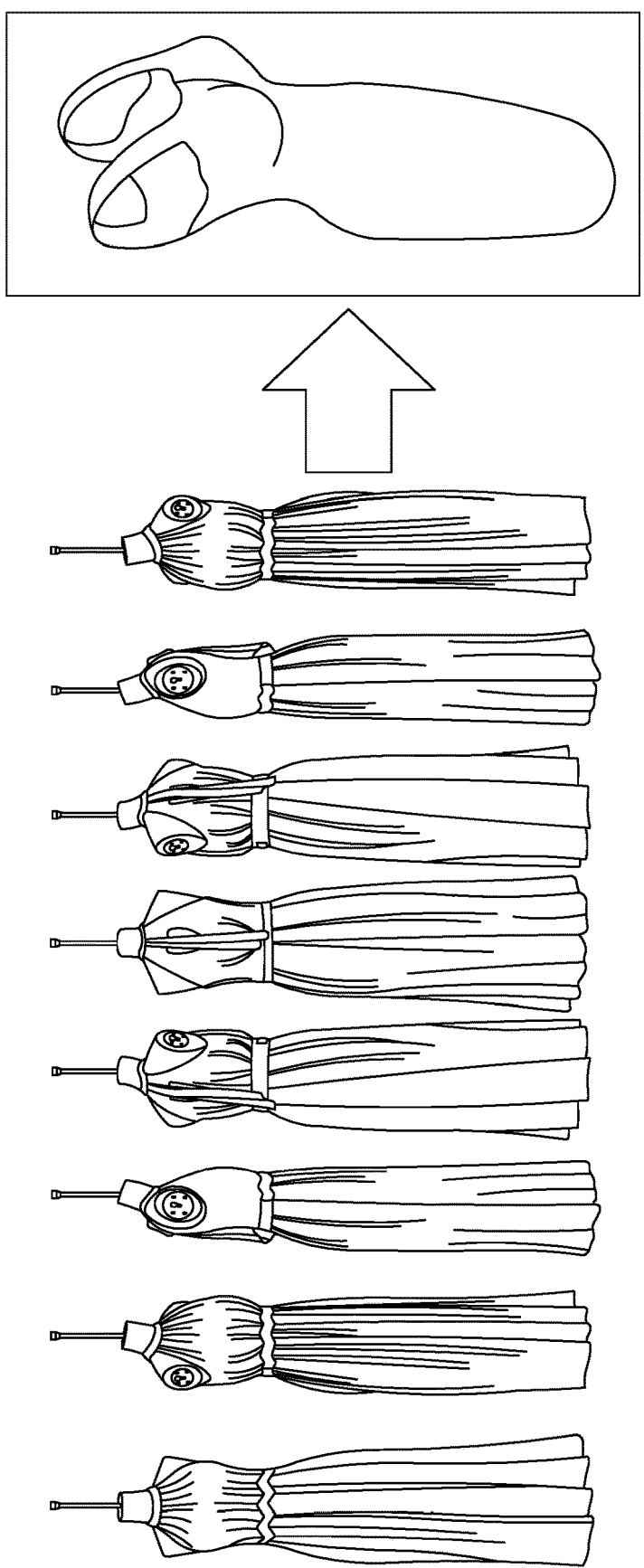
FIG. 5: An example of creating a 3D garment model from multiple texture images.

As one of the solutions, the shape-from-silhouettes (SfS) [27] approach can fit well with the 2D garment digitisation framework. In our problem, we would like to create a 3D garment model from all the texture cut-outs of the garment in different camera views (see e.g. FIG. 5), which are captured in the photography stage (see e.g. FIG. 3). As a requirement, we need the outlines of the created 3D model to agree with the silhouette texture images in all given camera views.

We solve this shape-from-silhouette (SfS) problem in a parametric template model fitting and shape registration framework. As far as the algorithm is concerned, the whole garment model creation process can be divided into three stages:

1. Define simple parametric models of various garment types.
2. Adjust morph and pose parameters to roughly agree with all image silhouettes.
3. Locally deform the mesh for better silhouette agreement.

Figure 4:
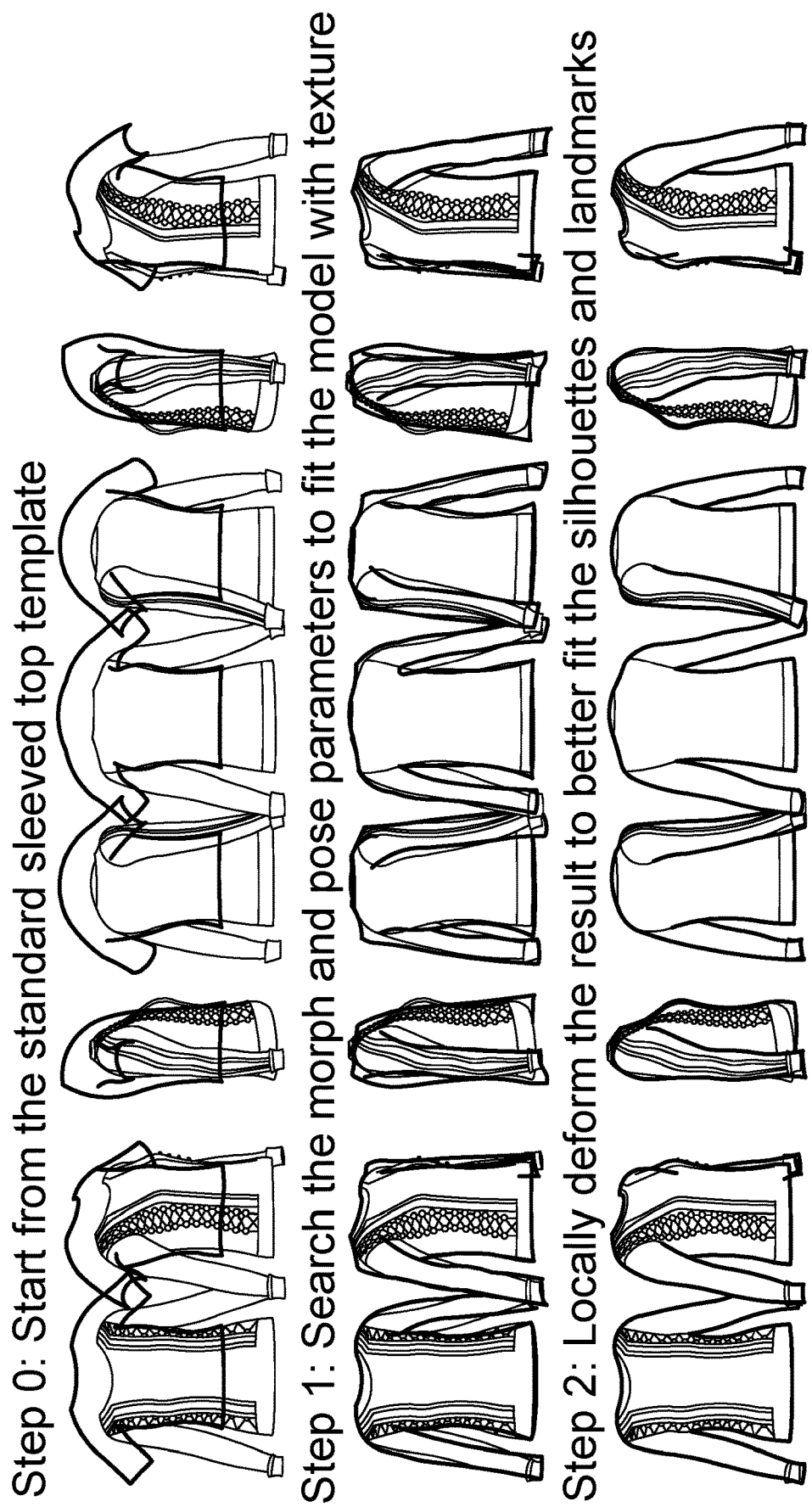
FIG. 4: An example of the process for fitting a sleeved top using our approach in Section 3.

FIG. 4 shows an example fitting process of a sleeved top using our approach. In Sections 3.1.1, 3.1.2 and 3.1.3, we will provide more details about each stage respectively. Since the camera must be calibrated for each viewpoint for the successful creation of the 3D garment geometry model, we use a specially designed calibration target. See Section 3.2 for details.

3.1 the Template Fitting Algorithm for Shape-from-Silhouette Reconstruction

Mathematically, the garment model creation in the context of our problem is formulated as follows. Given an initial 3D garment template model $G_0 = \{X_{i,0}\}_{j=1}^{N}$ of N vertices, and image silhouettes $I_v$ (v=1, 2, ..., V) along with the associated camera projection matrices $P_v$ (a 3×4 matrix) (v=1, 2, ..., V) of V views which are pre-computed in the camera calibration process (see Section 3.2 for details), as the input, we generate a 3D garment model $G\{X_i\}_{i=1}^{N}$ that matches those image silhouettes in all the V views under the same projection (V=8 in our garment digitisation setting).

3.1.1 Define Morphable Template Models

In order to capture the shape variation of various garments, we define 3D morphable templates for each typical garment type, e.g. dresses, trousers, sleeved top, etc. Each garment template comprises one base shape $G_B$ and K morph end points $G_{M,i}$ (i=1, 2, ..., K). In general, we can capture major modes of shape variation of a garment type by linearly combining these K morphs with different morph weights $m_i$ (i=1, 2, ..., K):

$$G = G_B + \sum_{i=1}^{K} m_i (G_{M,i} - G_B). \tag{1}$$

For more complicated garment types, e.g. sleeved tops, we further define joints and pose parameters p in the garment templates. The mesh deformation of a pose change relies on a skinning process. These abductible garment templates will be able to capture various arm and leg pose changes.

Figure 6:
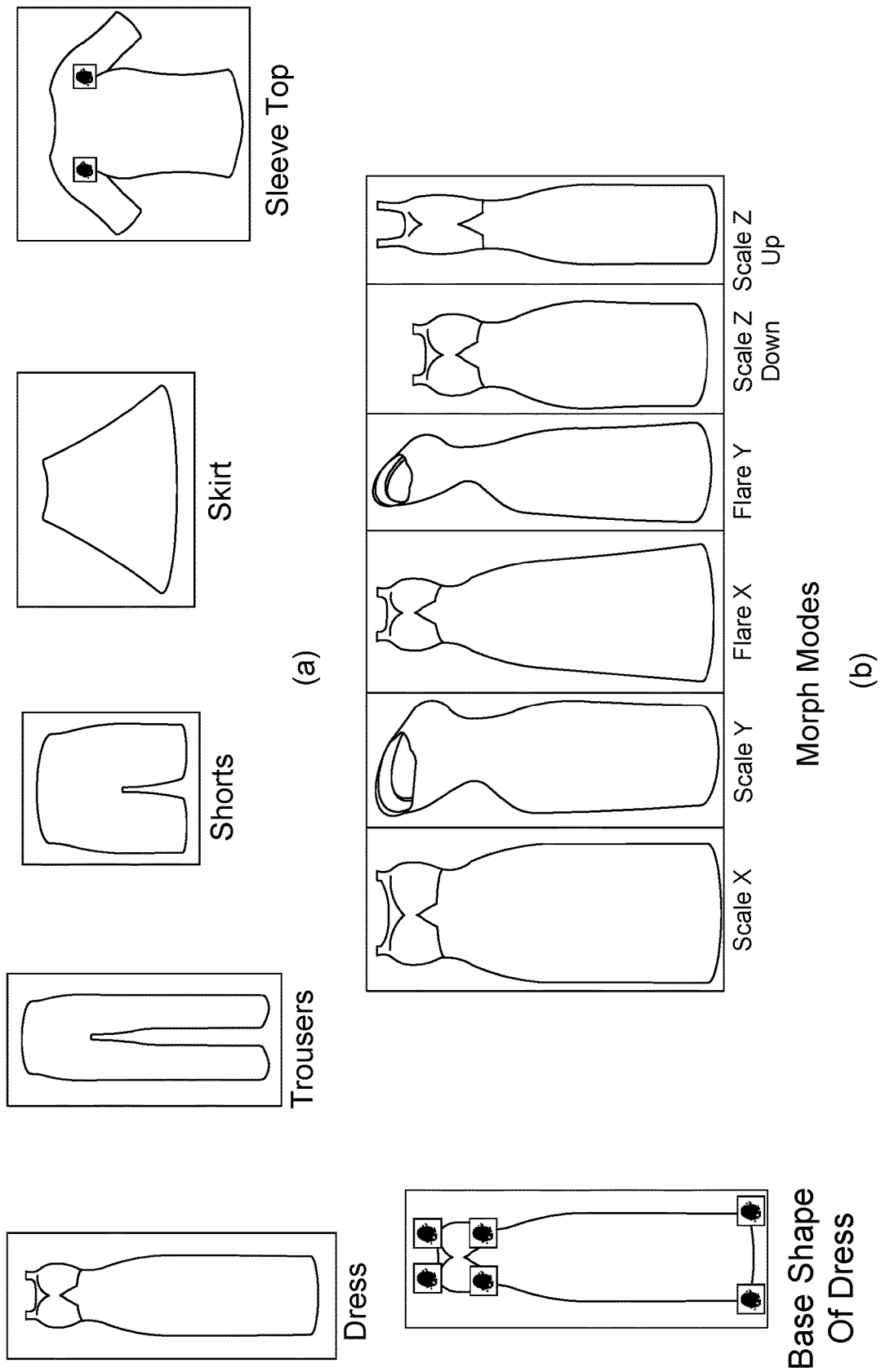
FIG. 6: Examples of 3D morphable template models, relating to description in Section 3.1.1. (a) Base shapes for different garment types. For sleeved tops we define two joints around the shoulder to allow arm pose changes. (b) Base shape and 6 morph end points of a dress template.
Figure 9:
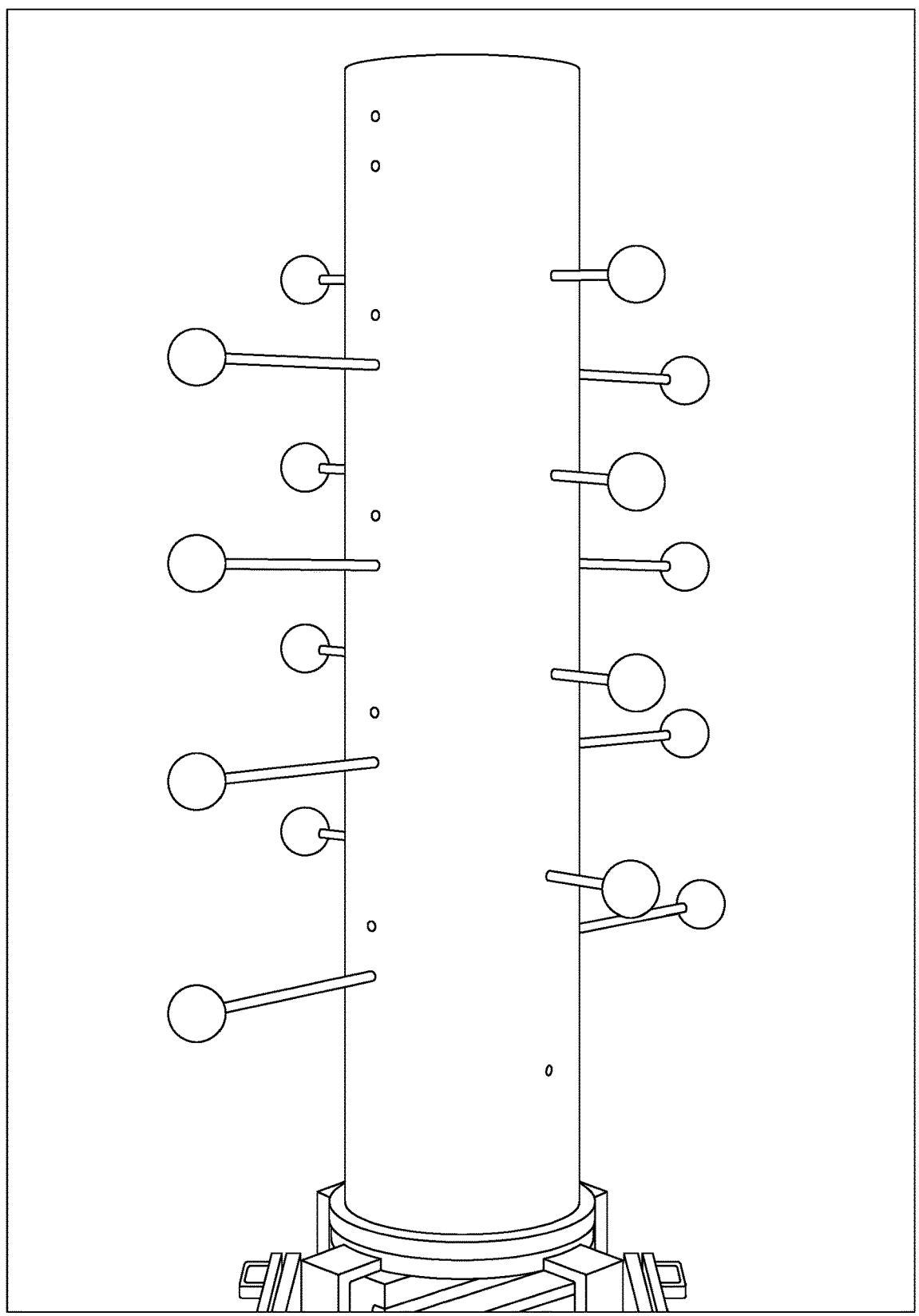
FIG. 9: An example of a prototype calibration target situated on a turntable, used to compute the camera projection matrices of all 8 camera views, relating to description in Section 3.2.1.

In the implementation, we use computer generated (CG) garment models as the base shapes of garment templates (see FIG. 6(a) for examples). Then for each garment template we define a number of morph end points by applying simple shape transformations on the base shape, e.g. applying a uniform horizontal scaling of the base shape, horizontally scaling the bottom of the template in a piecewise linear manner to change the flare, etc. The number of morphs K adopted varies from 4 to 8 for each template, dependent on the complexity of the garment type (see FIG. 6(b) for the example of dress template). It is worthwhile to mention that in our system, these morphable models are only aimed to capture the coarse dimensions of the garment parts instead of very fine geometry details, so all the morphs remain simple. This could considerably reduce the amount of extra work for designing a new garment template and its morphs in practice.

3.1.2 Rough-Fitting by a Morphing Parameter Search

Once we have defined the garment template for a garment type, in the first stage of the template fitting, we change the shape morph parameters m and the pose parameters p of the 3D morphable garment template to achieve an approximate agreement in shape with the garment texture images in all V views.

The problem can be formulated as the following optimisation problem:

$$(\hat{m}, \hat{p}) = \underset{m,p}{\operatorname{argmax}} F_{rough}, \tag{2}$$

where m is the vector of the shape morph parameters and p is the vector of the pose parameters of the 3D garment template model, including the global translation. The objective function $F_{rough}$ for the rough fitting comprises two terms:

$$F_{rough} = F_{overlapping} + \lambda F_{boundingbox}. \tag{3}$$

1. The normalised overlapping area in all views, formulated as:

$$F_{overlapping} = \sum_{v=1}^{V} \frac{\operatorname{Area}(G_v \cap T_v)}{\operatorname{Area}(G_v \cup T_v)}. \tag{4}$$

where G is the projection of the garment template in view v, and $T_v$ is the silhouette of the garment texture image in view v. The score in each view will be a number between 0 and 1.

2. The consistency of the vertical bounding box in all views, formulated as:

$$F_{boundingbox} = -\frac{1}{H_{image}^2} \sum_{v=1}^{V} ((y_{v,up}^g - y_{v,up}^t)^2 + (y_{v,down}^g - y_{v,down}^t)^2). \tag{5}$$

where $h_{v,up/down}^g$ and $h_{v,up/down}^b$ are the up/down vertical bound of the silhouette of the garment template projection and that of the corresponding texture image in view v, respectively. A large discrepancy in the bounding box of the silhouette will cause penalty.

In the implementation, we set $\lambda=1$. The optimisation of (2) is solved by an adaptive line-search approach.

3.1.3 Fine-Fitting by Locally Deforming the Model

By adjusting morph and pose parameters of the garment template, we obtain a garment model which approximately matches the image silhouettes in all camera views. This gives a coarse silhouette agreement. In the next stage of template fitting, we further perform a non-uniform local deformation on the 3D garment model obtained from the previous fitting shape in order to reach a much better silhouette consistency with the texture images in all the camera views.

To achieve the goal, we provide an algorithm that is extended from a non-rigid Iterative Closest Point (ICP) algorithm [2] to solve this silhouette fitting problem. Assume that we have one starting 3D garment model G of N vertices, and we then fit the silhouettes of G against those of the texture images $I_v$ (v=1, 2, ..., V) in all V camera views. The algorithm iterates between the following two steps:

1. Updating the projection of the garment template in each camera view, and updating the associated silhouette vertex flags $b_{v,i}$ (v=1, 2, ..., V, i=1, 2, ..., N) in each view v for each vertex i. Here, $b_{v,i}$ is a binary variable, which equals 1 if the vertex i is on the silhouette of the garment template in the view v and 0 otherwise.

2. Deforming the template to fit the observed silhouettes of the garment texture images given the silhouette vertices of the garment template provided in 1) for each view. The objective function in each iteration of fitting is formulated as:

$$\{\hat{T}_i\}_{j=1}^{N} = \arg\min_{\{T_i\}_{i=1}^{N}} F_{fine}, \quad (6)$$

where $T_1$ (i=1, 2, ..., N) is a 3×4 affine transform matrix that encodes the local deformation at vertex i after the fitting. The goal of the optimisation problem is to find out the optimal set of local deformation transformations $\{\hat{T}_i\}_{i=1}^{N}$ that minimises the objective function $F_{fine}$.

As a summary, the objective function $F_{fine}$ mainly comprises the following four terms:

1. Data term $F_{data}$. This term regulates the distance between the projected silhouette of the 3D garment template and the silhouette of the garment texture image $I_v$ in each corresponding view v. It enforces the silhouette consistency in all V camera views as the following equation shows.

$$F_{data} = \sum_{v=1}^{V} \frac{1}{N_v} \sum_{i=1}^{N} b_{v,i} DT_{S_v}^2(Proj_v(T_i\tilde{X}_i)), \quad (7)$$

where $b_{v,i}$ is the binary silhouette vertex flag of the vertex i that is obtained in Step 1; $N_v = \sum_{i=1}^{N} b_{v,i}$ is the total number of silhouette vertices of the garment template in the view v; $DT_{S_v}^2(\cdot)$ denotes the Euclidean distance transform of the silhouette $S_v$ of the garment texture image in view v, which returns the closest Euclidean distance from the point to the silhouette for an arbitrary image position x, as follows:

$$DT_{S_v}^2(x) = \min_{p \in S_v} \|x - p\|^2. \quad (8)$$

In (15), the function $proj_v(\cdot)$ defines a perspective camera projection transform that projects an arbitrary 3D spatial position into a 2D image coordinate in the view v using the 3×4 projection matrix $P_v = K[R_v t_v]$, as the following formula shows:

$$x = Proj_v(X) = \left[\frac{x_1}{x_3}, \frac{x_2}{x_3}\right]. \quad (9)$$

where $\tilde{x} = sP_v\tilde{X} = sK(R_vX + t_v)$ is the homogenous image coordinate (a 3D vector) corresponding to the 3D position X; K denotes the 3×3 intrinsic matrix of the camera used for garment digitisation, which has the form:

$$K = \begin{pmatrix} K_x & 0 & W_{image}/2 \\ 0 & K_y & H_{image}/2 \\ 0 & 0 & 1 \end{pmatrix}; \quad (10)$$

and R (a 3×3 matrix) and t (a 3D vector) denote extrinsic camera parameters of spatial rotation and translation, respectively.

2. Smoothness term $F_{smooth}$. This term regulates the extent of the local deformation in proximate mesh vertices, as given in (11).

$$F_{smooth} = \sum_{i=1}^{N} \sum_{j \in N_i} \|T_i - T_j\|^2. \quad (11)$$

Hence, it favours a smooth overall shape deformation after the fitting.

3. Identity-transform regularity term $F_{identity}$. This term regulates large local shape deformation away from the starting shape by penalizing difference between the transformation of the local deformation and the identity transformation. It helps to avoid the divergence when solving the optimisation problem. (12).

$$F_{identity} = \sum_{i=1}^{N} \|T_i - [I, 0]\|^2. \quad (12)$$

4. Landmark term $F_{landmark}$. For some types of garments, we define a few landmark vertices on the 3D garment template mesh and annotate their corresponding positions on the texture images, to improve the fitting quality over some areas where a precise fitting is hard to achieve (see FIG. 7 for instance). The common landmark positions are the armpits of sleeve tops, the crotch of trousers, etc. The landmarks term regulates that for the projection of landmarks the 3D garment template should match their specified image positions in each corresponding view. It will affect the positions of the vertices in the vicinity of those landmarks. With J landmarks defined in the garment template, the formulation of the term is given as follows:

$$F_{landmark} = \sum_{v=1}^{V} \sum_{j=1}^{L} \|l_{j,v} - l_{0,j,v}\|^2, \quad (13)$$

where $I_{j,v}$ and $I_{0,j,v}$ represent the projected position of the mesh landmark j in the view v, and the corresponding landmark position on the texture image, respectively. The projected position of a mesh landmark is estimated based on a weighted average of the projected positions of all nearby mesh vertices as follows:

$$l_{j,v} = \sum_{i=1}^{N} w_{ij} Proj_v(T_i \tilde{X}_i), \quad (14)$$

where the weights $$w_{ij} = k\exp\left(-\frac{\|X_i - X_{L_j}\|}{\sigma^2}\right)$$

is the associated weight of the vertex i to the landmark j, which is inversely correlated with the spatial distance between them. The radius parameter σ is set to be 6 cm in the implementation. All the weights are normalised so that they satisfy $\Sigma_{i=1}^{N} w_{ij}=1$.

Given all the terms defined above, the detailed form of $F_{fine}$ we optimise over can be formulated in the following equation (15) (in all the later formulations, we use the notations $X_i$ to represent the 3D vector representing the 3D position of the vertex i, $\tilde{X}_i$ to represent the 4D vector representing the homogenous coordinate of the 3D vertex i, $x_{i,i}$ to represent the 2D vector representing the 2D image position of the vertex i, and $\tilde{x}_i$ to represent the 3D vector representing the homogenous image position of the vertex i):

$$F_{fine} = \alpha F_{data} + \beta F_{smoothness} + \gamma F_{identity} + \delta F_{landmark} = \quad (15)$$

$$\alpha \sum_{v=1}^{V} \frac{1}{N_v} \sum_{i=1}^{N} b_{v,i} DT^2_{S_v}(Proj_v(T_i\tilde{X}_i)) + \beta \sum_{i=1}^{N} \sum_{j\in N_i} \|T_i - T_j\|^2 +$$

$$\gamma \sum_{i=1}^{N} \|T_i - [I, 0]\|^2 + \delta \sum_{v=1}^{V} \sum_{j=1}^{L} \|l_{j,v} - l_{0,j,v}\|^2,$$

We use the gradient descent method to solve the optimisation problem in (6). The gradient of the objective function $F_{fine}$ with respect to each affine transform matrix $T_i$ at the vertex i (i=1, 2, . . . , N) is computed as follows:

$$\frac{\partial F_{fine}}{\partial T_i} = \alpha \frac{\partial F_{data}}{\partial T_i} + \beta \frac{\partial F_{smoothness}}{\partial T_i} + \gamma \frac{\partial F_{identity}}{\partial T_i} + \delta \frac{\partial F_{landmark}}{\partial T_i}, \quad (16)$$

in which the gradients are as follows:

$$\frac{\partial F_{data}}{\partial T_i} = \frac{1}{N_v} \sum_{v=1}^{V} b_{v,i} R_v^T C_{v,i}^T gDT_{S_v}(Proj_v(T_i\tilde{X}_i))\tilde{X}_i^T, \quad (17)$$

$$\frac{\partial F_{smoothness}}{\partial T_i} = 2\sum_{j\in N_i} (T_i - T_j), \quad (18)$$

$$\frac{\partial F_{identity}}{\partial T_i} = 2(T_i - [I, 0]), \quad (19)$$

$$\frac{\partial F_{landmark}}{\partial T_i} = 2\sum_{v=1}^{V}\sum_{j=1}^{L} w_{ij} R_v^T C_{v,L_j}^T (l_{j,v} - l_{0,j,v})\tilde{X}_i^T, \quad (20)$$

where $C_{v,i}$ is a 2×3 matrix which has the following form $$C_{v,i} = \begin{bmatrix} \frac{K_x}{\tilde{x}_{v,i,3}} & 0 & -\frac{K_x \tilde{x}_{v,i,1}}{\tilde{x}_{v,i,3}^2} \\ 0 & \frac{K_y}{\tilde{x}_{v,i,3}} & -\frac{K_y \tilde{x}_{v,i,2}}{\tilde{x}_{v,i,3}^2} \end{bmatrix}, \quad (21)$$

and $\tilde{x}_{v,i}=sK(R_v T_i \tilde{X}_i + t_v)$ is the homogenous image coordinate of the vertex i in the view v;

The operation $gDT_{S_v}(\bullet)$ denotes the image gradient of the Euclidean distance transform $DT_{S_v}^2(\bullet)$. It is a 2D vector and can be computed as follows for an arbitrary image position x:

$$gDT_{S_v}(x) = \frac{\partial DT^2_{S_v}(x)}{\partial x} = 2(x - \hat{p}), \quad (22)$$

where $\hat{p} = \underset{p\in S_v}{\operatorname{argmin}} \|x - p\|^2$.

In the implementation, we set the parameters as follows: α=0.0025, β=4×0.7$^{\lfloor t/5 \rfloor}$, γ=0.0001, and δ=0.0001, in which t is number of iterations and we slowly relax the constraint of smoothness to allow better silhouette fitting. We usually iterate over the two steps for 10 to 25 iterations.

3.1.4 Modifications to Model Complex Garments with Multiple Depth Layers

When modelling some complex garment types (e.g. sleeved tops, trousers), we might encounter the problem of self-occlusion, which results in internal silhouettes (i.e. the depth discontinuity) in addition to the external silhouette boundaries. This adds extra complexity to the fitting algorithm.

In such cases, we separate the garment textures as well as the projection of garment template of each viewpoint into multiple depth layers by labeling the depth ordering of the silhouettes and the internal discontinuity (see FIG. 8 for an example). For instance, a sleeved top will usually comprise 3 depth layers; a pair of trousers will usually comprise 2 layers, etc. Considering the existence of occlusion, the further-away depth layer will always include the nearer depth layer in our layer separation strategy, e.g. in the front-right corner view, the layering order (sorted by the distance to the camera in an ascending order) of a sleeved top will be: {right sleeve}, {right sleeve+torso}, and {right sleeve+torso+left sleeve}. This strategy has been proven to be robust through experiments.

To create a 3D garment model, we use all the depth layers of all the camera views $v_d$ (d=1, 2, . . . , D, v=1, 2, . . . , V) as independent layer-view inputs to the fitting algorithm. The total number of layer-views for fitting will be augmented to D×V instead of V.

3.1.5 Modifying Shape-from-Silhouette Approaches to Adopt Other Sources of Input The 3D model creation approach presented above is flexible and allows taking other sources of information as additional inputs.

For example, we can incorporate depth maps into each of the viewpoints, which can be obtained by a depth sensor (e.g. Microsoft Kinect, Intel R200), or using stereo photos. Algorithmically, we introduce an extra data term $F_{depth}$ to the objective function of the fine-fitting stage in equation (15) as follows:

$$F_{depth} = \sum_{v=1}^{V} \sum_{i=1}^{N} b_{i,v}^{d} \|X_i - Y_{i,v}\|^2, \quad (23)$$

where $Y_{i,v}$ is a 3D point captured by the depth sensor, which is nearest to the garment template vertex i in the view v (v=1, 2, ..., V), and $b_{i,v}^{d}$ is a binary visibility variable which represents whether a mesh vertex could find a correspondence on the depth map in the view v. The new objective function of the fine-fitting stage becomes:

$$\tilde{F}_{fine} = F_{fine} + \eta F_{depth}. \quad (24)$$

Alternatively, we can incorporate a unified 3D scan as the additional input. In this case, the extra data term $F_{depth}$ to (24) becomes:

$$F_{depth} = \sum_{i=1}^{N} \|X_i - Y_i\|^2, \quad (25)$$

where $Y_i$ is the nearest 3D vertex on the input 3D scan to the garment template vertex i. The methods on how to acquire the aforementioned 3D depth scans in the fast garment digitisation framework will be addressed in detail in Section 4.

These algorithm variants would allow us to capture more geometrical details of the garment surfaces in the 3D model fitting process.

3.2 Automatic Camera Calibration

The camera projection matrices associate the positions of the objects in the 3D world with their corresponding positions in the 2D image projection, and they play important roles in our garment model creation process in which we deform the shape of the 3D garment template to align with the silhouettes of the garment texture images in multiple camera views, as described in Section 3.1. The procedure of computing those projection matrices from the scene is called camera calibration in computer vision. In this sub-section, we describe how this is carried out in our garment digitisation system.

3.2.1 Calibration Targets

To automatically compute those projection matrices in all 8 defined camera views used for garment digitisation, we synthesized an example calibration object with pre-defined dimensions. The calibration target is made up of a cylindrical body with 16 arms, which are grouped in four and stretched in four orthogonal directions. A coloured plastic ball (red, green, blue, and yellow, corresponding to the directions of north, east, south, and west) is attached to the end of each arm.

During the process of calibration, the calibration target is situated on the controllable turntable and we capture its photos in all 8 views. Then, we perform a circle detection on the RGB colour likelihood map of 4 different colours using Hough Transform [14] to locate the image positions of the balls on the calibration object in each view. The colour group is used as an important clue for building up the correspondence between the centres of detected circles and those of the balls in the 3D world. Given the fact that we know the centroid positions $X_i$ of all $N_B$=16 balls and their corresponding images positions $x_{i,v}$ in each view v, we compute the 3×4 projection matrices $P_v$ of all V=8 views in a bundle adjustment, i.e. solving the following quadratic optimisation problem L using Levenberg-Marquardt algorithm [16].

$$\{P_v^*\}_{v=1}^{V} \arg\min_{\{P_v\}_{v=1}^{V}} L = \arg\min_{\{P_v\}_{v=1}^{V}} \sum_{v=1}^{V} \|Proj_v(P_v[X_i|1]^T) - x_{i,v}\|^2. \quad (26)$$

where the function $proj_v(\cdot)$ represents a perspective camera projection transform in the view v, which has been defined in Section 3.1.3. Details about the parametrisation of the optimisation problem L are given in Section 3.2.2.

3.2.2 Parametrisation of the Optimisation Problem

In the setting of our digitisation rig, the camera parameters to be solved in the bundle adjustment are as follows:

Intrinsic camera parameters K (3×3). Since we use one single camera in the whole process, all the camera views being digitised share the same intrinsic matrix that is in the triangular form $$K = \begin{pmatrix} K_x & 0 & W_{image}/2 \\ 0 & K_y & H_{image}/2 \\ 0 & 0 & 1 \end{pmatrix}.$$

Extrinsic camera parameters, i.e. the viewpoint rotation $R_v$ (a 3×3 matrix) and the viewpoint translation $t_v$ (a 3D vector), for v=1, 2, ..., V, where V=8 in our implementation. These extrinsic camera parameters vary for different camera views.

Figure 10:
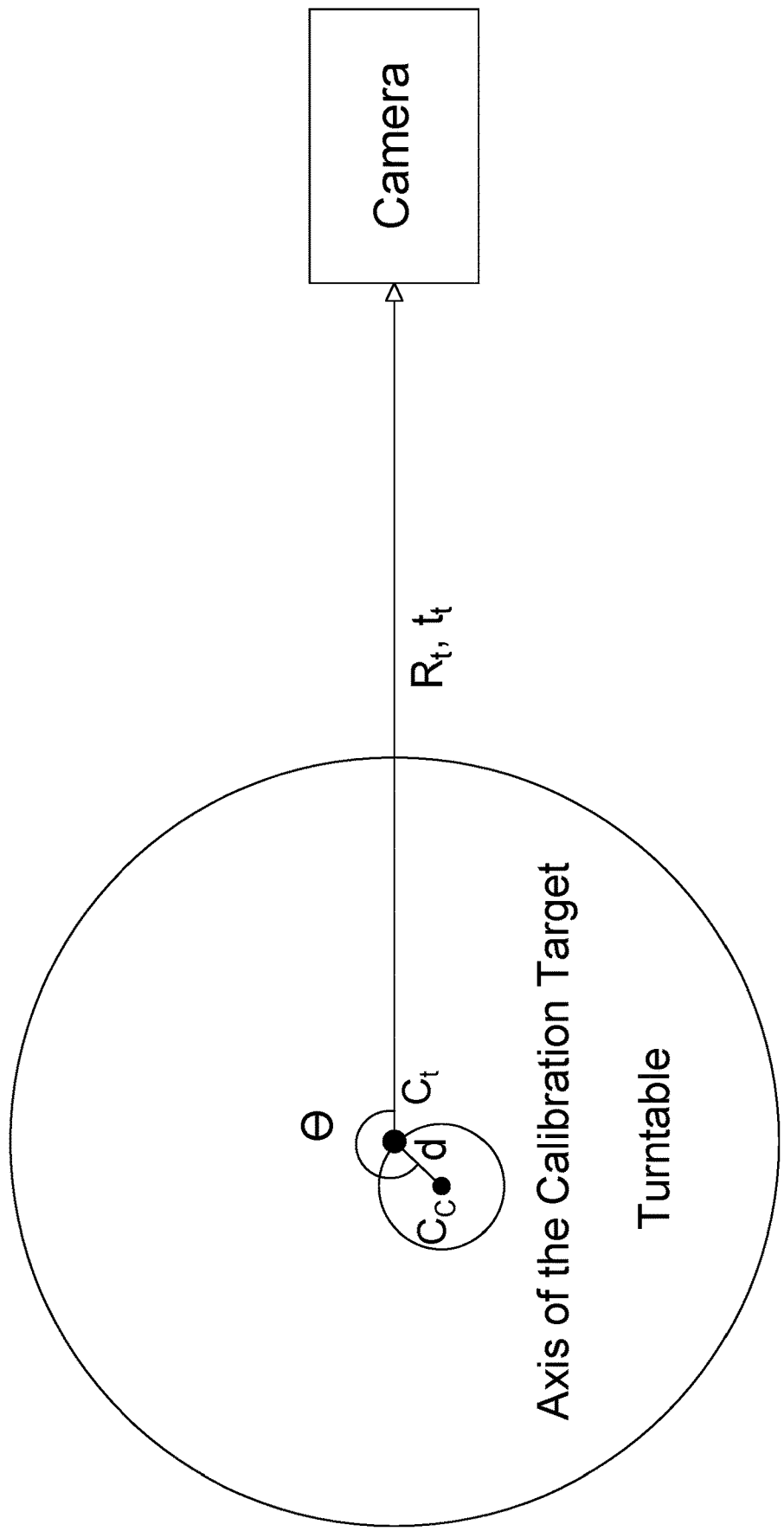
FIG. 10: Example geometry illustration of view rotation and translation in our digitisation.

In our implementation, we assume $K_x = K_y$ in the matrix K, and hence in total 3 degrees of freedom are introduced to the optimisation by intrinsic camera parameters. The extrinsic camera parameters introduce $V(d(R_v)+d(t_v))=8\times(3\times3+3)=96$ degrees of freedom (DoF) for optimisation in the general case. However, in our digitisation setting based on a turntable, the parametrisation can be of much lower dimensionality (see FIG. 10). The rotation of the calibration target $R_c$ is constrained around a single axis (up direction z, with a translational offset $d=[d,0,0]^T$ (1 DoF) between the centre of the calibration target $c_c$ and the rotation centre $c_t$ of the turntable), hence it can be represented by a single angular parameter $\theta_v$ (1 DoF) for each camera view. The rotation centre of the turntable will have a constant rotation $R_t$ (9 DoF) and a translation transform $t_t$ (3 DoF) from the camera during the whole process. Therefore, the view transform in view v can be decomposed into the following cascade of transformations as follows:

$$\begin{bmatrix} R_v & t_v \\ 0 & 1 \end{bmatrix} = \begin{bmatrix} R_t & t_t \\ 0 & 1 \end{bmatrix} \begin{bmatrix} R_z(\theta_v) & 0 \\ 0 & 1 \end{bmatrix} \begin{bmatrix} 1 & d \\ 0 & 1 \end{bmatrix} = \begin{bmatrix} R_t R_z(\theta_v) & R_t R_z(\theta_v)d + t_t \\ 0 & 1 \end{bmatrix}, \quad (27)$$

$$v = 1, 2, \ldots, V,$$

where $$R_z(\theta_v) = \begin{bmatrix} \cos(\theta_v) & \sin(\theta_v) & 0 \\ -\sin(\theta_v) & \cos(\theta_v) & 0 \\ 0 & 0 & 1 \end{bmatrix}.$$

By comparing the terms matrix, we can obtain the rotation matrix $R_v$ and the translation vector $t_v$ in each view v (v=1, 2, ..., V):

$$R_v = R_t R_z(\theta_v) \quad (28)$$

$$t_v = R_t R_z(\theta_v)d + t_t \quad (29)$$

Under this parametrisation, the total number of parameters introduced by the extrinsic camera parameters for all V=8 views is reduced to $V \cdot d(\theta_v) + d(R_t) + d(t_t) + d(d) = 8 \times 1 + 9 + 3 + 1 = 21$ DoF, and hence 24 DoF in total including both intrinsic and extrinsic camera parameters.

3.2.3 Results of Garment Model Creation

We have tested our shape-from-silhouette approach in Section 3.1 on a number of garments in different garment types. Some fitting results and corresponding 3D garment model created are illustrated in FIG. 11, by way of example. In general, we find our approach is able to create a smooth 3D garment model whose silhouettes are consistent with the input texture images in all given camera views. It is also worth mentioning that the fitting process is only carried out on the silhouettes formed by the viewing rays, but not on some discontinuity boundaries (e.g. the collar of the top, the straps of the dress). The major consideration here is that fitting those discontinuity boundaries will require either 1) applying large local deformation of the template which often results in a unsmooth garment model, or 2) defining a large number of templates as an alternative solution. We find it unnecessary, since our ultimate goal is to create a smooth garment template for physical simulation.

4 Creating 3D Garment Models from Depth Scans

4.1 Problem Descriptions and Solution Overview

In Section 3, we have provided a 3D reconstruction solution based on shape-from-silhouettes (SfS) to create an approximate 3D geometry of the garment from its texture images captured by the photography-based 2D garment digitisation framework [31] as described in Section 2.

However, one problem with SfS is that it cannot capture the shape of concave regions (a reconstruction result from SfS is somewhere between an actual shape and its convex approximation, and it is often called a visual hull [23]), which can be observed in a garment frequently, e.g. sleeveless dress or around a neck. In addition, a few silhouette images is not sufficient to deliver a reasonable approximation in many cases. Alternatively, we can combine colour information with a classic SfS technique as proposed in [39]. In theory, this can address some of the SfS limitations but it is not practical; it takes even more processing time and requires many keyframe images to produce a reasonable result.

To address the problems above, in this section we explore an alternative solution for 3D garment digitisation by using active vision sensors. Microsoft Kinect camera is a cost-effective active depth sensor available on the market. It can deliver a high definition image with a good depth map at high frame rate without any special video processing hardware (such as a frame grabber). In order to create a 3D model with a Kinect sensor, we need to accumulate a sequence of depth maps from different viewing angles. This means that we should be able to estimate a relative position of a moving sensor (or a moving object). Microsoft Kinect Fusion (KF) [21] solves the camera tracking problem using a modified Iterative Closest Point (ICP) [33]. Also, it addresses depth outliers appropriately by adopting a volumetric representation [12].

However, one practical problem we have found with a conventional KF is that the camera tracking of KF only works well when the spatial separation between adjacent frames is small. This is mainly because ICP is an iterative optimisation, so that an incorrect initial guess makes the iteration converge to a local minimum. Unfortunately, the working scenario of our garment digitisation process is not suitable for this camera tracking mechanism, as we collect a sparse number of views e.g. every 45° rotation.

Another problem of KF is its poor quality of reconstructed colour. A conventional KF is basically optimised for capturing an approximated shape. Thus, it only supports rudimentary colour reconstruction. The way that KF defines colours of a reconstructed scene is assigning an average colour per each vertex. This means that it is highly likely to have colour artifacts even with a single colour outlier from incorrect vertex visibility during the fusion process. Furthermore, a rendered result is generally blurry owing to the insufficient spatial resolution of reconstructed meshes (see e.g. FIG. 12).

The solution provided in this section is developed to tackle the aforementioned issues. The main contributions of the provided method are summarised as follows.

We improve the success rate of garment reconstruction from a fast camera motion. To achieve this, we linearly approximate the movement of a mannequin as a circular motion, from which we can estimate a better initial guess for ICP optimisation. We also provide a new calibration method based on a new camera model.

The provided method can create a high quality texture map by stitching together a few keyframe images. To minimise the artifacts around stitching seams, we convert the problem to a problem of finding the optimal mesh segmentation and solve this using a multi-class graph-cut optimisation [3].

The system and the approaches can be extended in the following ways.

- A Kinect sensor can be replaced with any depth sensor that can capture both an image and a depth map synchronously.
- The provided system can be modified to have multiple depth sensors. Also, we can have a separate imaging sensor to capture a higher resolution image.
- The image stitching algorithm explained in Section 4.3.2 could be extended to include a further optimisation. For example, we can have additional postprocessing blocks to refine the projection of a vertex using image features extracted from the keyframe images.
- A resulting texture map can be further refined based on the reconstructed depth map, e.g. by performing a highlight or shade removal using a reconstructed 3D model.
- The provided method can be modified to improve an initial result incrementally, if additional images/depth maps are available.

4.2 Guided Kinect Fusion for 3D Geometry Acquisition

4.2.1 System Configuration

The provided system basically comprises three components: a sensor, a turntable, and a control unit (see e.g. FIG. 13(a)). This is similar to the 2D garment digitalisation solution mentioned in Section 2, except for the additional Kinect sensor. The provided method tries to create a high quality texture map by stitching multiple HD images from Kinect. However, if required, the system could be easily modified to have a separate imaging sensor, e.g. a digital single-lens reflex camera (DSLR), in addition to a depth sensor.

A mannequin is placed on a turntable so that a user can style a garment properly before digitisation, and both the speed and the direction of rotation can be controlled through the control unit. The provided system is also capable of reading the rotation angle in realtime, but there might be some latency between the triggering signal and actual data reading and this delay could be noticeable when the turntable rotates fast (e.g. greater than 5 rpm). Therefore, either a software or a hardware synchronisation is required for a fast rotation.

4.2.2 Camera Models

A camera geometry of the provided system is relatively equivalent to that with a rotating camera around the fixed mannequin. Therefore, we can parameterise the camera matrix in terms of a rotation angle.

Suppose that a camera and a turntable have separate coordinate systems denoted as $F_t$ and $F_c$ respectively (see e.g. FIG. 13(b)), where the subscription 'c' and 't' represent a camera and a turntable. Also, we consider $F_c$ as our reference coordinate system to make the computation simple. In this case, the camera matrix at a starting point can be simply described as follows:

$$P_0 = \begin{bmatrix} K & \vec{0} \\ \vec{0}^T & 1 \end{bmatrix}, \qquad (30)$$

where K and $\vec{0}$ represent a 3×3 intrinsic camera matrix [19] and a 3×1 zero vector, respectively. Since we use fixed camera parameters (such as focal length) throughout any single digitisation process, we assume K in (30) is constant.

Assuming that the rotation is a pure planar motion happening in the plane Π (see the basis vectors x' and z' in FIG. 13(b)), the i-th camera matrix formed after $\theta_y$ rotation is described as:

$$P_i(\theta_y) = \begin{bmatrix} K & \vec{0} \\ \vec{0}^T & 1 \end{bmatrix} \begin{bmatrix} I & \vec{t}_0 \\ \vec{0}^T & 1 \end{bmatrix} \begin{bmatrix} R_y^T(\theta_y) & \vec{0} \\ \vec{0}^T & 1 \end{bmatrix} \begin{bmatrix} I & -\vec{t}_0 \\ \vec{0}^T & 1 \end{bmatrix}, \qquad (31)$$

where I, $\vec{t}_0$, and $R_y(\theta_y)$ denote a 3×3 identity matrix, a 3×1 translation vector from the origin of $F_t$ to the origin of $F_c$, and a 3×3 rotation matrix about the y axis of $F_t$, respectively. Thus, we can easily derive (30) from (31) by inserting a zero rotation and a zero translation, i.e. $\vec{t}_0 = \vec{0}$ and $R_y(\theta_y) = I$.

However, the rotation axis of a mannequin does not always align with the y axis of a turntable, i.e. $F_c$. Furthermore, the axis can wobble during a rotation. Instead of modelling the dynamic motion with a full rigid transform, we approximate this with a single rotation about the z axis of $F_t$ (see the coordinate system with the basis vectors x" and y" in FIG. 13(b), for example).

Consequently, our camera model is defined as:

$$P_i(\theta_y \theta_z) = \begin{bmatrix} K & \vec{0} \\ \vec{0}^T & 1 \end{bmatrix} \begin{bmatrix} R_y^T(\theta_y) R_z^T(\theta_z) & \vec{t}_0 \\ \vec{0}^T & 1 \end{bmatrix} \begin{bmatrix} I & -\vec{t}_0 \\ \vec{0}^T & 1 \end{bmatrix}, \qquad (32)$$

where $R_z(\theta_z)$ represents a rotation matrix about z axis of $F_t$ and we assume that it is constant.

4.2.3 Calibration

Since $\vec{t}_0$ and $R_z(\theta_z)$ in (32) are constant during the digitisation process (default values for K are also given by a sensor manufacturer), we estimate them at a separate sensor calibration stage. By rearranging (32), we define external camera parameters, such as rotation R' and translation vector $\vec{t}'$ as follows $$\begin{cases} R' = R_y^T(\theta_y) R_z^T(\theta_z) \\ \vec{t}' = \{I - R_y^T(\theta_y) R_z^T(\theta_z)\} \vec{t}_0. \end{cases} \qquad (33)$$

As $R_y$ is determined by actual angle reading from a turntable, our calibration process is basically to find out $\vec{t}_0 = [t_x \; t_y \; t_z]$ and $R_z^T(\theta_z)$. If we can measure R' and $\vec{t}'$ experimentally then we can recover $\vec{t}_0$ and $R_z^T(\theta_z)$.

Although conventional KF easily breaks down with a fast motion, a relative camera pose (i.e. R' and $\vec{t}'$) can be inferred reliably under a slow motion (e.g. <0.1 rpm). Therefore, the provided calibration simply collects the camera poses from a slow motion using a conventional KF and averages them.

Some examples of estimated external translation parameters are shown in FIG. 14. We can observe from the figure that the estimated $t_x$ and $t_y$ are unstable under a small rotation (e.g. ≤10°), even though the camera motion is very slow. This is mainly because that ICP is normally unable to distinguish a small rotation from a simple translation. Therefore, values from a small rotation (e.g. $\theta_y$<10°) should be removed from the averaging process.

4.2.4 Overall Reconstruction Pipeline

Figure 15:
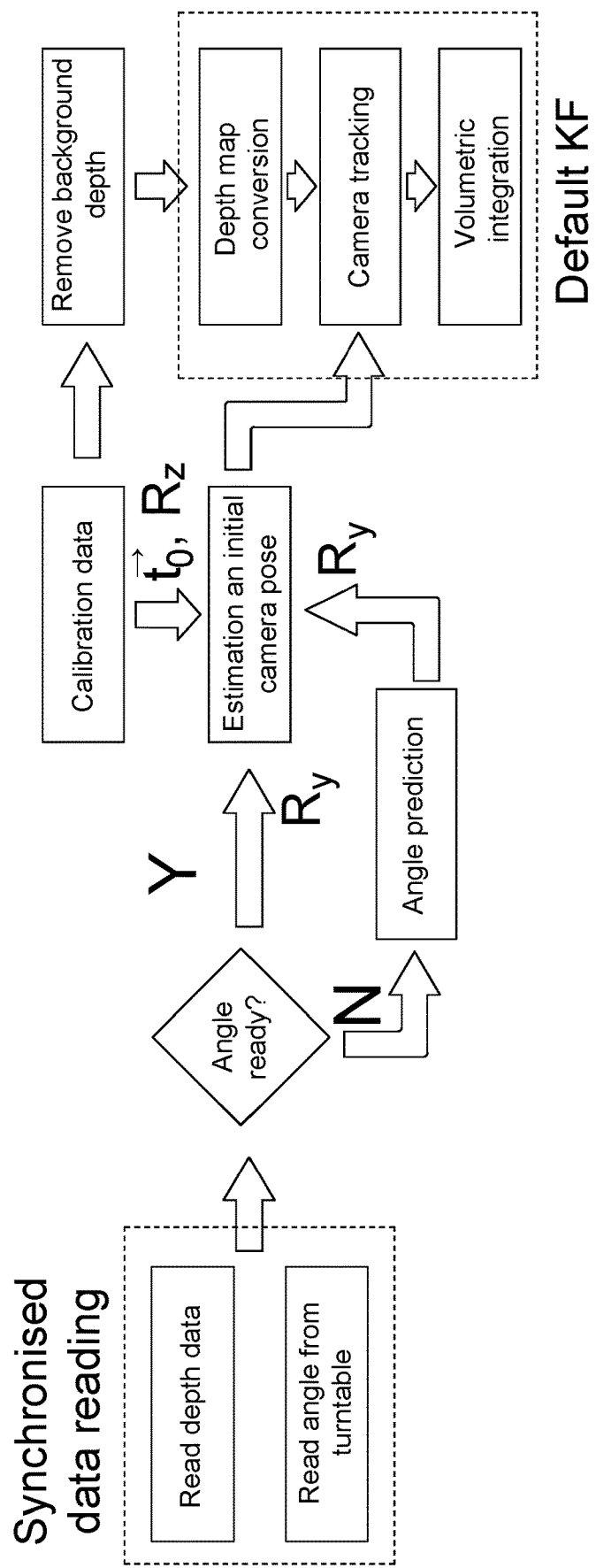
FIG. 15: An example overall workflow of the method provided in Section 4.2.4, where the rightmost lower three processing blocks represent the process from a default KF, whilst the other blocks are added by the provided method.

An overall workflow of an example of a provided method is presented in FIG. 15, where the processing blocks in the dotted box represent the process of a default KF. Please note that the KF workflow shown in FIG. 15 may be a simplified version of an actual process. For example, an actual workflow may allow the camera processing block to have a feedback from the previously integrated depth maps to improve the tracking performance [21].

One of the important processing blocks of a conventional KF is probably the camera tracking block, because it estimates a relative camera pose to link a current depth map with the previously fused result. In fact, KF provides two options for a better camera tracking; one using accumulated depth maps, and the other using a snapshot of the accumulated depth maps at the previously estimated camera position.

The quality of reconstruction is generally better with the former as it accounts for the global shape, but it will not work well with a non-rigid motion, e.g. a body motion. On the other hand, the latter works better with a non-rigid motion but gives a locally optimised camera pose at times.

Therefore, if a camera moves fast, the reconstruction result is generally better with the latter. However, it does not mean that it can deal with every situation. For example, a fast rotation is always challenging as the shape changes significantly but there is a small overlap between adjacent depth maps (e.g. the shape difference between the front and the side of a mannequin). Hence, the provided solution is designed to provide a better initial guess for the camera tracking whenever it is possible. We call this approach Guided Kinect Fusion (GKF).

GKF predicts a new camera position from (33). Thus, "Estimate an initial camera pose" block in FIG. 15 requires two inputs, i.e. $\vec{t}_0$ and $R_z$ from "Calibration data" and the rotation angle $\theta_y$. The rotation angle can be measured directly from a turntable but we have found that frequent angle reading could be a bottleneck of the whole process and that there is a noticeable latency between actual angle reading and a triggering signal particularly when a turntable moves fast. To address this, we minimise the number of angle readings, but predict the next angle based on a simple linear model. This approximate rotation angle input is sufficient enough for "Camera tracking" to optimise the pose.

4.2.5 Geometry Reconstruction Results

To compare the shape reconstruction of GKF with a conventional KF method, we scan different types of garments under the same conditions.

In this test, we set the distance from the sensor to a garment between 1.5 and 2 metres and the voxel resolution is fixed for all test garments. To minimise the effect from a background scene explicitly, we capture the reference depth map during the sensor calibration and use it to mask out background depth values. For camera tracking, both methods are set to use a default ICP-based tracking algorithm for its accuracy in the reconstructed geometry.

Synchronisation between the angle reading and the Kinect sensor data reading is another important point to make KF work with a fast motion. In our test, we use software synchronisation that runs two threads in parallel to read the frame data from the Kinect sensor and an angle measurement simultaneously (see e.g. the "Synchronised data reading" in FIG. 15).

Although the second version of Kinect is generally robust to the ambient lighting, the garment material might have an effect on reconstruction; for example, some material might absorb or reflect the infrared light projected from the Kinect sensor. Thus, a garment with a very dark colour or a reflective garment was excluded in our test.

Four garments (i.e. dress, shorts, trousers, and top) are scanned at different rotating speeds (i.e. 1, 3, and 5 rotations per minute (rpm)) to demonstrate how robust the provided algorithm is with a dynamic scene. Some of the reconstruction results can be found in FIG. 16 and FIG. 17. When the rotation is slow (i.e. ≤1 rpm), both methods can manage to deliver good reconstructions, in which there is no considerable difference between GKF and KF by visual inspection. However, KF starts to break down at 3 rpm (see FIG. 16(b)) and it is worse at 5 rpm (see FIG. 17(b)), whilst an example of the provided method can produce a good reconstruction result regardless of the rotating speed. This means that we can retrieve a garment model even from widely separated static images, and the test shows that we can get a reasonable reconstruction result up to about 45° rotation.

4.3 Creating Seamless Texture

GKF introduced in Sec. 4.2.4 is designed to reconstruct a subject on a rotating turntable. Thus, there is no processing block for colour reconstruction in FIG. 15. To complement this, we develop a new workflow to create a texture map from multiple images. This is basically similar to seamless image stitching problems [15, 22], but slightly more complex as we need to solve the following sub-problems; e.g. a) how to extract a garment model from an initial foreground reconstruction; b) how to estimate vertex visibility (e.g. which image should not be used to define the colour of a vertex); and c) what is an optimal vertex classification that minimises the stitching seams. We find that these three problems are closely related and can be formulated as classification problems solvable using a graph-cut optimisation [39].

4.3.1 Garment Model Extraction

The first step of the seamless texture mapping is to extract a garment model from an initial reconstruction, which normally contains some parts of a mannequin (or some background scene) in addition to a true garment (see e.g. FIG. 18(a)). This is not a trivial problem because we cannot expect neither true colour nor precise shape from KF. A reconstructed model from KF is generally smoother than actual shape, because it uses the voxel-based representation [12] to suppress the effect from vertex outliers.

One intuitive way to solve this would be using a depth difference from a reference depth map like a background image segmentation [35]. However, this idea doesn't work with a tight-fit garment and it can be difficult to store all the reference depth maps at every rotation. Instead, we have developed an algorithm using garment masks at a few different viewing positions (see e.g. FIG. 18(b)). Since an example of the provided method is designed to collect a garment image at every 45°, we can reuse the image-based garment segmentation previously developed for the 2D garment digitisation based on the retro-reflective mannequin [31] as mentioned in Section 2.

Suppose that we have a projection matrix $P^c$ and a garment mask $I_g^c$ for a camera c, of which the coordinate system is $F^c$ [see e.g. FIG. 18(a)], and that the topology of an initial 3D model is defined as a $M_{init}=\{V_{init}, F_{init}, E_{init}\}$, where $V_{init}$, $F_{init}$, and $E_{init}$ are a set of vertices, a set of faces, and a set of edges, respectively. In this case, it is simple to determine whether a vertex from $V_{out}$ falls within the mask $I_g^c$ or not by back-projecting it using $P^c$, e.g. $\vec{v}_1$ and its projection $\vec{p}_1^c$ in FIG. 18(a).

Let $R^c$ be a set of vertices whose projections are found inside the garment mask $I_g^c$. In this case, we can extract a garment model by intersecting all $R^c$ from $t_k$ camera positions.

$$V_g = \bigcap_{k=1}^{t_k} R_k^c, \tag{34}$$

where $V_g$ is a set of vertices which defines a true garment model, $M_g=\{V_g, F_g, E_g\}$. This is a simple binary operation having a linear complexity. However, it is difficult to use this approach in practice, because the shape of a garment is not convex, e.g. a single hole from one garment mask can change the shape significantly. To address this we modify (34) to use $R_k^c$ selectively according to vertex visibility.

Suppose $S^c$ is a set of visible vertices from a view $I_g^c$. $S^c$ is different to $R^c$ in that it does not include any occluded vertex. However, it is not a subset of $R^c$ as a visible vertex can be a part of a mannequin, e.g. $\vec{v}_2$ in FIG. 18(a) is in $S^c$ but not in $R^c$. To define $S^c$, we not only validate a vertex against a depth buffer at each camera position, but also discard a vertex pointing far away from the viewing direction of a current camera. Thus, the visibility of a vertex is not binary but a real value from the angle difference between a normal vector and a camera viewing vector, i.e. the smaller the difference the more confident we are.

To extract a true garment model, in an example we evaluate (34) only with confidently visible vertices. This selective intersection can avoid the incorrect space carving. More details an example of an algorithm are presented in Algorithm 1, where $t_f$ and $f_{conf}(\vec{v}_i)$ denote a threshold for the visibility confidence and a function that returns the visibility confidence of a vertex $\vec{v}_i$. For Algorithm 1, please see FIG. 37.

Algorithm 1 can give a reasonable result in most cases. However, the result may contain small holes depending on $t_f$ and $t_k$. Instead of repairing this with a heavy optimisation algorithm at this stage, we devise a simple greedy iterative algorithm.

During the initial garment segmentation, we assign an image ID (an image ID represents one of the keyframe images), $l_i \in \{0, 1, \ldots, t_k\}$, to each visible vertex $\vec{v}_i$. For example, each vertex has an image ID that can give us the most confident visibility. This can be considered as initial vertex segmentation of the initial model $M_{init}$.

Thus, the provided method collects all connected components from $V_{init}$ and puts them into a single queue, which can sort the components by their size. Once the queue is ready, we pop out the smallest component from the queue recursively and swap the image ID of the component with that of its surrounding components.

This approach could possibly create another small component at each swapping operation, so that we iteratively remove the connected component until there is no small component. A pseudo code of this algorithm is given in Algorithm 2, where $t_i$, $t_s$, and $h(\bullet)$ represent a threshold for the number of iterations, the minimum size of a connected component, and a function that returns the frequency of an image ID appearing at the component boundary, respectively. A result of Algorithm 2 is shown in FIG. 18(c). For Algorithm 2, please see FIG. 38.

4.3.2 Optimal Visibility

The initial segmentation from Algorithm 2 is good enough to extract a garment model. However, it is not optimised for creating a good texture map. For example, if we have multiple connected components around complex geometry, it is highly likely to produce noticeable stitching seams.

One of the main reasons of this is that the shape from KF is an approximation which cannot capture some small details. Also, a projection matrix from (32) may be not accurate to define a pixel position at times. To minimise this visual artifact, we should refine the initial segmentation from Algorithm 2 so that the boundary between segments is defined at a place where the colour difference is minimal.

This is basically reassigning a segment ID of a vertex in a graph structure, so that we can model the problem as a Markov network problem, in which a segment ID of a current vertex is affected only by its directly connected neighbour vertices to enforce a smooth transition between segments. In general, solving this type of problem is time-consuming but we adopt a graph-cut algorithm to address this.

Let $\vec{l}$ represent a vector of segment IDs for every vertex in $V_g$. In this case, the goal of our optimisation problem is to find out an optimal label vector $\vec{l}o$. The total cost of a label vector $E(\vec{l})$ is defined as a weighted sum of the data cost $E_d(\vec{l})$ and the local smoothness cost $E_{smooth}(\vec{l})$ as follows:

$$E(\vec{l}) = E_d(\vec{l}) + \lambda E_{smooth}(\vec{l}), \quad (35)$$

where $\lambda$ is a weighting coefficient.

4.3.3 Cost Functions

The data cost $E_d(\vec{l})$ in (35) is a sum of all vertex costs $d(l_i)$ that measure the cost of being classified as a given segment ID $l_i$ as follows:

$$E_d(\vec{l}) = \sum_{i=0}^{|V_g|-1} d(l_i), \quad (36)$$

where $l_i$ is a segment ID for the i-th vertex, i.e. $l = [l_0, \ldots, l_{|V_g|-1}]$, $0 \le l_i < t_k$ and $l_i \in \mathbb{Z}$; and $d(l_1)$ in (36) is defined as:

$$d(l_i) = 1 - \left\{ \frac{\sum_{f_j \in N_f(\vec{v}_i)} a(f_j, l_i) T(f_j, l_i)}{|N_f(\vec{v}_i)| a_{max}} \right\}, \quad (37)$$

where $N_f(\vec{v}_i)$, $a_{max}$, and $T(f_j, l_i)$ represent a set of facets in $F_g$ sharing a vertex $\vec{v}_i$, the area of face $f_j$ on a garment mask $I_g^{l_i}$, the maximum size of all projected facets, and the binary indicator $$T(F_j, l_i) = \begin{cases} 1, & f_j \text{ is visible from } I_g^{l_i}, \\ 0, & \text{otherwise} \end{cases} \quad (38)$$

respectively. This means that we penalise assigning $l_i$ to a vertex $v_i$ if the visible area of its neighbour facets is small. For simplicity, we use a binary visibility cost in (38), but this can be a continuous function, e.g. a product of the confidence values of visible vertices. Similarly, we can define the smoothness cost in (35) from local neighbours as follows:

$$E_{smooth}(\vec{l}_i) = \sum_{\vec{v}_i \in V_g} \sum_{\vec{v}_j \in N_v(\vec{v}_i)} s(l_i, l_j), \quad (39)$$

where $s(l_1, l_1)$ is a function that estimates the cost of local smoothness of $v_i$.

Unlike the data cost, we define $s(l_1, l_1)$ using the colour difference between the seed and its neighbour vertices, $$s(l_i, l_j) = \frac{1}{|\Omega(l_i)|} \sum_{\vec{p} \in \Omega} \max_{k \in C} \{|I_k^i(\vec{p}) - I_k^j(T_{i,j}\vec{p})| / 255\}, \quad (40)$$

where $C$, $\Omega(l_i)$, and $T_{i,j}$ represent a set of colour channels, a rectangular region of interest in an image $l_i$, and a linear transform that maps a pixel in image $I^i$ to a pixel in $I^j$, respectively.

4.3.4 Graph Construction and Post-Processing

A classic graph cut (GC) algorithm is a binary classification. Thus, we have to modify the graph structure properly to make it work for a multi-class problem. There are two ways to use GC for multi-class classification (i.e. $\alpha$-expansion and $\alpha$-$\beta$ swap) [3], and in an example we adopt the $\alpha$-expansion algorithm in our test because of its simplicity.

After obtaining new segmentation from the GC, the next thing to do is to create a texture map. Since each mesh segment corresponds to an image patch, we create a single texture map image by combining multiple patches. It is worth noting that there are many algorithms to compact multiple texture patches efficiently by minimising the gaps between patches [25]. However, we use simple packing as this is beyond our interest at the moment.

Although the segment is optimised, there is plenty of room for further refinement. For example, we can refine the projection points around the boundary to refine any colour misalignment across the stitching seam or we can apply a simple colour feathering [37] around stitching seams. This additional colour correction can help to mitigate the ghosting artifacts. For simplicity, we have implemented the blending algorithm that creates a new colour from the weighted sum of nearby colours.

If a strong directional light is used, the provided method might create visual tone differences between final segments. At the moment, we use a simple colour blending to smooth the differences out, but this might not be sufficient for eliminating a strong tone difference. If this is the case, it might be better to use advanced seamless image stitching algorithms based on colour gradients, such as Poisson image stitching [29] or Laplacian blending [24].

4.3.5 Experimental Results

As mentioned earlier, an example of the provided method extracts a true garment model from an initial scan result. This process can also give us initial mesh segmentation as a by-product. FIG. 19 shows an example of an initial garment segmentation, where each colour on a garment model represents a different keyframe image and the corresponding texture patches are shown in FIG. 19(*a*).

Figure 20:
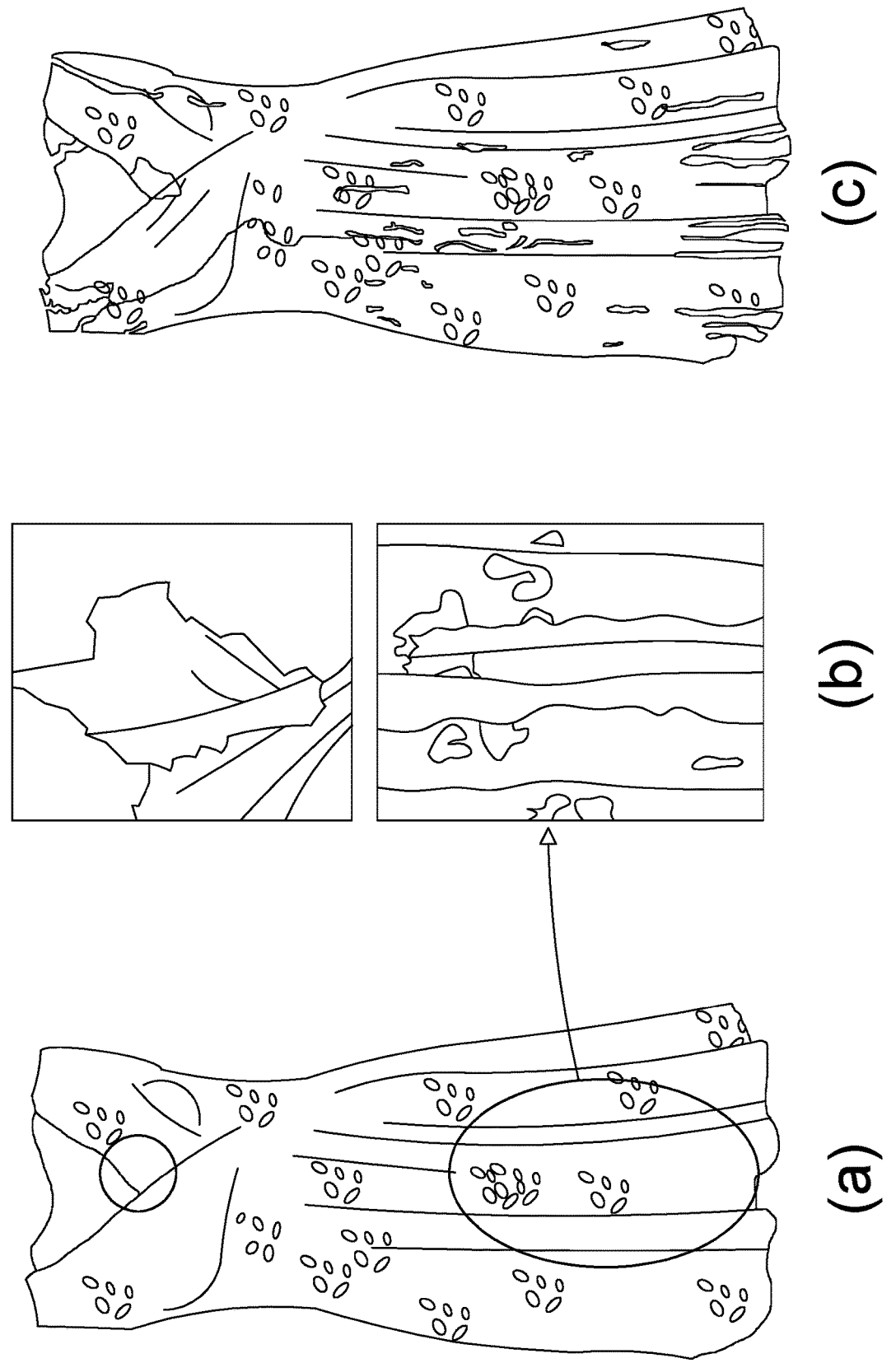
FIG. 20: Examples of visual artifacts without optimisation, as described in Section 4.3.5: (a) rendering result of FIG. 19; (b) close up views of visual artifacts around stitching seams; (c) rendering results after the boundaries between segments are removed.

Some rendering results using this texture map are shown in FIG. 20(*a*). This is better than the colour from a standard KF (see e.g. FIG. 12(*b*)); we can see more sharp features and there is no incorrect colour from averaging outliers. However, we can easily notice strong stitching seams between segments, particularly around complex geometry, e.g. creases from drapes and knot (see FIG. 19(*b*) for a close look).

Since the colour artifact only happens around the stitching seams, one way to address this problem is to update the colour at the boundary. However, the initial segmentation normally creates a large number of small segments as it does not account for the local smoothness. Consequently, we can have many boundaries to repair as shown in for example in FIG. 19 (*c*). Alternatively, an example of the provided method modifies the initial segmentation by enforcing the local connectivity. This can help to reduce the number of small patches. In addition, the provided optimisation can deform the shape of a segment to make the colour difference around its boundary small.

Different views of an optimised segmentation are shown in FIG. 21, by way of example. The first row of FIG. 21 shows some views of an initial segmentation, whilst the second row shows the results after our optimisation. As we do not explicitly constrain either the number of segments or the size of the minimum segmentation in (35), it is still possible to have a few small segments after the GC optimisation, but they will not contribute to create colour artifacts at least.

If the GC optimisation is too slow, the algorithm can be modified to use a multi-resolution approach, in which we create several versions of simplified meshes from an initial mesh then propagate a GC solution from the lowest level to the highest level.

Final rendering results examples of a reconstructed 3D garment model (i.e. colour and shape reconstruction of a garment) are shown in FIG. 22 and FIG. 23. To assess the quality, we compare the final result (FIG. 22(*a*)) with that without the seam optimisation (FIG. 22(*b*)) and with the actual colour image captured from Kinect (FIG. 22(*c*)). Please also note that there is a slight geometry difference between FIGS. 22(*a*) and (*b*). This is because of the final mesh smoothing applied to smooth out the jaggy meshes at the boundary of a 3D model.

Using the above 3D garment scanning results acquired by algorithms in Section 4.2 and 4.3 as the start point, we can further apply a template mesh fitting step in combination with the shape-from-silhouette approach as described in Section 3.1.5. This will finally generate a simplified and clean garment model with a common mesh topology for physics simulation (see Section 5).

5 Garment Physical Simulation

Provided with a 3D garment model created from shape-from-silhouettes (Section 3) and/or depth fusion (Section 4), we wish to know how such a garment deforms on various 3D body shape models of users, which are regressed from a number of tape measurements and body metric inputs (see e.g. FIG. 24). This will eventually allow us to model and visualize the garment fit in a realistic way. To solve this problem, we implemented a customised physical simulation engine based on nVidia PhysX™ library, which has been widely used in 3D game development and in the movie industry.

Physical simulation approaches have been used to model highly-detailed deformation of the computer-aided design (CAD) model of a cloth or a garment with respect to the gravity and collisions with the body model [6, 7, 9, 10, 28]. These approaches cannot be directly applied in our garment modelling framework. The issue stems from the way we digitise the garment model. Since garments are dressed on the mannequin during the photography stage, deformations by gravity and contact forces of the mannequin are captured in the texture images, and hence are also encoded in the 3D garment model created. It follows that modelling a full level of detail in the physical simulation actually duplicates the draping process and ends up in texture distortion in the final render (a "double-draping" artifact). Instead, we perform a constrained physics simulation, i.e. using a low level of level simulation to smoothly deform the garment so that it addresses the change of body shape (see Section 5.2 for more details about how to control the level-of-details of a physics simulation). The gravity parameter should also be set to near zero in the simulation to avoid the aforementioned "double-draping" artifact.

5.1 Setting Up the Physics System

For each 3D garment model, we build a 3D spring-mass network using rigid objects and spring joints in the physics library. Vertices of the garment model are turned into spherical mass nodes, which are connected by the springs to their neighbouring vertices. This model allows us to simulate various different configurations of a garment. For example, we can scale up or down the natural length of the spring to simulate different garment sizes of the same type of garment (see FIG. 26 for an example). On the other hand, we also set different spring constants to account for the stretchiness and the stiffness of the garment material (see FIG. 25 for an example). The garment deformation can thus be simulated by rigid-object dynamics on the surface defined by the body model.

5.2 Controlling the Detail Level of a Simulation

To solve the problem of smooth simulation, we provide a deformation smoothness control mechanism for our garment physics engine. Mathematically, we can use the following equation to formulate a general garment physics simulation problem:

$$G^* = \arg\min_G f(G, B, G_0, \Omega), \tag{41}$$

where f is an abstract objective function that represents the scene to simulate, which is dependent on the 3D body shape B, the initial geometry of the garment model $G_0$, and other scene parameters $\Omega$, which will include but is not limited to the gravity and the physical attributes of the garment material (e.g. stretchiness, stiffness, and friction);

G* refers to the optimal garment deformation that minimises the objective function $f$, which is in general highly non-convex. In our context, this non-convex optimisation problem is solved by the physical simulation engine.

To perform a simulation with a lower detail level and a higher deformation smoothness, we augment the objective function $f$ with an extra smoothness term:

$$G^* = \arg\min_G \tilde{f}(G, B, G_0, \Omega) = \qquad (42)$$
$$\arg\min_G \left( f(G, B, G_0, \Omega) + \gamma \min_A \|G - AG_0\|^2 \right),$$

where the matrix A defines an affine transform of a 3D mesh. Here, the newly-defined smoothness term regulates that the final optimisation solution, i.e. the result of physical simulation, should be similar to the affine transform of its original shape $G_0$ obtained in the garment model creation. The weighting factor $\gamma$ will allow us to control the level of simulation detail as shown in FIG. 27, by way of example. With $\gamma=0$, a very detailed physical simulation will be performed and more draping effects can be seen in the results of simulation. With a higher $\gamma$, the simulation result becomes much smoother and it is closer to an affine-transform version (mostly a scaled version with no pose change) of the original garment model.

Fortunately, the optimisation of the modified objective function $\tilde{f}$ in (42) can also be solved by the physical simulation engine in an iterative way by introducing auxiliary kinematic mass-nodes that represent the vertex positions of the smoothness shape prior $G_0,t=A_tG_0$ at the current time t as well as springs that connect the corresponding vertices of the shape prior $G_0,t$ and the simulation target $G_t$. In each iteration of simulation, the shape prior $G_0,t$ is updated by solving the least square minimisation problem based on the simulation result at time t−1. The main simulation at time t will then be based on the updated shape prior $G_0,t$. This process can be written into the following set of equations.

$$A_t = \arg\min_A \|G_{t-1} - AG_0\|^2, \qquad (43)$$

$$G_0, t = A_t G_0 \qquad (44)$$

$$G_t = \arg\min_A (f(G, B, G_0, \Omega) + \gamma \|G - G_0, t\|^2) \qquad (45)$$

As a by-product, we also observe that by applying a smoothness weight in the physical simulation, the time to convergence and the chance of converging into a local minimum are considerably reduced.

6 Modelling Garment Texture Deformation

Figure 28:
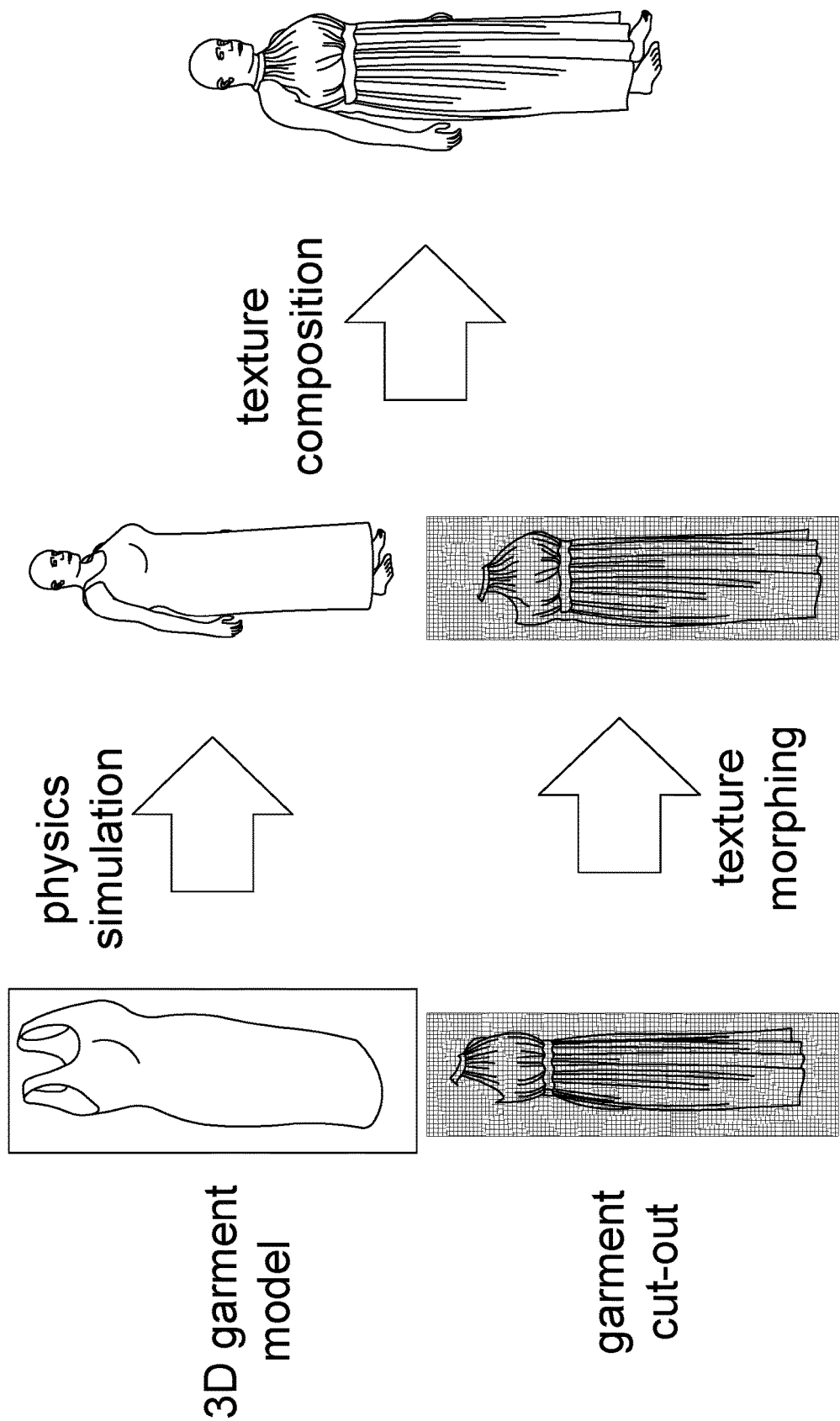
FIG. 28: Schematic example of garment texture deformation based on the result of physical simulation, as described in Section 6.

The physical simulation stage allows us to model the geometrical deformation of the 3D garment model with respect to users' body shapes. In the final stage of the garment visualisation system, we render the garment appearance models (i.e. textures) according to the result of garment physical simulation, so that we can finally synthesize the deformed garment textures and visualize how the garment looks like on a real body shape in the specified camera views (see e.g. FIG. 28 for an illustration of the process).

It is worth to mention that in the digitisation stage of the system, we photograph garment textures of several different camera views under a high-quality studio lighting environment. The garment textures captured are lighting-encoded instead of lighting-free. This implies that cast lighting using computer graphics techniques on the garment texture is inappropriate. The correct solution is to deform the original lighting-encoded garment texture sprites in accordance with the shape change of the garment model in the corresponding viewpoint. This approximation works well to preserve the realism of the lighting in the case that the garment deformation caused by body shape and pose changes is mostly in-plane rather than out-of-the-plane, although some additional processing is required to handle the area around the silhouettes (see Section 6.2).

6.1 Standard Texture Mapping

To encode the texture of a 3D shape, the standard approach used in computer graphics literature is to perform a texture mapping which maps every single mesh vertex to a 2D coordinate (u,v) on the texture image. Texture mapping needs to be slightly modified before being applied to our problem, because the 3D garment model we have created is a simplified version of the real garment geometry. The textures of laces and appendages around the boundaries in some garments will not correspond to any mesh vertex of the garment model, and hence we need to perform a texture extrapolation in those situations.

Figure 30:
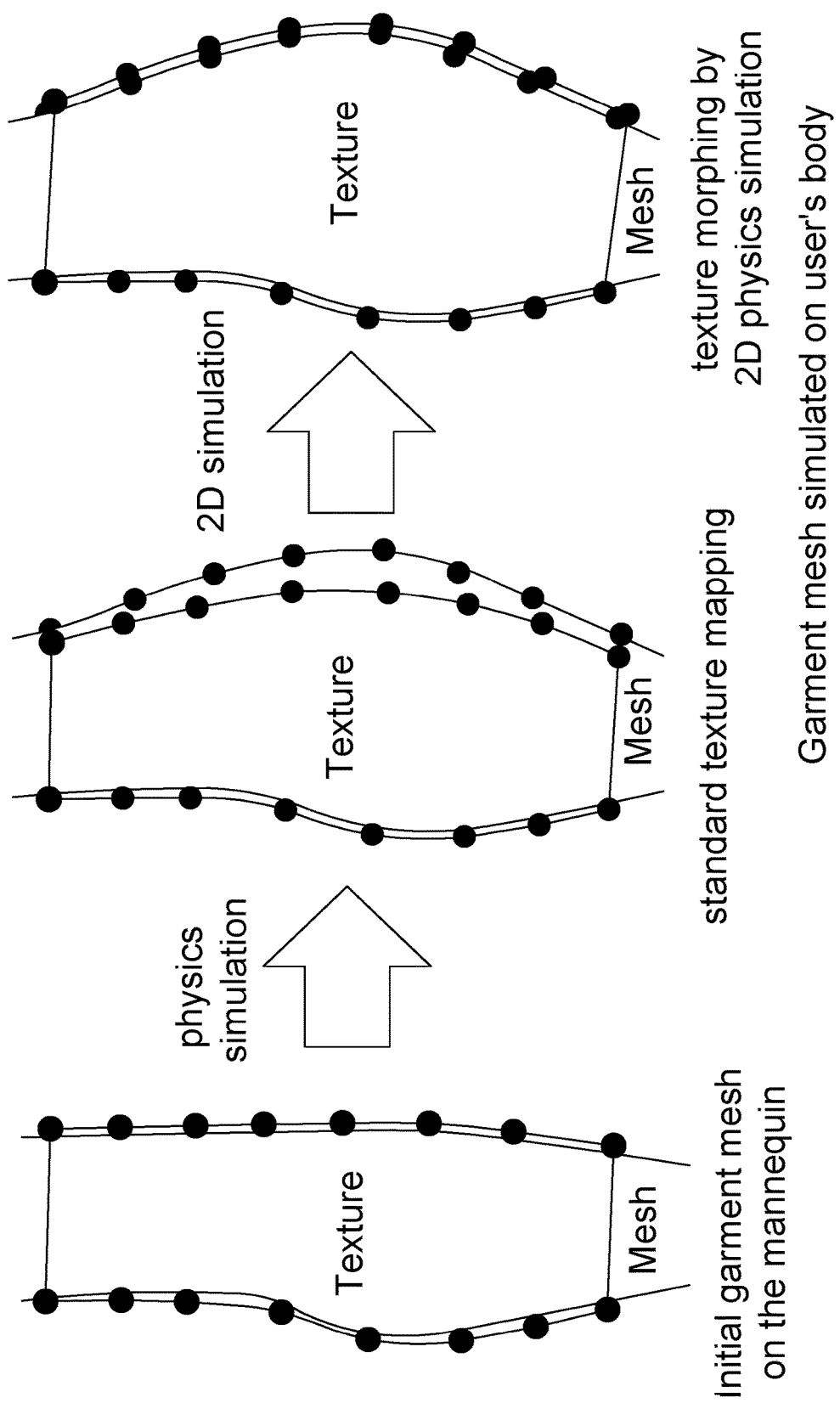
FIG. 30: An explanation of the difficulties in garment texture morphing, as described in Section 6.1, as a schematic example.

However, we find that the standard approach fails to provide satisfactory visualisation results in the context of our garment texture deformation problem (see the left image pair of FIG. 29, for example), especially when a large geometrical deformation of the garment model happens in the physics simulation stage. The typical visual artifacts we can observe are that the garment silhouettes become unsmooth and the body flesh becomes visible around the silhouettes. The cause of the problem lies in the fact that the texture mapping is built based on the vertex and triangle positions of the initial garment model. When the mesh deforms in the physical simulation, those mesh triangles that used to be invisible in the initial mesh (and hence were textureless) are brought into view after the simulation (see FIG. 30 for an illustration example).

6.2 Texture Morphing Based on 2D Physics Simulation

In the previous sub-section, we observed that what causes the failure of the standard texture mapping is that the set of silhouette vertices have changed after the shape deformation of the garment model. Hence, the key of solving this issue is to control the movement of those silhouette vertices and make sure that they won't go inside the silhouette of the 3D body model in the corresponding camera view during the simulation process.

To address this problem, we provide a novel approach which revises the texture warping result of a standard texture mapping in each camera view using a 2D physical simulation to guarantee the silhouette consistency. In the 2D physical simulation, we deform the silhouette of the garment on the collision obstacle formed by the projection of the body model in the corresponding camera view. The nice property of this process is that the silhouette of the garment model is constrained to stay outside the silhouette of the body model, which is exactly the property we desire in the texture morphing process (see FIG. 30 for an illustration example).

In the actual implementation, we solve the aforementioned 2D physical simulation with the 3D physical engine by building an equivalent 3D physics system. To set up the simulation scenario, we first create a collision obstacle of a viewing cone based on the silhouette of the body model in a given camera view with a peak at the camera center (see FIG. 31 for an illustration example). The object to simulate on this collision cone is the same spring-mass network built on the 3D garment model. However, in this 2D simulation case, only those mass nodes that correspond to those mesh vertices lying on the silhouette of the initial garment model are interacting with the collision cone we have generated. Other internal mass nodes of the garment spring-mass network are not influenced by the collision cone, but their movements are constrained by the springs connected between them and their neighbouring mass nodes. In the case of simulating a complex garment, e.g. a sleeved top, we then break the garment model into layers (e.g. left sleeve, torso, right sleeve, etc.) and simulate each layer on the collision cone of the corresponding body part.

In order to minimise the difference between the garment mesh obtained in a standard 3D simulation and the result obtained in this view-based simulation, we further encode a prior global smoothness of the shape of the standard simulation result (see Section 5.2 for the approach) to all the mass nodes being simulated in the 2D view-based simulation scenario. This allows that those inside textures of the garment are less affected by this revision process and are closer to their original shape in the standard texture mapping.

In mathematics, by building up this physical simulation framework, we are equivalently solving an optimisation problem in which we try to find a revised garment mesh $G_v^*$ for each camera view $v$, such that it minimises the overall deformation of the garment model $G$ from the result of the standard 3D garment simulation $G^*$ while satisfying the camera-view constraint $f_v$ that the mass nodes of the garment model on the initial silhouette won't penetrate inside the projection of the body model in that camera view $v$, as (46) shows.

$$G_v^* = \underset{A}{\arg\min} \left( \vec{f}_v(G, B_v, G_0, \Omega_{2D}) + \gamma_{2D} \|G - G^*\|^2 \right), \quad (46)$$
$$v = 1, 2, \ldots, V,$$

where $B_v$ stands for the collision cone defined by the projection of the body model in view $v$; $\Omega_{2D}$ and $\gamma_{2D}$ are the simulation parameters of the scene and the shape prior weighting factors respectively, distinguished from $\delta$ and $\gamma$ used for 3D simulation.

An example of the results of this approach is given in the right-hand-side figures of FIG. 29, by way of example. We can see the issues in the standard texture mapping (eg. left-hand-side figures of FIG. 29) have been resolved.

6.3 End-to-End Results of Garment Visualisation

The garment visualisation system combines 3D body models created by performing a regression from users body dimensions and tape measurements [8], and the garment models (a 3D mesh with appearance models of multiple 2D texture images), which are created in the earlier digitisation stage to yield the end-to-end result in the form of a final render of a dressed body model.

Figure 32:
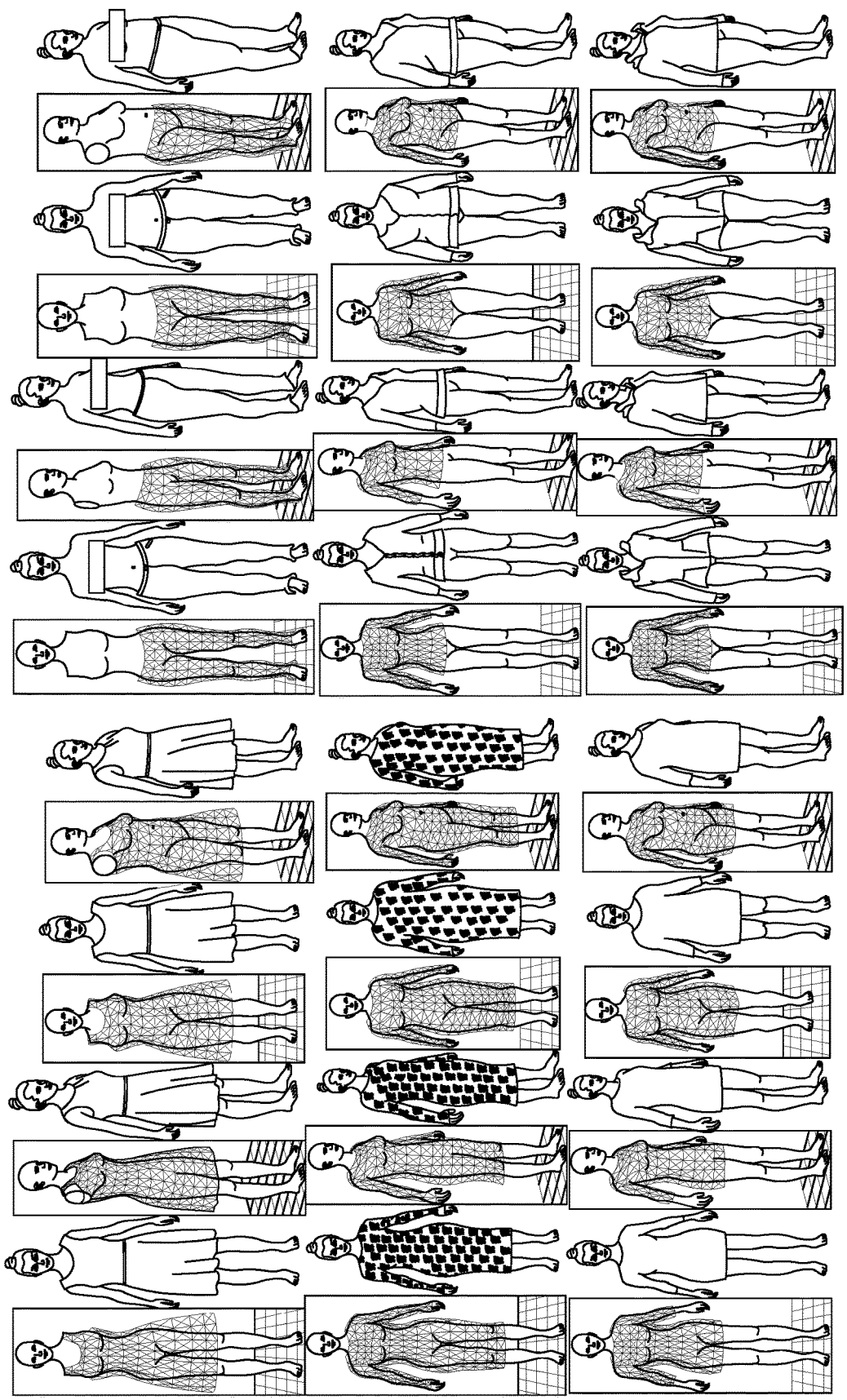
FIG. 32: Examples of physical simulation (left) and final visualisation (right) of a range of garments on two different distinctive body shapes based on the approaches described in Sections 5 and 6.

As a validation, we test the approach we provided in Section 5 and 6 on a range of different types of garments with different body shapes. We provide the system with the output of the 3D garment model digitisation system: camera calibration matrices of 8 viewpoints, the 3D garment model created by template model fitting, and garment texture sprites segmented by the automatic cut-out algorithm. Some of these final rendering results are shown in FIG. 32 along with the visualisation of the 3D physical simulation, by way of example. For these qualitative visualisation test cases, the provided system is able to correctly simulate 3D garment models of different types on the body shapes, and create renders on a user's body model in the specified viewpoints with reasonable realism.

7 Pre-Computation and Interpolation of Physics Simulation and Texture Morphs

Figure 34:
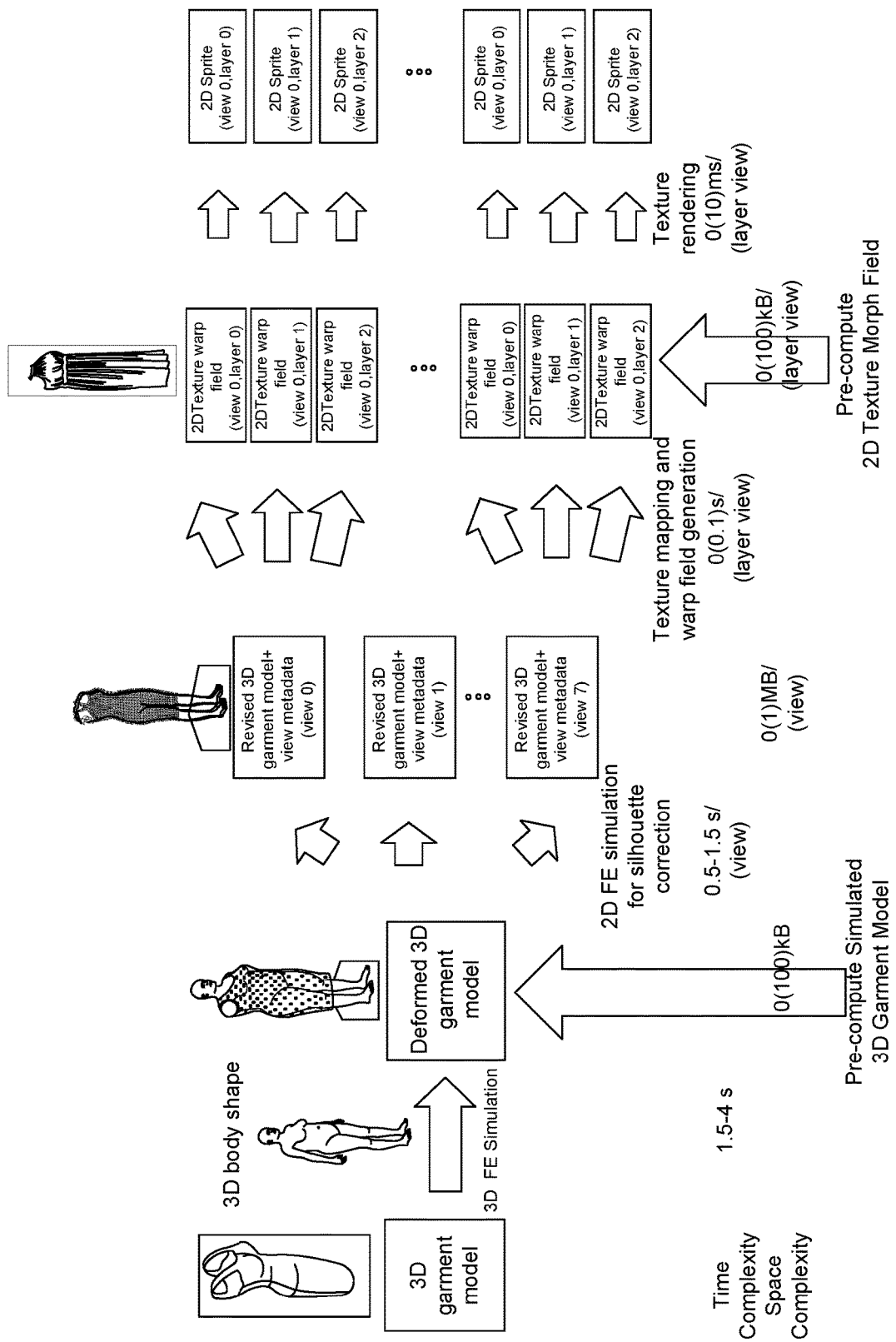
FIG. 34: An illustration example of applying pre-computation and interpolation of 3D physics simulation and 2D texture morphs on a 3D garment visualisation system, as described in Section 7.

Garment simulation is the most computationally expensive stage of the entire garment visualisation process. For example, a single draping simulation of a dress with 1 k vertices will take on average O(1-10) seconds. The simulation time increases proportionally with increasing mesh resolution. To counter this problem, efficient caching and approximation strategies may be used to reduce the need for executing explicit garment simulations at run-time (see e.g. FIG. 34).

7.1 Pre-compute and Interpolate the Physics Simulation Results

As a provided solution, we first pre-compute the deformation of the garment on a finite number of body shapes that are evenly sampled from the population, and store these simulation results in the database. Then for an arbitrary test input body shape, instead of explicitly simulating the garment on the given body shape, we generate an approximated garment deformation by interpolating/extrapolating the pre-computed explicit 3D garment physics simulation results on the nearby sample body shapes. A concrete example of the sampling scheme on the body shape parameters space of k=6 measurements (i.e. height, BMI, cup size, chest, waist, hips) is given as follows:

height: 140 cm, 155 cm, 170 cm, 190 cm, 4 samples;
bmi: 15, 22.5, 30, 40, 4 samples;
cup size: AA (indexed as 0), F (indexed as 14), 2 samples;
chest, waist, and hips: minimum (−3sd), mean, maximum (+3sd) of the tape measurement regressor output from (height, weight, cup size) at the sample point,
which gives a total number of 4×4×2×3×3×3=864 of evenly sampled body shapes.

Given an arbitrary body shape $m=[m_1, m_2, \ldots, m_k]$ in the body shape sampling space of k measurements, we generate the approximate 3D garment draping G based on a k-dimensional piecewise linear interpolation. For each body measurement dimension $m_i$ (i=1, 2, . . . , k), we find its located sample segment (in the case of interpolation) or the nearest sample segment (in the case of extrapolation), which is defined by the measurement low-end $m_{i,0}$ and the measurement high-end $m_{i,1}$. For example, if the current input measurement height is $m_i=150$ cm, then the low-end $m_{i,0}=140$ cm and the high-end $m_{i,0}=155$ cm, respectively. The approximate draping G can be estimated from $2^k$ nearby pre-simulated samples $G_j$ (j=0, 1, . . . , $2^k$−1) defined on the $2^k$ endpoints $\{m_{i,0.1}\}_{i=1}^k$ as follows.

$$G = \sum_{j=0}^{2^k-1} w_j G_j, \quad (47)$$

$$w_j = \prod_{i=1}^{k} b_i(j) \frac{m_i - m_{i,0}}{m_{i,1} - m_{i,0}} + (1 - b_i(j)) \frac{m_{i,1} - m_i}{m_{i,1} - m_{i,0}} \quad (48)$$

where $b_i(j)$ is the i-th bit of the integer j in its binary representation $j=(b_1 b_2 \ldots b_k)_2$.

7.2 Pre-Compute and Interpolate the Morphed 2D Garment Textures

The pre-computation and interpolation scheme can also be done on the later stage of a rendering process. As a process, for each garment, we carry out the following process:

1. Pre-compute explicit physics simulations on a finite number of body shapes;
2. Store the 2D texture morph fields of each garment layer and camera view (usually represented as rectangular grids) based on the physics simulation;
3. Interpolate the garment morph of arbitrary body shape from examples (usually in a weighted-average manner) at rendering time.

The interpolated texture morph fields are used directly to warp the garment textures for the final rendering and garment texture composition for outfitting. FIG. 33 gives an illustration example of performing texture morph interpolation on a 2D body shape space defined by height and BMI. We can apply a piecewise bilinear interpolation to generate approximate 2D garment morph fields from the four nearby pre-computed texture morph samples at rendering time. The scheme can be generalised to model a higher dimensional body shape space (e.g. defined by height, BMI, bust, waist, hips), in which a multi-dimensional piecewise linear interpolation will be applied to generate texture morph fields of the garment on an arbitrary body shape.

Figure 35:
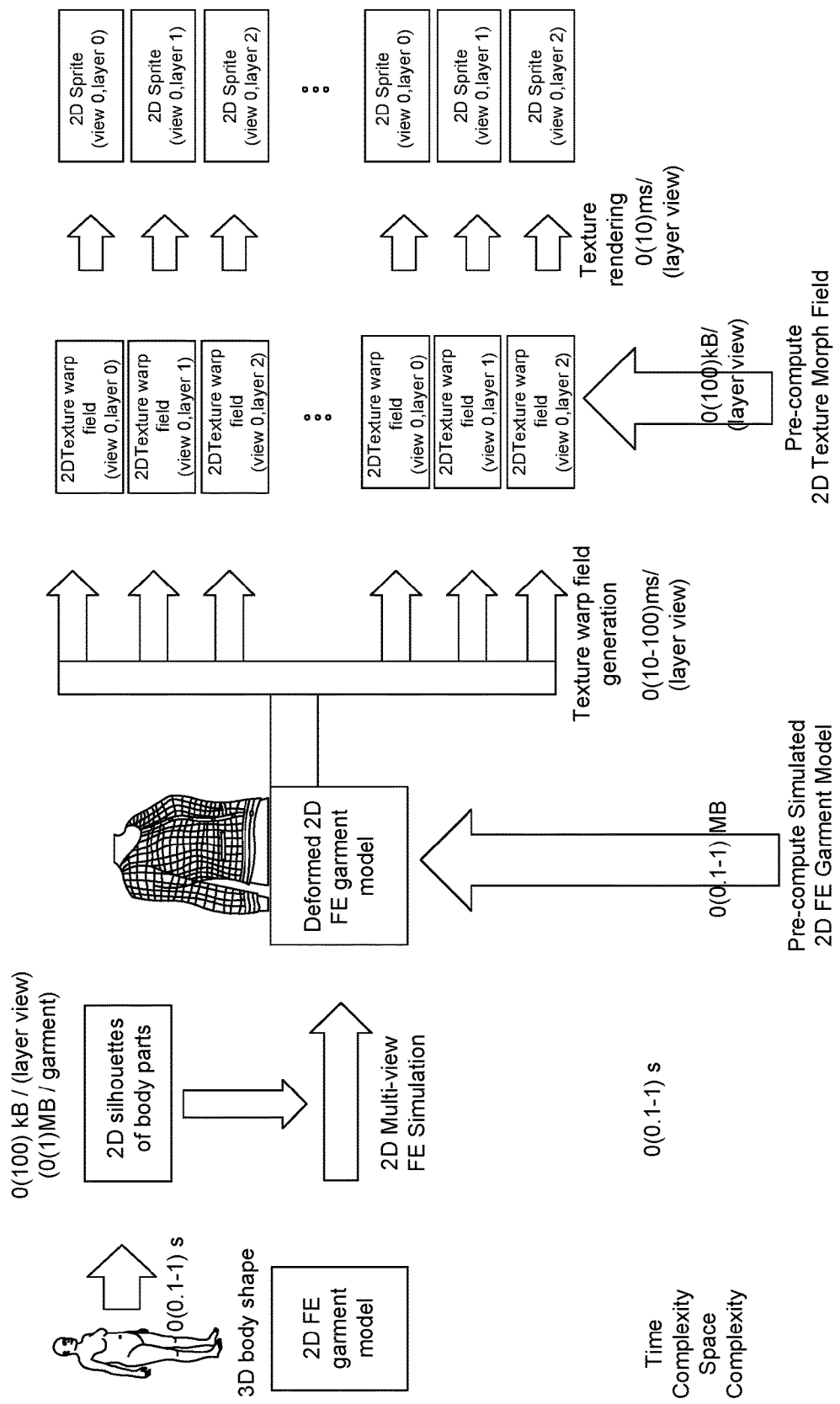
FIG. 35: An illustration example of applying pre-computation and interpolation of 2D physics simulation and 2D texture morphs on garment visualisation system based on 2D physics simulation, as described in Section 7.

It is worthwhile to mention that this scheme of interpolating morphed garment textures is not only compatible with a garment modelling system based on 3D physics simulation (see e.g. FIG. 34) but also compatible with a garment modelling system based on 2D view-based physics simulation (see FIG. 35 for example).

7.3 Experiment Results

In either approach, the amount of computation for performing an interpolation is much less than that for performing the explicit garment simulation. This may hence help to enhance the throughput of the visualisation pipeline considerably.

As an example we carry out an experiment to evaluate the pre-computed simulation and interpolation scheme on the 3D physics simulation results. A dress model (mesh resolution=1110 vertices) is chosen as the test case. To set up the framework of the experiment, we perform a 3D simulation of the garment on 100 samples of 3D body shapes from the CAESAR dataset [32] and use them as the training data of the regressor. For the shape interpolation strategy, a polynomial regression from body parameters to the PCA of pre-simulated results is applied. For the validation, we choose another 100 different body shapes from the CAESAR dataset, and perform garment shape interpolation and compare the results with the meshes obtained from explicit 3D physics simulation. The qualitative results show that 3D mesh errors and texture distortions caused by the interpolation are quite unnoticeable in terms of visualisation (see FIG. 36 for an example). In terms of absolute quantitative errors, the numbers (on a realistic scale) we achieved are:

Average mean vertex-wise error: 0.89 cm,
Average maximum vertex-wise error: 2.37 cm.

The numeric errors are considered small based on the fact that only a relatively small number of samples are used for training.

8 Summaries and Further Extensions

We have presented novel 3D garment modelling frameworks that combine the features of both the simulation-based system and capture-based system. For the garment digitisation, we photograph the garment in multiple camera views for the appearance model, and then create the 3D garment model from these 2D silhouettes and/or depth scans using computer-vision-based approaches. To address the garment deformation on a different body shape we perform a constrained physics simulation to control the level of detail in the draping modelling. The system allows automatic garment digitisation at a low cost and also photo-realistic visualisation of the garment on a wide range of body shapes. Hence, it is suitable for the scalable online fashion business. Further extensions may be made to improve the functionality of the system, including but not limited to:

Automation of depth labeling and depth discontinuity detection when digitizing complex garments. When creating garment models for complex garment types like sleeved tops, the current template fitting algorithm requires that discrete depth labels are assigned to silhouette segments for matching of the garment parts. It is also necessary to mark out the internal depth discontinuity on the garment texture image when self-occlusion exists, especially in corner views and profile views. Currently some manual interventions are still involved; a solution is to use either stereo images or a depth sensor (e.g. Microsoft Kinect, Intel R200s), to acquire the depth information, which can be used to infer internal depth discontinuity and classify the boundaries and edge segments based on the range of depths.

Figure 39:
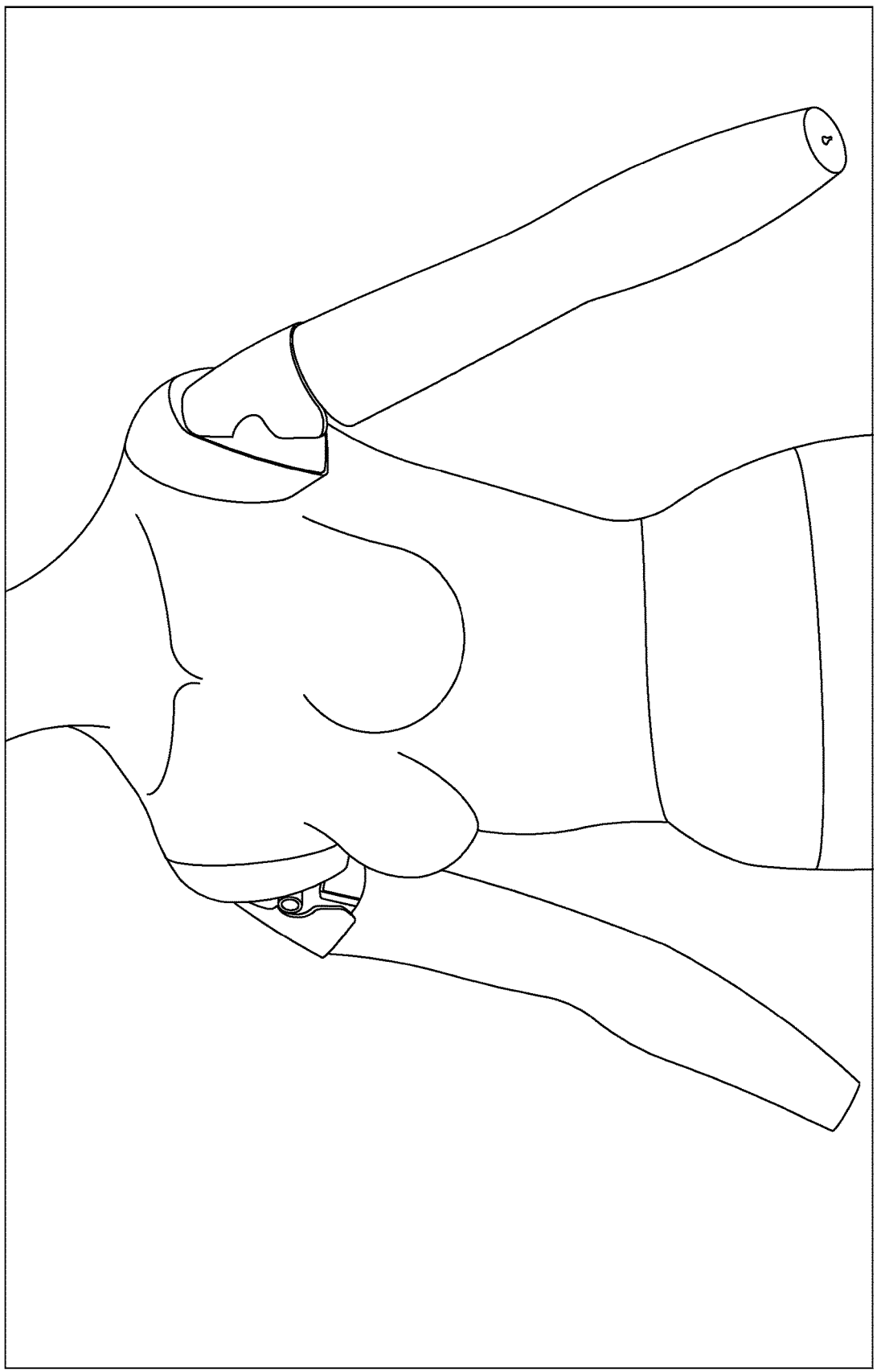
FIG. 39: An example of an abductible mannequin prototype, in which hinges are used to connect the arms with the torso of the mannequin. The arm pose of the mannequin can hence be changed.

Missing texture synthesis for the self-occluded areas. During the garment digitisation stage, the garment texture in some areas, e.g. the torso part under the arm-pits or the crotch part between the legs, may not be captured in a single shot owing to self-occlusion in corner views or profile views. Although in our digitisation setting, we used an abductible mannequin and increased the angles between the arms and the torso (see FIG. 39 for example), and the angle between the legs to minimise the self-occlusion in corner views, it remains an issue in profile views. These areas with missing texture could become immediately visible after the garment is simulated and deformed on a different body shape or pose. One possible solution is to introduce more cameras to capture the occluded texture from different perspectives as shown for example in FIG. 40, and then merge or stitch the textures captured by all the cameras. Merging textures involves more complexity for our digitisation framework. The garment model we created is a smooth and simplified version of the actual garment surface, implying that the depth on surface of the garment model could be different from the actual depth of the texture. This error will increase when it approaches the silhouette in the camera view. As a consequence a standard texture mapping approach for texture merge usually performs poorly giving rise to texture blurring and misalignment. A possible better solution will be using the structure-from-motion [26] along with a non-linear optimisation approach similar to [30] to stitch a common texture map from all the capture sources, or introducing an extra depth camera to capture more detailed surface geometry of the garment (see Section 3.1.5).

Handling large out-of-the-plane pose changes. The texture morphing solution presented in Section 6.2 is suitable for in-plane deformation and small out-of-the-plane deformation, but problematic in the presence of a large out-of-the-plane pose change, e.g. the arms or the torso of the target body shape are twisted by 45 degrees. In those cases, a large area of invisible and untextured mesh surface can be brought into view after the deformation. A possible solution for the missing texture is increasing the number of viewpoints to be captured in the digitisation, so the missing texture can be synthesized from those of neighbouring views. Another complex aspect of this problem comes from the lighting correction owing to the significant change in the surface normal direction. This requires some de-lighting and re-lighting solutions when merging the textures.

Providing a general and automatic approach to infer the material attributes of a garment. This intrinsic material information is all encoded in the garment photos, when the garment is digitised on the mannequin. As an improvement, we capture multiple photos of the garment that is hanged on different objects, e.g. mannequins of different sizes, to provide a series of different draping patterns of the garment. From the multiple pairs of input and output, we derive a low-dimensional shape variation model to capture those intrinsic garment behaviours caused by the change of material properties, e.g. stretchiness, bendiness, friction, etc.

REFERENCES

[1] T. Adeyoola, N. Brown, N. Trott, E. Herbert, D. Robertson, J. Downing, N. Day, R. Boland, T. Boucher, J. Townsend, E. Clay, T. Warren, and A. Unadkat. Computer implemented methods and systems for generating virtual body models for garment fit visualisation. UK Patent GB2488237, Metail Limited, August 2012.

[2] B. Amberg, S. Romdhani, and T. Vetter. Optimal step nonrigid ICP algorithms for surface registration. *IEEE Conference on Computer Vision and Pattern Recognition*, 2007.

[3] Y. Boykov, O. Veksler, and R. Zabih. Fast approximate energy minimization via graph cuts. In *Computer Vision, 1999. The Proceedings of the Seventh IEEE International Conference on*, volume 1, pages 377-384 vol. 1, 1999.

[4] Y. Boykov, O. Veksler, and R. Zabih. Fast approximate energy minimisation via graph cuts. *IEEE Trans. Pattern Analysis and Machine Intelligence (PAMI)*, 23(11):1222-1239, 2001.

[5] D. Bradley, T. Popa, A. Sheffer, W. Heidrich, and T. Boubekeur. Markerless garment capture. *ACM Transactions on Graphics (TOG)*, 27(3):99, 2008.

[6] R. Bridson, R. Fedkiw, and J. Anderson. Robust treatment of collisions, contact and friction for cloth animation. *ACM Transactions on Graphics (ToG)*, 21(3):594-603, 2002.

[7] R. Bridson, S. Marino, and R. Fedkiw. Simulation of clothing with folds and wrinkles. *Proceedings of the 2003 ACM SIGGRAPH/Eurographics symposium on Computer animation*, pages 28-36, 2003.

[8] Y. Chen, D. Robertson, and R. Cipolla. A practical system for modelling body shapes from single view measurements. *British Machine Vision Conference*, 2011.

[9] K. J. Choi and H.-S. Ko. Stable but responsive cloth. *ACM Trans. Graph. (Proc. SIGGRAPH)*, 21:604-611, 2002.

[10] F. Cordier and N. Magnenat-Thalmann. Real-time animation of dressed virtual humans. *Computer Graphics Forum*, 21 (3):327-335, 2002.

[11] F. Cordier and N. Magnenat-Thalmann. A data-driven approach for real-time clothes simulation. *Computer Graphics Forum*, 24(2):173-183, 2005.

[12] B. Curless and M. Levoy. A volumetric method for building complex models from range images. In *Proceedings of the 23rd Annual Conference on Computer Graphics and Interactive Techniques*, SIGGRAPH '96, pages 303-312, New York, N.Y., USA, 1996. ACM.

[13] E. de Aguiar, C. Stoll, C. Theobalt, N. Ahmed, H. Seidel, and S. Thrun. Performance capture from sparse multi-view video. *ACM Transactions on Graphics (TOG)*, 27(3):98, 2008.

[14] R. O. Duda and P. E. Hart. Use of the hough transformation to detect lines and curves in pictures. *Commun. ACM*, 15(1):11-15, January 1972.

[15] A. A. Efros and W. T. Freeman. Image quilting for texture synthesis and transfer. In *Proceedings of the 28th Annual Conference on Computer Graphics and Interactive Techniques*, SIGGRAPH '01, pages 341-346, New York, N.Y., USA, 2001. ACM.

[16] P. Gill, W. Murray, and M. Wright. *The Levenberg-Marquardt Method*. London: Academic Press, 1981.

[17] R. Goldenthal, D. Harmon, R. Fattal, M. Bercovier, and E. Grinspun. Efficient simulation of inextensible cloth. In *ACM SIGGRAPH 2007 Papers*, SIGGRAPH '07, New York, N.Y., USA, 2007. ACM.

[18] P. Guan, L. Reiss, D. Hirshberg, A. Weiss, and M. Black. Drape: Dressing any person. *ACM Transactions on Graphics (TOG)*, 31(4):35, 2012.

[19] R. Hartley and A. Zisserman. Multiple view geometry in computer vision. Cambridge university press, 2003.

[20] S. Hauswiesner, M. Straka, and G. Reitmayr. Temporal coherence in image-based visual hull rendering. *IEEE Transactions on Visualization and Computer Graphics*, 99(1):1, 2013.

[21] S. Izadi, D. Kim, O. Hilliges, D. Molyneaux, R. Newcombe, P. Kohli, J. Shotton, S. Hodges, D. Freeman, A. Davison, et al. Kinectfusion: real-time 3d reconstruction and interaction using a moving depth camera. In *Proceedings of the 24th annual ACM symposium on User interface software and technology*, pages 559-568. ACM, 2011.

[22] V. Kwatra, A. Schodl, I. Essa, G. Turk, and A. Bobick. Graphcut textures: Image and video synthesis using graph cuts. *ACM Trans. Graph.*, 22(3):277-286, July 2003.

[23] A. Laurentini. The visual hull concept for silhouette-based image understanding. *Pattern Analysis and Machine Intelligence, IEEE Transactions on*, 16(2):150-162, February 1994.

[24] A. Levin, A. Zomet, S. Peleg, and Y. Weiss. Seamless image stitching in the gradient domain. In *Computer Vision-ECCV* 2004, pages 377-389. Springer, 2004.

[25] B. Lévy, S. Petitjean, N. Ray, and J. Maillot. Least squares conformal maps for automatic texture atlas generation. In *ACM Transactions on Graphics (TOG)*, volume 21, pages 362-371. ACM, 2002.

[26] M. Lourakis and A. Argyros. The design and implementation of a generic sparse bundle adjustment software package based on the levenberg-marquardt algorithm. Technical report, Technical Report 340, Institute of Computer Science-FORTH, Heraklion, Crete, Greece, 2004.

[27] W. Matusik, C. Buehler, R. Raskar, S. J. Gortler, and L. McMillan. Image-based visual hulls. In *Proceedings of the 27th Annual Conference on Computer Graphics and Interactive Techniques*, SIGGRAPH '00, pages 369-374, New York, N.Y., USA, 2000. ACM Press/Addison-Wesley Publishing Co.

[28] A. Nealen, M. Müller, R. Keiser, E. Boxerman, and M. Carlson. Physically based deformable models in computer graphics. *Computer Graphics Forum*, 25(4):809-836, 2006.

[29] P. Pérez, M. Gang-net, and A. Blake. Poisson image editing. In *ACM Transactions on Graphics (TOG)*, volume 22, pages 313-318. ACM, 2003.

[30] A. Rav-Acha, P. Kohli, C. Rother, and A. Fitzgibbon. Unwrap mosaics: A new representation for video editing. *Proc. of SIGGRAPH*, pages 48-60, 2008.

[31] D. Robertson. System and method for image processing and generating a body model, 9 2010. U.S. patent application Ser. No. 12/881,861.

[32] K. Robinette, H. Daanen, and E. Paquet. The CAESAR project: a 3-D surface anthropometry survey. *International Conference on 3-D Digital Imaging and Modeling*, pages 380-386, 1999.

[33] S. Rusinkiewicz and M. Levoy. Efficient variants of the icp algorithm. In *3-D Digital Imaging and Modeling, 2001. Proceedings. Third International Conference on*, pages 145-152, 2001.

[34] J. Starck and A. Hilton. Surface capture for performance-based animation. *IEEE Comp. Graphics and Applications*, 27:21-31, 2007.

[35] C. Stauffer and W. E. L. Grimson. Adaptive background mixture models for real-time tracking. In *Computer Vision and Pattern Recognition, 1999. IEEE Computer Society Conference on.*, volume 2. IEEE, 1999.

[36] C. Stoll, J. Gall, E. de Aguiar, S. Thrun, and C. Theobalt. Video-based reconstruction of animatable human characters. *ACM Transactions on Graphics (TOG)*, 29(6):139, 2010.

[37] R. Szeliski. Image alignment and stitching: A tutorial. *Foundations and Trends in Computer Graphics and Vision*, 2(1):1-104, 2006.

[38] N. Umetani, D. Kaufman, T. Igarashi, and E. Grinspun. Sensitive couture for interactive garment modeling and editing. *ACM Trans. Graph.*, 30(4):90, 2011.

[39] G. Vogiatzis, P. Torr, and R. Cipolla. Multi-view stereo via volumetric graph-cuts. In *Computer Vision and Pattern Recognition, 2005. CVPR 2005. IEEE Computer Society Conference on*, volume 2, pages 391-398 vol. 2, June 2005.

[40] R. White, K. Crane, and D. Forsyth. Capturing and animating occluded cloth. *ACM Transactions on Graphics (TOG)*, 26(3):34, 2007.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. Method of using efficient caching and approximation strategies to reduce execution of explicit garment simulations at run-time, comprising the steps of:
   (i) first pre-computing a deformation of a garment on a finite number of body shapes that are sampled from the human population, the pre-computing comprising:
       (a) pre-computing explicit physics simulations of the garment on a finite number of body shapes;
       (b) storing the 2D texture morph fields of each garment layer and camera view, based on the physics simulations; and
       (c) interpolating the garment morph for the specified body shape from examples, at rendering time, wherein a piecewise bilinear interpolation is applied to generate approximate 2D garment morph fields from at least four nearby pre-computed texture morph samples, at rendering time, and storing these simulation results in a database;
   (ii) for a specified body shape, generating an approximate garment deformation on the specified body shape by interpolating or extrapolating the pre-computed garment simulation results stored in the database on nearby sample body shapes to the specified body shape.

2. Method of claim 1, wherein the stored 2D texture morph fields of each garment layer and camera view, are represented as rectangular grids, based on the physics simulations.

3. Method of claim 1, wherein the interpolation of the garment morph for the specified body shape from examples is performed in a weighted-average manner.

4. Method of claim 1, in which the physics simulations are 3D physics simulations.

5. Method of claim 1, wherein interpolated texture morph fields are used directly to warp garment textures for a final rendering and garment texture composition for outfitting.

6. Method of claim 1, wherein a multi-dimensional piecewise linear interpolation defined on K-different measurement dimensions is applied to generate approximate 2D garment morph fields.

7. Method of claim 1, further comprising a method of generating an image file of a high resolution 3D garment model on a 3D body model, the method comprising the steps of:
   (i) acquiring at least three 2D images of a garment on a mannequin, wherein the at least three 2D images of the garment on the mannequin capture a 360° azimuthal angle range of view of the garment on the mannequin, including capturing a texture of the garment at high resolution;
   (ii) creating a smooth and simplified 3D garment model using the at least three 2D images of the garment;
   (iii) simulating the smooth and simplified 3D garment model on the 3D body model;
   (iv) deforming and rendering the high-resolution garment texture on the simulated smooth and simplified 3D garment model on the 3D body model, and
   (v) generating an image file of the 3D body model, the image file including the deformed and rendered high-resolution garment texture, on the simulated smooth and simplified 3D garment model, on the 3D body model.

8. Method of claim 7, in which the method includes: acquiring at least three depth scans of the garment on the mannequin, wherein the at least three depth scans of the garment on the mannequin capture a 360° azimuthal angle range of view of the garment on the mannequin, including capturing the texture of the garment at high resolution, and creating the smooth and simplified 3D garment model using the at least three depth scans of the garment.

9. Method of claim 1, further comprising a method of generating an image file of a high resolution 3D garment model on a 3D body model, the method comprising the steps of:
   (i) acquiring at least three 2D images of a garment on a mannequin, wherein the at least three 2D images of the garment on the mannequin capture a 360° azimuthal angle range of view of the garment on the mannequin, including capturing a texture of the garment at high resolution;
   (ii) creating a smooth and simplified 3D garment model using the at least three 2D images of the garment;

(iii) simulating the smooth and simplified 3D garment model on the 3D body model;

(iv) deforming and rendering the high-resolution garment texture on the simulated smooth and simplified 3D garment model on the 3D body model, and (v) generating an image file of the 3D body model, the image file including the deformed and rendered high-resolution garment texture, on the simulated smooth and simplified 3D garment model, on the 3D body model.

10. Method of claim 9, in which the method includes: acquiring at least three depth scans of the garment on the mannequin, wherein the at least three depth scans of the garment on the mannequin capture a 360° azimuthal angle range of view of the garment on the mannequin, including capturing the texture of the garment at high resolution, and creating the smooth and simplified 3D garment model using the at least three depth scans of the garment.

11. Method of claim 1, further comprising a method of creating a high quality texture map of a garment by stitching together multiple high definition (HD) images of the garment from a depth sensor, wherein the garment is on a mannequin and the mannequin is rotated on a turntable, under the control of a control unit, while the HD images are obtained from the depth sensor, which is under the control of the control unit.

12. Method of claim 1, further comprising a method of creating a high quality texture map of a garment by stitching together multiple high definition (HD) images of the garment from a depth sensor, wherein the garment is on a mannequin and the mannequin is rotated on a turntable, under the control of a control unit, while the HD images are obtained from the depth sensor, which is under the control of the control unit.

13. Method of claim 1, further comprising a method of garment texture morphing based on 2D physics simulation, in which a silhouette of a garment is deformed on a collision obstacle formed by a projection of a body model in a corresponding camera view.

14. Method of claim 1, further comprising a method of garment texture morphing based on 2D physics simulation, in which a silhouette of a garment is deformed on a collision obstacle formed by a projection of a body model in a corresponding camera view.

15. Computer program product embodied on a non-transitory storage medium, the computer program product executable on a processor to use efficient caching and approximation strategies to reduce execution of explicit garment simulations at run-time, the computer program product executable on the processor to:

(i) first pre-compute a deformation of a garment on a finite number of body shapes that are sampled from the human population, the pre-computing comprising:

(a) pre-computing explicit physics simulations of the garment on a finite number of body shapes;

(b) storing the 2D texture morph fields of each garment layer and camera view, based on the physics simulations; and (c) interpolating the garment morph for the specified body shape from examples, at rendering time, wherein a piecewise bilinear interpolation is applied to generate approximate 2D garment morph fields from at least four nearby pre-computed texture morph samples, at rendering time, and storing these simulation results in a database;

(ii) for a specified body shape, generate an approximate garment deformation on the specified body shape by interpolating or extrapolating the pre-computed garment simulation results stored in the database on nearby sample body shapes to the specified body shape.

16. Computer system including a processor, the computer system configured to use efficient caching and approximation strategies to reduce execution of explicit garment simulations at run-time, the computer system configured to:

(i) first pre-compute a deformation of a garment on a finite number of body shapes that are sampled from the human population, the pre-computing comprising:

(a) pre-computing explicit physics simulations of the garment on a finite number of body shapes;

(b) storing the 2D texture morph fields of each garment layer and camera view, based on the physics simulations; and (c) interpolating the garment morph for the specified body shape from examples, at rendering time, wherein a piecewise bilinear interpolation is applied to generate approximate 2D garment morph fields from at least four nearby pre-computed texture morph samples, at rendering time, and storing these simulation results in a database;

(ii) for a specified body shape, generate an approximate garment deformation on the specified body shape by interpolating or extrapolating the pre-computed garment simulation results stored in the database on nearby sample body shapes to the specified body shape.

17. Method of using efficient caching and approximation strategies to reduce execution of explicit garment simulations at run-time, and generating an image file of a high resolution 3D garment model on a 3D body, comprising the steps of:

(i) acquiring at least three 2D images of a garment on a mannequin, wherein the at least three 2D images of the garment on the mannequin capture a 360° azimuthal angle range of view of the garment on the mannequin, including capturing a texture of the garment at high resolution;

(ii) creating a smooth and simplified 3D garment model using the at least three 2D images of the garment;

(iii) simulating the smooth and simplified 3D garment model on the 3D body model;

(iv) deforming and rendering the high-resolution garment texture on the simulated smooth and simplified 3D garment model on the 3D body model; and (v) generating an image file of the 3D body model, the image file including the deformed and rendered high-resolution garment texture, on the simulated smooth and simplified 3D garment model, on the 3D body model;

(vi) pre-computing a deformation of a garment on a finite number of body shapes that are sampled from the human population, and storing these simulation results in a database;

(vii) for a specified body shape, generating an approximate garment deformation on the specified body shape by interpolating or extrapolating the pre-computed garment simulation results stored in the database on nearby sample body shapes to the specified body shape.

18. Method of claim 17, further comprising:

(a) pre-computing explicit physics simulations of the garment on a finite number of body shapes;

(b) storing the 2D texture morph fields of each garment layer and camera view, based on the physics simulations; and (c) interpolating the garment morph for the specified body shape from examples, at rendering time.

19. Method of claim 17, in which the method includes: acquiring at least three depth scans of the garment on the mannequin, wherein the at least three depth scans of the garment on the mannequin capture a 360° azimuthal angle range of view of the garment on the mannequin, including capturing the texture of the garment at high resolution, and creating the smooth and simplified 3D garment model using the at least three depth scans of the garment.

* * * * *